(12) United States Patent
Wu

(10) Patent No.: US 12,207,344 B2
(45) Date of Patent: Jan. 21, 2025

(54) COMMUNICATIONS METHOD AND APPARATUS

(71) Applicant: Huawei Technologies Co., Ltd., Shenzhen (CN)

(72) Inventor: Yizhuang Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/983,019

(22) Filed: Nov. 8, 2022

(65) Prior Publication Data

US 2023/0056728 A1   Feb. 23, 2023

Related U.S. Application Data

(63) Continuation of application No. 17/067,377, filed on Oct. 9, 2020, now Pat. No. 11,523,268, which is a
(Continued)

(30) Foreign Application Priority Data

| Apr. 9, 2018 | (CN) | 201810313171.8 |
| Nov. 19, 2018 | (CN) | 201811378685.8 |
| Feb. 18, 2019 | (CN) | 201910120722.3 |

(51) Int. Cl.
  *H04W 24/10* (2009.01)
  *H04W 4/50* (2018.01)
  *H04W 8/08* (2009.01)

(52) U.S. Cl.
  CPC ............. *H04W 8/08* (2013.01); *H04W 4/50* (2018.02); *H04W 24/10* (2013.01)

(58) Field of Classification Search
  CPC .......... H04W 8/08; H04W 4/50; H04W 24/10; H04W 76/19; H04W 48/18; H04W 88/18;
  (Continued)

(56) References Cited

U.S. PATENT DOCUMENTS

2010/0165833 A1   7/2010 Du et al.
2013/0262576 A1   10/2013 Foti
(Continued)

FOREIGN PATENT DOCUMENTS

CN   103384380 A    11/2013
KR   20180021650 A    3/2018
(Continued)

OTHER PUBLICATIONS

3GPP TS 23.501 V15.1.0, Mar. 2018, "3rd Generation Partnership Project; Technical Specification Group Services and System Aspects; System Architecture for the 5G System; Stage 2 (Release 15)," 201 pages.
(Continued)

*Primary Examiner* — Chuong A Ngo
(74) *Attorney, Agent, or Firm* — Conley Rose, P.C.

(57) ABSTRACT

A communications method includes determining a session management function entity based on at least one of a data network name, slice information, and an application function service identifier, and sending a first message to the session management function entity, where the first message is used to subscribe to a terminal event, the first message includes service description information, and the service description information is used to indicate a service corresponding to the terminal event.

23 Claims, 48 Drawing Sheets

Related U.S. Application Data continuation of application No. PCT/CN2019/081974, filed on Apr. 9, 2019.

(58) Field of Classification Search
CPC ..... H04L 67/142; H04L 67/146; H04L 67/22; H04L 69/40; H04L 67/20
See application file for complete search history.

(56) References Cited

U.S. PATENT DOCUMENTS

| | | |
|---|---|---|
| 2017/0366423 A1 | 12/2017 | Griot et al. |
| 2019/0357130 A1* | 11/2019 | Garcia Azorero .... H04W 12/06 |
| 2020/0413326 A1* | 12/2020 | Stille .................. H04L 12/1407 |

FOREIGN PATENT DOCUMENTS

| | | |
|---|---|---|
| RU | 2429576 C2 | 9/2011 |
| WO | 2018038487 A1 | 3/2018 |

OTHER PUBLICATIONS

3GPP TS 23.503 V15.1.0, Mar. 2018, "3rd Generation Partnership Project; Technical Specification Group Services and System Aspects; Policy and Charging Control Framework for the 5G System; Stage 2 (Release 15)," 65 pages.

3GPP TS 23.502 V15.1.0, "3rd Generation Partnership Project; Technical Specification Group Services and System Aspects; Procedures for the 5G System; Stage 2 (Release 15)," Mar. 2018, 285 pages.

Huawei, "Idle Status Indication in MONTE: UE Reachability or Availability after DDN failure Events.," S2-171796, SA WG2 Meeting #120, Busan, SK, Mar. 27-31, 2017, 8 pages.

SA WG2 Meeting #126, "Solution for High latency communication," S2-181906, Ericsson, Feb. 26-Mar. 2, 2018, Montreal, Canada, 5 pages.

SA WG2 Meeting #126, S2-182206, "Solution of High latency communication and Power Saving Function," Intel, Feb. 26-Mar. 2, 2018, Montreal, Canada, 9 pages.

ZTE, "Update of Solution 39: UE availability after DDN failure for multiple Afs," SA WG2 Meeting #129, Sep. 10, 2018, Dongguan, China, S2-1810323, 9 pages.

Huawei et al., "Application-influenced SSC and UP management," 3GPP TSG SA WG2 Meeting #119, Feb. 13-Feb. 17, 2017, Dubrovnik, Croatia, S2-171066, 10 pages.

\* cited by examiner

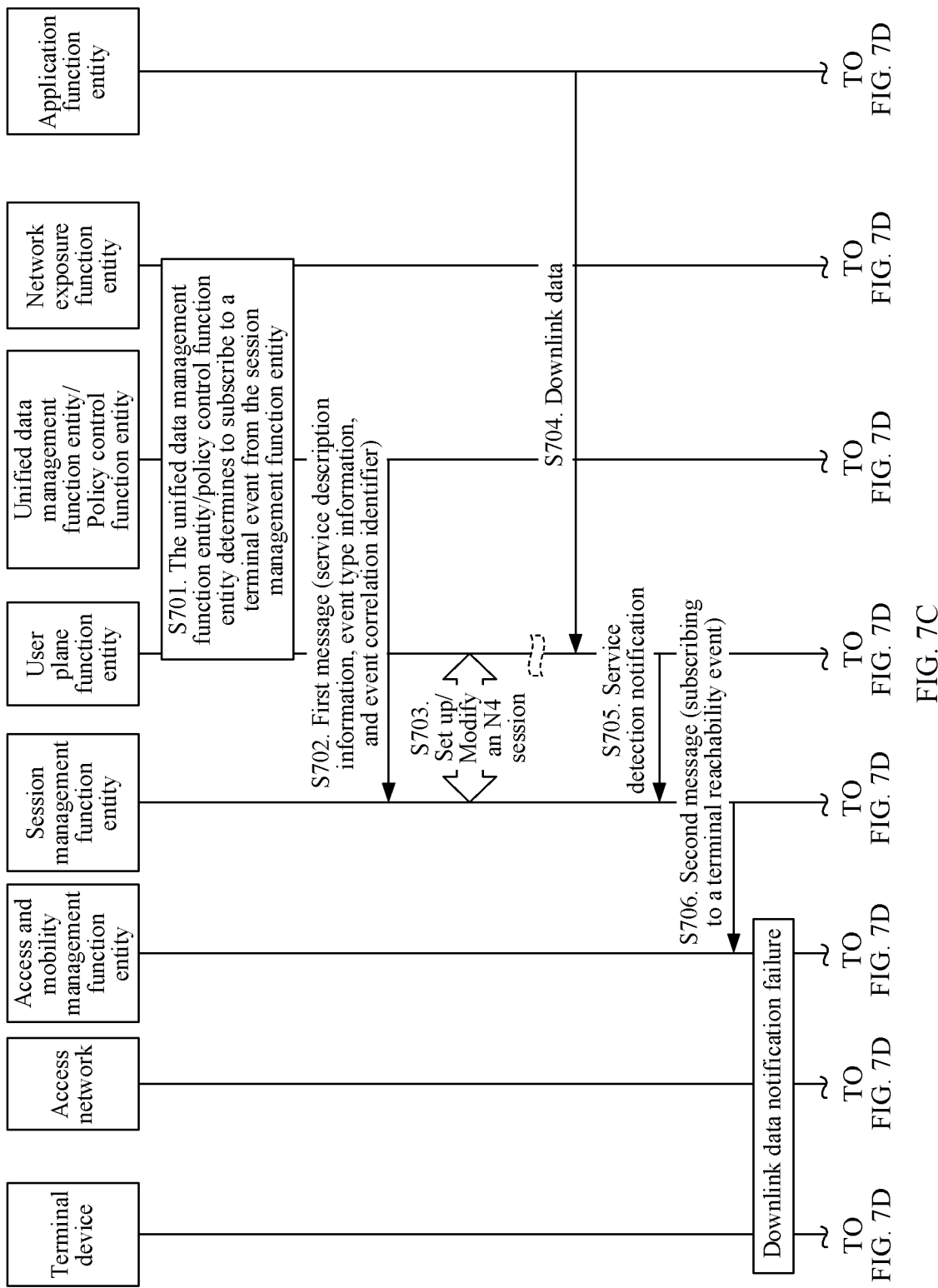

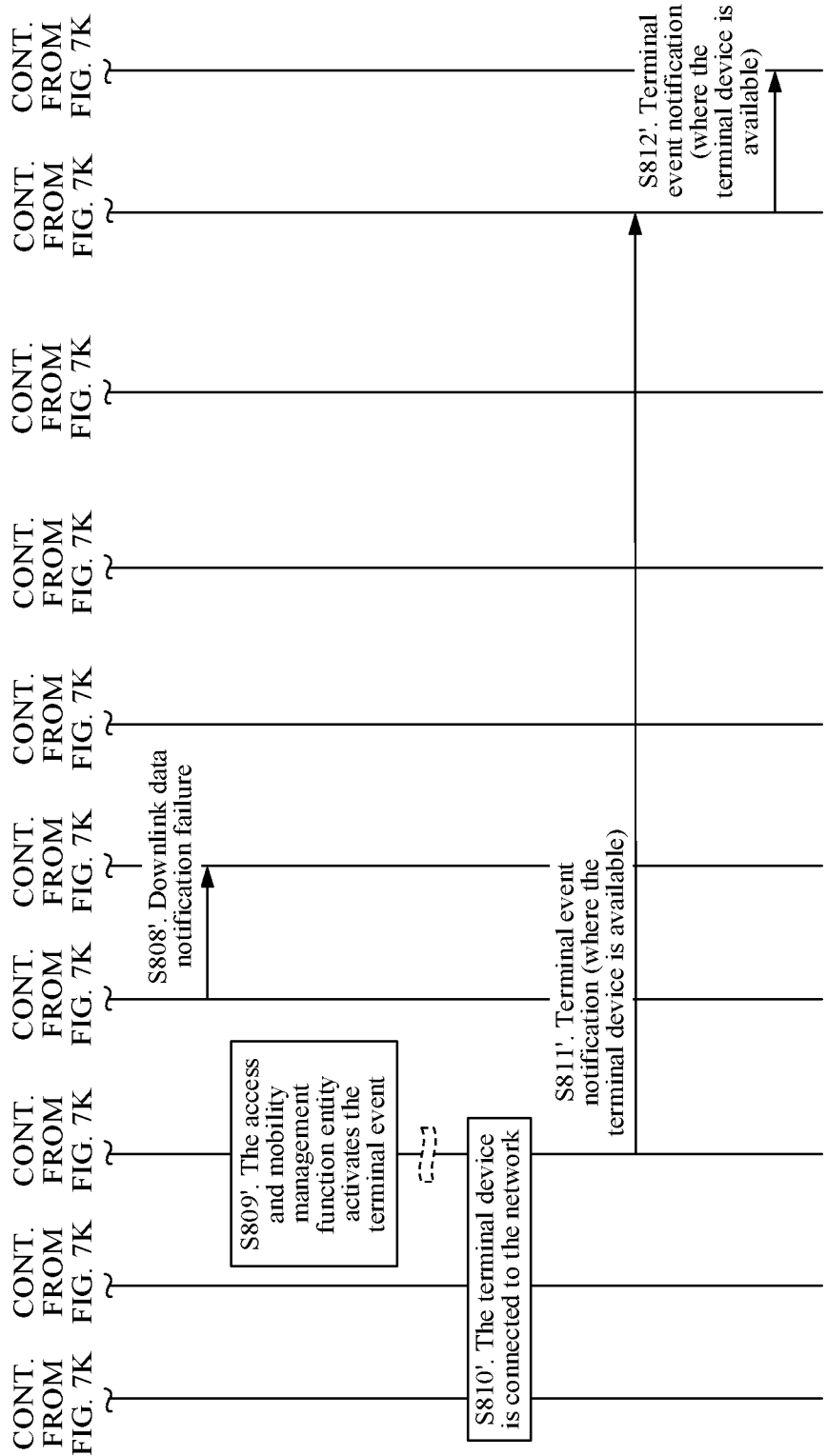

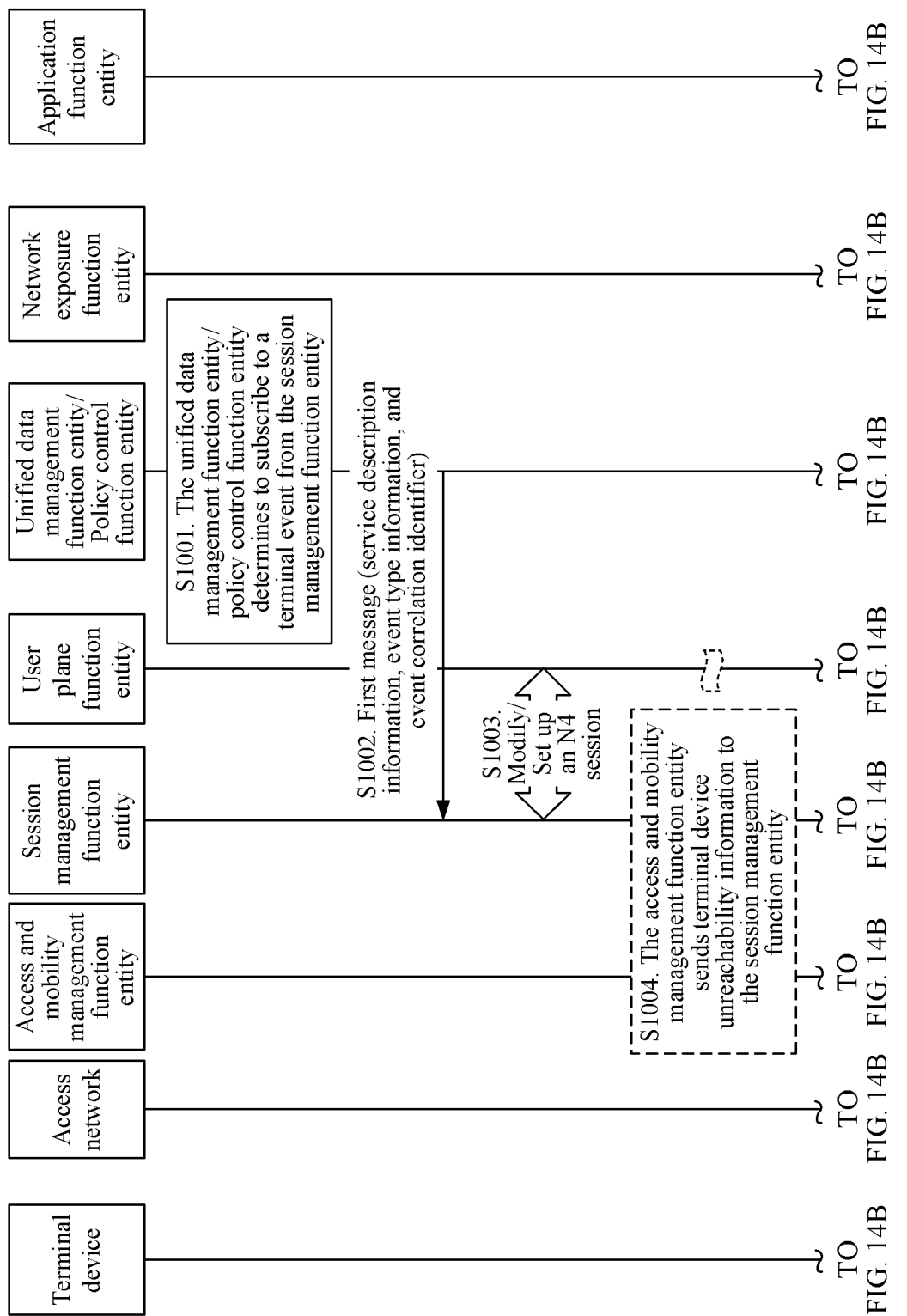

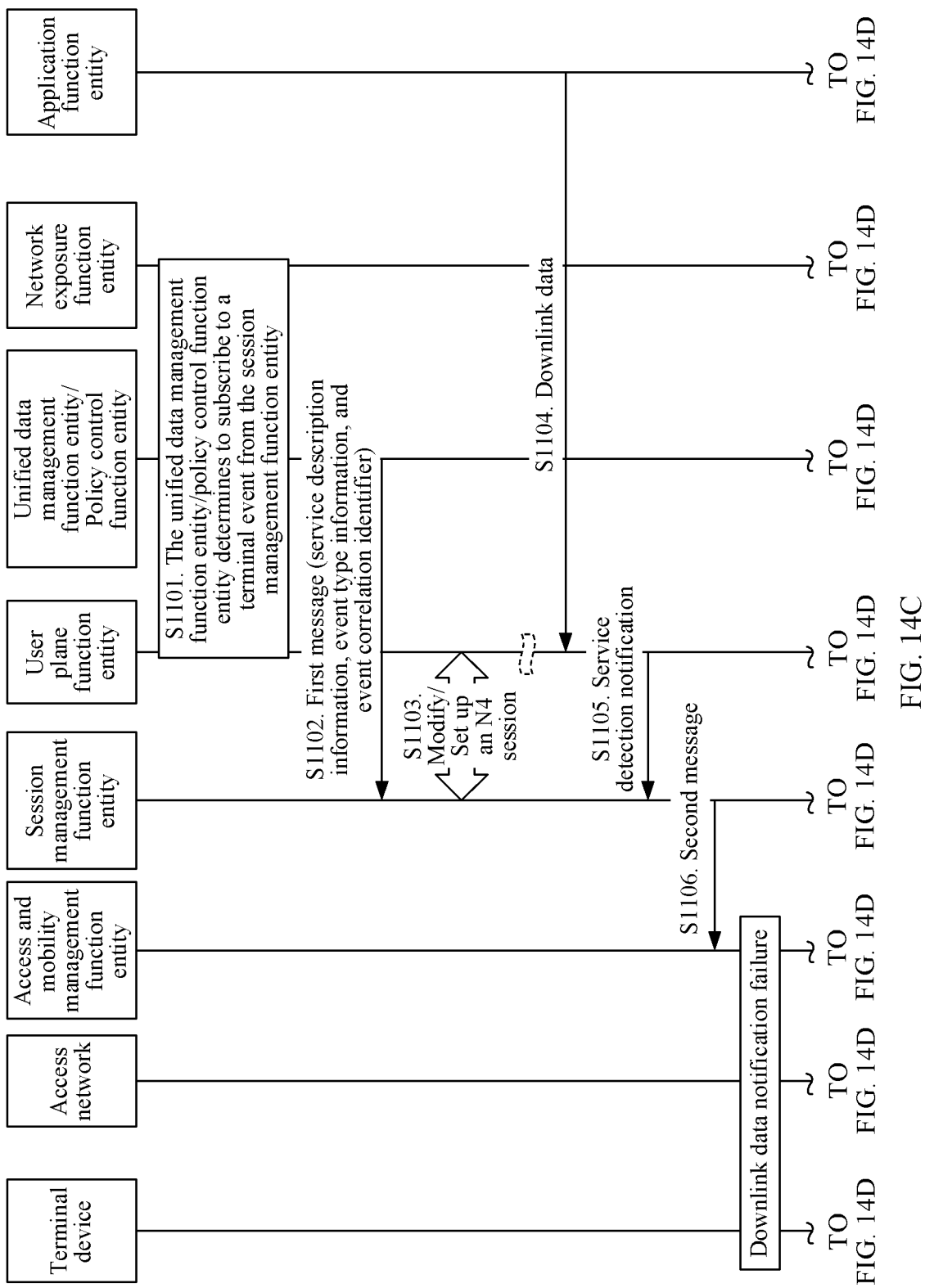

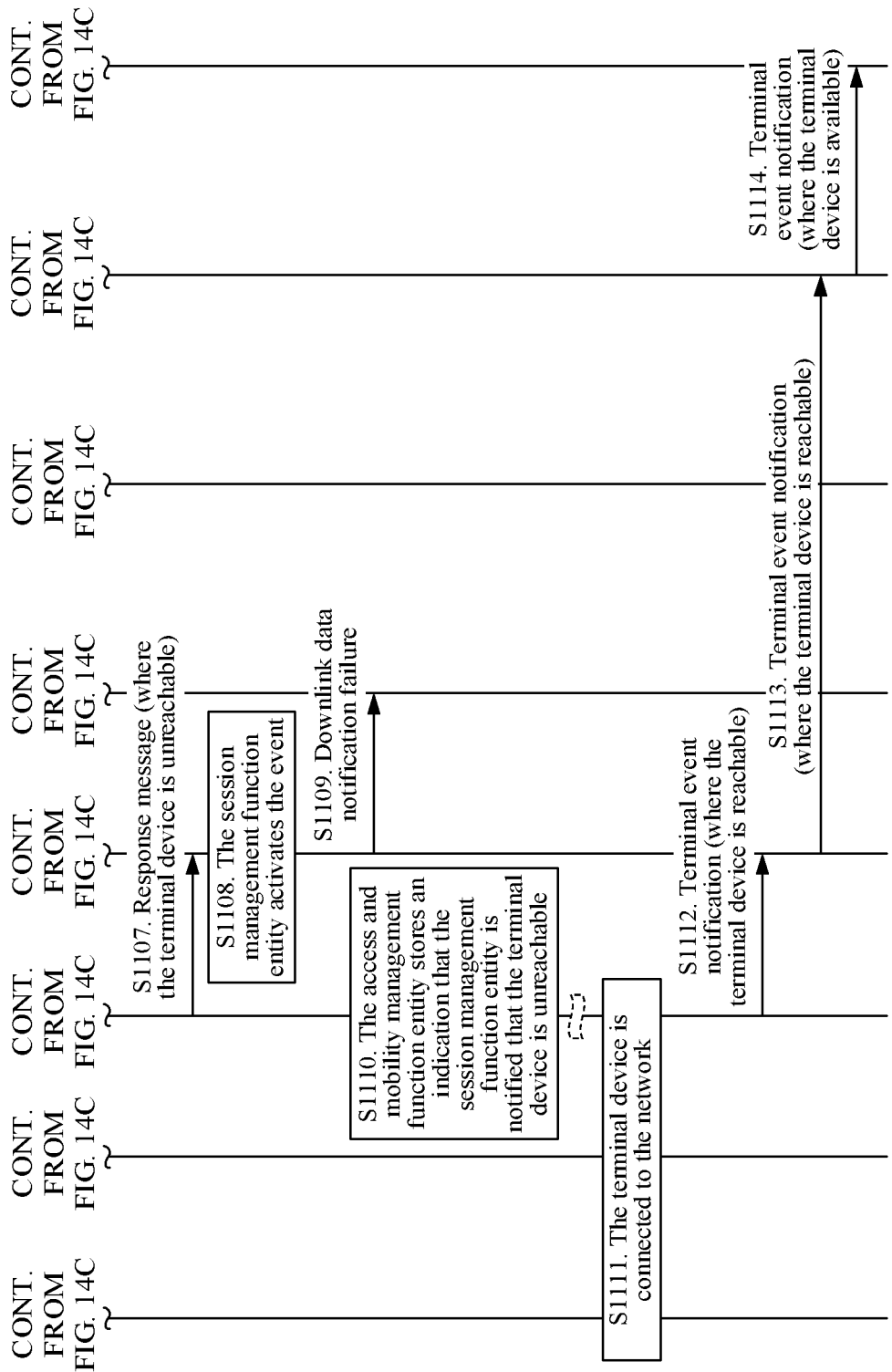

COMMUNICATIONS METHOD AND APPARATUS

CROSS-REFERENCE TO RELATED APPLICATIONS

This is a continuation of U.S. patent application Ser. No. 17/067,377 filed on Oct. 9, 2020, which is a continuation of Int'l Patent App. No. PCT/CN2019/081974 filed on Apr. 9, 2019, which claims priority to Chinese Patent App. No. 201810313171.8 filed on Apr. 9, 2018, Chinese Patent App No. 201811378685.8 filed on Nov. 19, 2018, and Chinese Patent App. No. 201910120722.3 filed on Feb. 18, 2019, all of which are incorporated by reference.

FIELD

This application relates to the field of communications technologies, and in particular, to a communications method and apparatus.

BACKGROUND

FIG. 1 is a schematic diagram of an existing evolved packet system (EPS) non-roaming architecture. To support a service capability server/application server (SCS/AS) having a third-party application (such as a machine type application) installed in using an EPS network, the existing network architecture is enhanced. A service capability exposure function (SCEF) network element is introduced. FIG. 2 is a schematic architecture diagram of an interface in a 3rd generation partnership project (3GPP) EPS network architecture opened using an SCEF, where the SCEF provides, to the SCS/AS, a service and a capability that are provided by a secure 3GPP network interface.

A machine-type service includes a service that has a low latency requirement, that is, a high-latency service. Based on the foregoing capability exposure architecture, to support high-latency service communication, a monitoring event of "terminal availability after downlink data notification (DDN) failure (availability after DDN failure)" is defined. In other words, the SCS/AS may subscribe to the monitoring event of "availability after DDN failure" from the 3GPP EPS network using the SCEF. When the SCS/AS sends a data packet to a terminal in the EPS network, if the terminal is in an unavailable state, the EPS network activates the event of "availability after DDN failure", that is, monitors a status of the terminal. When the terminal enters an available state, the network reports the available state of the terminal to the SCS/AS using the SCEF such that the SCS/AS resends data to the terminal.

In an existing technical solution, both a session and mobility are controlled by a mobility management entity (MME). When a DDN message sent by a serving gateway (SGW) is received, and when a terminal is in an unavailable state, for example, the MME initiates paging for the terminal but receives no response, the terminal is in a power saving mode (PSM), or the terminal is in a mobile initiated connection only (MICO) mode, the MME directly activates a monitoring event. However, in an architecture of a fifth-generation (5G) mobile communications system, session management, access, and mobility management are separately controlled by different function entities. In this architecture, how a network configures a corresponding terminal event and activates the reported event is a problem that has not been resolved currently.

SUMMARY

This application provides a communications method and apparatus to subscribe to a terminal event in a 5G architecture.

According to a first aspect, a communications method is provided, and includes determining a session management function (SMF) entity based on at least one of a data network name (DNN), slice information, and an application function service identifier, and sending a first message to the session management function entity, where the first message is used to subscribe to a terminal event, the first message includes service description information, and the service description information is used to indicate a service corresponding to the terminal event.

In this aspect, the terminal event is subscribed to from the session management function entity that manages a specific service, and the session management function entity manages a network configuration subsequent to the terminal event. In this way, a terminal event may be subscribed to and monitored for a specific service in a 5G architecture.

With reference to the first aspect, in a first possible implementation, the service description information is further used to determine an application function entity that provides a service for a terminal.

In this implementation, one or more application function entities may provide a service for a terminal. When subscribing to a terminal event, service description information is used to indicate the service corresponding to the terminal event such that the application function entities that subscribe to the terminal event can be distinguished from each other.

With reference to the first aspect or the first possible implementation of the first aspect, in a second possible implementation, the first message further includes an event correlation identifier and event type information of the terminal event, the event correlation identifier is used to identify a correlation relationship between the terminal event and a function entity that subscribes to the terminal event, and the event type information is used to identify the terminal event.

In this implementation, when the terminal event is subscribed to from the session management function entity, the event correlation identifier and the event type information are carried. A function entity that subscribes to the terminal event may be identified based on the event correlation identifier, and an event type of the terminal event may be identified based on the event type information.

With reference to the first aspect or the first possible implementation of the first aspect, in a third possible implementation, the method further includes sending a second message to an access and mobility management function (AMF) entity, where the second message is used to subscribe to the terminal event, the second message includes an event correlation identifier and event type information of the terminal event, the event correlation identifier is used to identify a correlation relationship between the terminal event and a function entity that subscribes to the terminal event, and the event type information is used to identify the terminal event.

In this implementation, when the terminal event is subscribed to from the AMF entity, the event correlation identifier and the event type information are carried. A function entity that subscribes to the terminal event may be identified based on the event correlation identifier, and an event type of the terminal event may be identified based on the event type information.

With reference to the first aspect, the first possible implementation of the first aspect, the second possible implementation of the first aspect, or the third possible implementation of the first aspect, in a fourth possible implementation, the method further includes receiving a third message from the application function entity, where the third message is used to subscribe to the terminal event, and the third message includes the service description information.

In this implementation, the application function entity may subscribe to the terminal event from a control function entity, when subscribing to the terminal event, the application function entity indicates, using the service description information, the service corresponding to the terminal event, to distinguish between third-party applications that subscribe to the terminal event. The control function entity may be a network exposure function (NEF) entity, a unified data management (UDM) function entity, or a policy control function (PCF) entity.

With reference to the fourth possible implementation of the first aspect, in a fifth possible implementation, the third message further includes at least one of the following information an identifier of the terminal corresponding to the terminal event, the event type information of the terminal event, the DNN, the slice information, and the application function service identifier.

With reference to the fourth possible implementation of the first aspect or the fifth possible implementation of the first aspect, in a sixth possible implementation, the receiving a third message from the application function entity includes receiving the third message forwarded by the network exposure function entity.

With reference to the fourth possible implementation of the first aspect, the fifth possible implementation of the first aspect, or the sixth possible implementation of the first aspect, in a seventh possible implementation, the method further includes sending at least one of the service description information, the event correlation identifier, the identifier of the terminal, the event type of the terminal event, the DNN, the slice information, and the application function service identifier to a unified data repository (UDR) function entity for storage.

In this implementation, the unified data repository function entity may store all information related to the subscribed terminal event.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, or the seventh possible implementation of the first aspect, in an eighth possible implementation, the method further includes obtaining at least one of the service description information, the event correlation identifier, the identifier of the terminal, the event type information of the terminal event, the DNN, the slice information, and the application function service identifier locally or from the unified data repository function entity.

With reference to the fourth possible implementation of the first aspect, the fifth possible implementation of the first aspect, the sixth possible implementation of the first aspect, the seventh possible implementation of the first aspect, or the eighth possible implementation of the first aspect, in a ninth possible implementation, the method further includes receiving the terminal event notification from the AMF entity or the session management function entity, and sending the terminal event notification to the application function entity.

In this implementation, when the terminal event is detected, the AMF entity or the session management function entity notifies the network exposure function entity, and then the network exposure function entity notifies the application function entity that the terminal event is detected.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, the eighth possible implementation of the first aspect, or the ninth possible implementation of the first aspect, in a tenth possible implementation, the event type of the terminal event includes an event of terminal availability after DDN failure.

Correspondingly, according to a second aspect, a communications apparatus is provided. The communications apparatus has a function of implementing behavior of a communications apparatus in the foregoing method. The function may be implemented by hardware, or may be implemented by hardware executing corresponding software. The hardware or the software includes one or more modules corresponding to the foregoing function.

In a possible implementation, the communications apparatus includes a processing unit configured to determine a session management function entity based on at least one of a DNN, slice information, and an application function service identifier, and a sending unit configured to send a first message to the session management function entity, where the first message is used to subscribe to a terminal event, the first message includes service description information, and the service description information is used to indicate a service corresponding to the terminal event.

In another possible implementation, the communications apparatus includes a processor, where the processor is configured to be coupled to a memory, and read and execute an instruction in the memory, to implement the foregoing method.

Based on a similar concept, for principles and beneficial effects of the apparatus for resolving a problem, refer to the foregoing possible method implementations of the communications apparatus and beneficial effects that are brought. Therefore, for implementation of the apparatus, refer to the implementation of the method. Repeated parts are not described again.

According to a third aspect, a communications method is provided, and includes receiving a first message sent by a session management function entity, where the first message is used to subscribe to a terminal event, monitoring the subscribed terminal event, and when the terminal event is detected, sending a terminal event notification to a function entity that subscribes to the terminal event, where the terminal event notification includes at least one of the following information an identifier of a terminal corresponding to the terminal event and an event correlation identifier of the terminal event, where the event correlation identifier is used to identify a correlation relationship between the terminal event and the function entity that subscribes to the terminal event.

In this aspect, an AMF entity may receive subscription of the terminal event from the session management function entity, and send, when the terminal event is detected, the terminal event notification to the function entity that subscribes to the terminal event. In this way, a terminal event may be subscribed to and monitored in a 5G architecture.

Correspondingly, according to a fourth aspect, a communications apparatus is provided. The communications apparatus has a function of implementing behavior of a communications apparatus in the foregoing method. The function may be implemented by hardware, or may be implemented by hardware executing corresponding software. The hardware or the software includes one or more modules corresponding to the foregoing function.

In a possible implementation, the communications apparatus includes a receiving unit configured to receive a first message sent by a session management function entity, where the first message is used to subscribe to a terminal event, a monitoring unit configured to monitor the subscribed terminal event, and a sending unit configured to, when the monitoring unit detects the terminal event, send a terminal event notification to a function entity that subscribes to the terminal event, where the terminal event notification includes at least one of the following information an identifier of a terminal corresponding to the terminal event and an event correlation identifier of the terminal event, where the event correlation identifier is used to identify a correlation relationship between the terminal event and a function entity that subscribes to the terminal event.

In another possible implementation, the communications apparatus includes a processor, where the processor is configured to be coupled to a memory, and read and execute an instruction in the memory, to implement the foregoing method.

Based on a similar concept, for principles and beneficial effects of the apparatus for resolving a problem, refer to the foregoing possible method implementations of the communications apparatus and beneficial effects that are brought. Therefore, for implementation of the apparatus, refer to the implementation of the method. Repeated parts are not described again.

According to a fifth aspect, a communications method is provided, and includes receiving a notification that is for monitoring a terminal reachability event and that is sent by a session management function entity or a control function entity, monitoring the terminal reachability event, and sending a terminal reachability notification to the session management function entity or the control function entity when the terminal reachability event is detected, where the terminal reachability notification is used to monitor an event of terminal availability after DDN failure.

In this aspect, the session management function entity may monitor the event of terminal availability after DDN failure. When detecting that a terminal is reachable, an AMF entity notifies the session management function entity, to activate the session management function entity to monitor the event of terminal availability after DDN failure. In this way, a terminal event may be subscribed to and monitored in a 5G architecture.

Correspondingly, according to a sixth aspect, a communications apparatus is provided. The communications apparatus has a function of implementing behavior of a communications apparatus in the foregoing method. The function may be implemented by hardware, or may be implemented by hardware executing corresponding software. The hardware or the software includes one or more modules corresponding to the foregoing function.

In a possible implementation, the communications apparatus includes a receiving unit configured to receive a notification that is for monitoring a terminal reachability event and that is sent by a session management function entity, a monitoring unit configured to monitor the terminal reachability event, and a sending unit configured to send a terminal reachability notification to the session management function entity when the monitoring unit detects the terminal reachability event, where the terminal reachability notification is used to monitor an event of terminal availability after DDN failure.

In another possible implementation, the communications apparatus includes a processor, where the processor is configured to be coupled to a memory, and read and execute an instruction in the memory, to implement the foregoing method.

Based on a similar concept, for principles and beneficial effects of the apparatus for resolving a problem, refer to the foregoing possible method implementations of the communications apparatus and beneficial effects that are brought. Therefore, for implementation of the apparatus, refer to the implementation of the method. Repeated parts are not described again.

According to a seventh aspect, a communications method is provided, and includes instructing a user plane function (UPF) entity to detect a service, where the service is a service corresponding to a subscribed terminal event, receiving a service detection notification sent by the UPF entity, where the service detection notification is used to indicate occurrence of the service data, and sending, in response to the service detection notification, a notification that is for monitoring the terminal event to an AMF entity or a control function entity.

In this aspect, the terminal event is subscribed to from a session management function entity that manages a specific service, when receiving the service detection notification from the UPF entity, the session management function entity instructs the AMF entity to monitor the terminal event. In this way, a terminal event may be subscribed to and monitored for a specific service in a 5G architecture.

With reference to the seventh aspect, in a first possible implementation, the instructing a UPF entity to detect a service includes instructing the UPF entity to detect the service when the UPF entity does not store access network tunnel information or downlink user plane tunnel information for transmitting the service data, or instructing the UPF entity to perform service detection notification when the UPF entity does not store access network tunnel information or downlink user plane tunnel information for transmitting the service data.

With reference to the seventh aspect or the first possible implementation of the seventh aspect, in a second possible implementation, the method further includes receiving a first message sent by the control function entity, where the first message is used to indicate the service, and the first message includes service description information of the service.

In this implementation, subscription of the terminal event is received from the control function entity, when the terminal event is subscribed to, the service description information is used to indicate a service corresponding to the terminal event, to distinguish between third-party applications that subscribe to the terminal event.

With reference to the second possible implementation of the seventh aspect, in a third possible implementation, the first message is further used to subscribe to the terminal event, the first message includes an event correlation identifier and event type information of the terminal event, the event correlation identifier is used to identify a correlation relationship between the terminal event and a function entity that subscribes to the terminal event, and the event type information is used to identify the terminal event.

In this implementation, when the terminal event is subscribed to from the session management function entity, the event correlation identifier and the event type information are carried. A function entity that subscribes to the terminal event may be identified based on the event correlation identifier, and an event type of the terminal event may be identified based on the event type information.

With reference to the third possible implementation of the seventh aspect, in a fourth possible implementation, the terminal event includes an event of terminal availability after DDN failure, and the method further includes receiving a terminal reachability notification or a notification on an event of terminal availability after DDN failure that is sent by the AMF entity, and sending the notification on terminal availability after DDN failure to a network exposure function entity or an application function entity.

With reference to the seventh aspect or the first possible implementation of the seventh aspect, in a fifth possible implementation, the method further includes receiving a first message sent by a local session management function entity, where the first message is used to indicate the service, and the first message includes service description information of the service.

In this implementation, in a roaming scenario, subscription to the terminal event from the local session management function entity is received, when the terminal event is subscribed to, a service corresponding to the terminal event is indicated by the service description information, to distinguish between third-party applications that subscribe to the terminal event.

Correspondingly, according to an eighth aspect, a communications apparatus is provided. The communications apparatus has a function of implementing behavior of a communications apparatus in the foregoing method. The function may be implemented by hardware, or may be implemented by hardware executing corresponding software. The hardware or the software includes one or more modules corresponding to the foregoing function.

In a possible implementation, the communications apparatus includes a sending unit configured to instruct a UPF entity to detect a service, where the service is a service corresponding to a subscribed terminal event, and a receiving unit configured to receive a service detection notification sent by the UPF entity, where the service detection notification is used to indicate occurrence of the service data, where the sending unit is further configured to send, in response to the service detection notification, a notification that is for monitoring the terminal event to an AMF entity.

In another possible implementation, the communications apparatus includes a processor, where the processor is configured to be coupled to a memory, and read and execute an instruction in the memory, to implement the foregoing method.

Based on a similar concept, for principles and beneficial effects of the apparatus for resolving a problem, refer to the foregoing possible method implementations of the communications apparatus and beneficial effects that are brought. Therefore, for implementation of the apparatus, refer to the implementation of the method. Repeated parts are not described again.

According to a ninth aspect, a communications method is provided, and includes receiving a first message sent by a session management function entity, where the first message is used to instruct to detect a service, and the service is a service corresponding to a subscribed terminal event, detecting the service based on the first message, and sending a service detection notification to the session management function entity, where the service detection notification is used to indicate occurrence of the service data.

In this aspect, when receiving the service data, based on a service detection indication of the session management function entity, the service corresponding to the subscribed terminal event is detected, and the session management function entity is notified. In this way, a terminal event may be subscribed to and monitored in a 5G architecture.

With reference to the ninth aspect, in a first possible implementation, the detecting the service based on the first message includes detecting the service based on the first message when access network tunnel information for transmitting the service data is not stored.

Correspondingly, according to a tenth aspect, a communications apparatus is provided. The communications apparatus has a function of implementing behavior of a communications apparatus in the foregoing method. The function may be implemented by hardware, or may be implemented by hardware executing corresponding software. The hardware or the software includes one or more modules corresponding to the foregoing function.

In a possible implementation, the communications apparatus includes a receiving unit configured to receive a first message sent by a session management function entity, where the first message is used to instruct to detect a service, and the service is a service corresponding to a subscribed terminal event, a detection unit configured to detect the service based on the first message, and a sending unit configured to send a service detection notification to the session management function entity, where the service detection notification is used to indicate occurrence of the service data.

In another possible implementation, the communications apparatus includes a processor, where the processor is configured to be coupled to a memory, and read and execute an instruction in the memory, to implement the foregoing method.

Based on a similar concept, for principles and beneficial effects of the apparatus for resolving a problem, refer to the foregoing possible method implementations of the communications apparatus and beneficial effects that are brought. Therefore, for implementation of the apparatus, refer to the implementation of the method. Repeated parts are not described again.

According to an eleventh aspect, a communications method is provided, and includes instructing a UPF entity to detect a service, where the service is a service corresponding to a terminal event subscribed to by a first application function entity, receiving a service detection notification sent by the UPF entity, where the service detection notification is used to indicate that data of the service is detected, when a terminal is unreachable, monitoring the terminal event based on the service detection notification, and when the terminal event is detected, sending a terminal event notification to a network exposure function entity or the first application function entity.

In this aspect, a session management function entity instructs the UPF entity to detect a specific service, when the terminal is unreachable, the session management function entity monitors the terminal event based on the service detection notification sent by the UPF entity, and sends the terminal event notification when detecting the terminal event. In this way, a terminal event for a specific service may be subscribed to and notified of in a 5G architecture.

With reference to the eleventh aspect, in a first possible implementation, the terminal event includes an event of terminal availability after DDN failure or a terminal reachability event.

With reference to the first possible implementation of the eleventh aspect, in a second possible implementation, the detecting the terminal event is receiving a terminal reachability event notification or a notification on the event of terminal availability after downlink data sending failure that is sent by the AMF entity.

With reference to the eleventh aspect or the first possible implementation of the eleventh aspect or the second possible implementation of the eleventh aspect, in a third possible implementation, the method further includes, before a notification on downlink data sending failure sent by the AMF entity is received or the service is detected, determining that the terminal is unreachable if an unreachability notification sent by the AMF entity is received.

In this implementation, that the terminal is unreachable may be that a downlink data failure notification sent by the AMF is received, or may be that an SMF receives an unreachability notification from the AMF when another application function entity sends service data.

With reference to the third possible implementation of the eleventh aspect, in a fourth possible implementation, the method further includes receiving a first message sent by a local session management function entity, where the first message is used to indicate the service and instruct to subscribe to the terminal event, and the first message includes service description information of the service and an event correlation identifier and event type information of the terminal event, where the event correlation identifier is used to identify a correlation relationship between the terminal event and a function entity that subscribes to the terminal event, and the event type information is used to identify the terminal event.

In this implementation, in a roaming scenario, the session management function entity accessing a network may monitor the terminal event.

Correspondingly, according to a twelfth aspect, a communications apparatus is provided. The communications apparatus has a function of implementing behavior of a communications apparatus in the method in the eleventh aspect. The function may be implemented by hardware, or may be implemented by hardware executing corresponding software. The hardware or the software includes one or more modules corresponding to the foregoing function.

In a possible implementation, the communications apparatus includes an instruction unit configured to instruct a UPF entity to detect a service, where the service is a service corresponding to a terminal event subscribed to by a first application function entity, a receiving unit configured to receive a service detection notification sent by the UPF entity, where the service detection notification is used to indicate that data of the service is detected, a monitoring unit configured to, when a terminal is unreachable, monitor the terminal event based on the service detection notification, and a sending unit configured to, when the terminal event is detected, send a terminal event notification to a network exposure function entity or the first application function entity.

In another possible implementation, the communications apparatus includes a processor, where the processor is configured to be coupled to a memory, and read and execute an instruction in the memory, to implement the foregoing method.

Based on a similar concept, for principles and beneficial effects of the apparatus for resolving a problem, refer to the foregoing possible method implementations of the communications apparatus and beneficial effects that are brought. Therefore, for implementation of the apparatus, refer to the implementation of the method. Repeated parts are not described again.

According to a thirteenth aspect, a communications method is provided, and includes receiving a first message that is for a terminal event and that is sent by a control function entity, where the first message is used to subscribe to the terminal event, and the first message includes service description information and a DNN/single network slice selection assistance information (S-NSSAI), sending a second message to a session management function entity, where the second message is used to subscribe to a service detection event, and the second message includes the service description information, receiving a service detection notification from the session management function entity, activating the terminal event when a terminal is unreachable, and sending a terminal reachability notification to a capability exposure node or an application function entity when detecting that the terminal is reachable.

In an implementation, the sending a second message to a session management function entity includes sending the second message to the session management function entity when a DNN/S-NSSAI of a session is the same as the DNN/S-NSSAI included in the first message.

In another implementation, the sending a second message to a session management function entity includes sending a subscription request to a local session management function entity or a roaming session management function entity, or sending a session context update request to a local session management function entity or a roaming session management function entity, where the session context update request is used to subscribe to the terminal event.

According to a fourteenth aspect, a communications method is provided, and includes receiving a second message for a terminal event from a mobility management function entity AMF, sending a third message to a UPF entity, where the third message is used to instruct to detect a service, and the service is a service corresponding to the subscribed terminal event, receiving a service detection notification from the UPF entity, where the service detection notification is used to indicate occurrence of the service data, and sending the service detection notification to the mobility management function entity.

In an implementation, the receiving a second message for a terminal event from a mobility management function entity includes receiving a session context update request from the mobility management function entity, where the session context update request is used to subscribe to the terminal event.

In another implementation, the sending a third message to a UPF entity includes sending the third message to the UPF entity during or after protocol data unit (PDU) session deactivation, where the third message is used to instruct to detect the service, and the service is the service corresponding to the subscribed terminal event.

According to a fifteenth aspect, a communications method is provided, and includes receiving a first message from a control function entity, where the first message is used to subscribe to a terminal event, the first message includes service description information, and the service description information is used to indicate a service corresponding to the terminal event, receiving service information from a UPF entity UPF, where the service information is determined based on a downlink data packet, and sending event correlation information to a MME or a capability exposure entity based on at least the service information, where the event correlation information is used to determine event reporting information.

In an implementation, before the receiving service information from a UPF entity, the method includes sending a service information request to the UPF entity.

In another implementation, the sending a service information request to the UPF entity includes sending the service information request to the UPF entity in case of a DDN failure.

In still another implementation, the sending event correlation information to a MME or a capability exposure entity, where the event correlation information is used to determine event reporting information, includes sending the event correlation information to the MME or the capability exposure entity based on the service description information and the service information, where the event correlation information is used to determine event reporting information.

Correspondingly, according to a sixteenth aspect, a communications apparatus is provided. The communications apparatus has a function of implementing behavior of a communications apparatus in the method according to any one of the thirteenth aspect to the fifteenth aspect or the implementations thereof. The function may be implemented by hardware, or may be implemented by hardware executing corresponding software. The hardware or the software includes one or more modules corresponding to the foregoing function.

In a possible implementation, the communications apparatus includes an instruction unit configured to instruct a UPF entity to detect a service, where the service is a service corresponding to a terminal event subscribed to by a first application function entity, a receiving unit configured to receive a service detection notification sent by the UPF entity, where the service detection notification is used to indicate that data of the service is detected, a monitoring unit configured to, when a terminal is unreachable, monitor the terminal event based on the service detection notification, and a sending unit configured to, when the terminal event is detected, send a terminal event notification to a network exposure function entity or the first application function entity.

In another possible implementation, the communications apparatus includes a processor, where the processor is configured to be coupled to a memory, and read and execute an instruction in the memory, to implement the foregoing method.

Based on a similar concept, for principles and beneficial effects of the apparatus for resolving a problem, refer to the foregoing possible method implementations of the communications apparatus and beneficial effects that are brought. Therefore, for implementation of the apparatus, refer to the implementation of the method. Repeated parts are not described again.

According to a seventeenth aspect, a computer-readable storage medium is provided. The computer-readable storage medium stores an instruction. When the instruction is run on a computer, the computer is enabled to perform the method according to the foregoing aspects or the implementations thereof.

According to an eighteenth aspect, a computer program product including an instruction is provided. When the computer program product is run on a computer, the computer is enabled to perform the method according to the foregoing aspects or the implementations thereof.

BRIEF DESCRIPTION OF THE DRAWINGS

To describe the technical solutions in the embodiments of this application or in the background more clearly, the following briefly describes the accompanying drawings required for describing the embodiments of this application or the background.

FIG. 7C and FIG. 7D are a schematic flowchart of another example of a communications method.

FIG. 7J to FIG. 7L are a schematic flowchart of still another example of a communications method.

FIG. 14A to FIG. 14K are schematic flowcharts of still another example of a communications method.

DETAILED DESCRIPTION

The following describes the embodiments of this application with reference to the accompanying drawings in the embodiments of this application.

Figure 1:
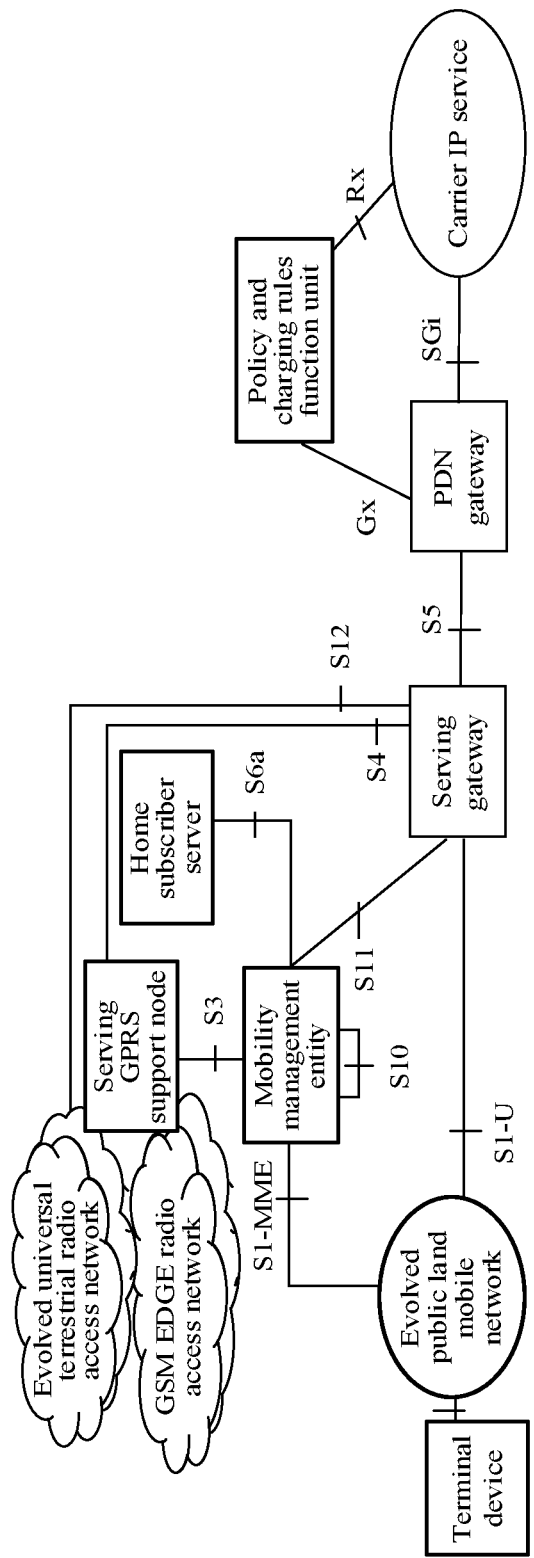
FIG. 1 is a schematic diagram of an existing EPS non-roaming architecture.
Figure 3A:
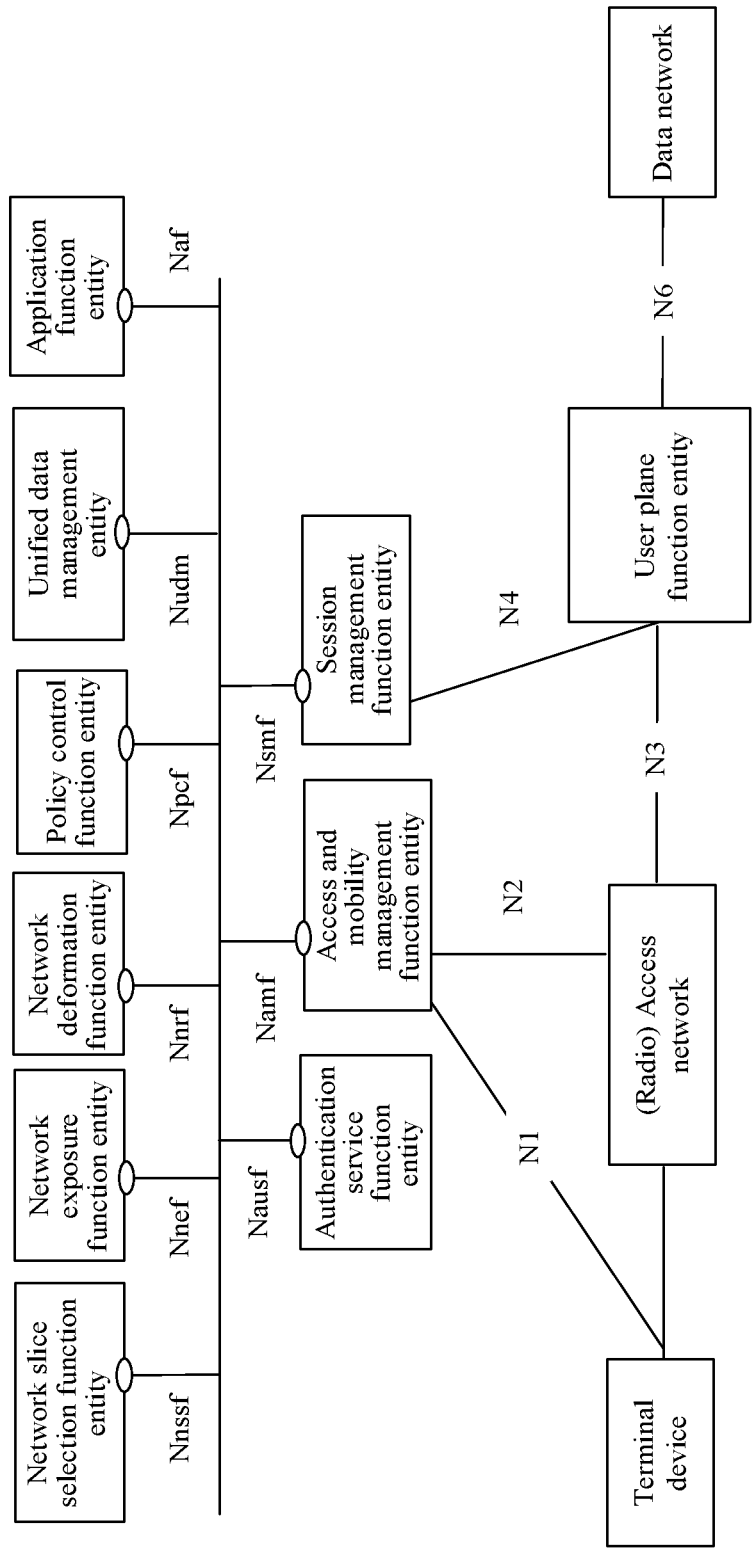
FIG. 3A is a schematic diagram of a non-roaming architecture based on a service-based interface in 5G.
Figure 3B:
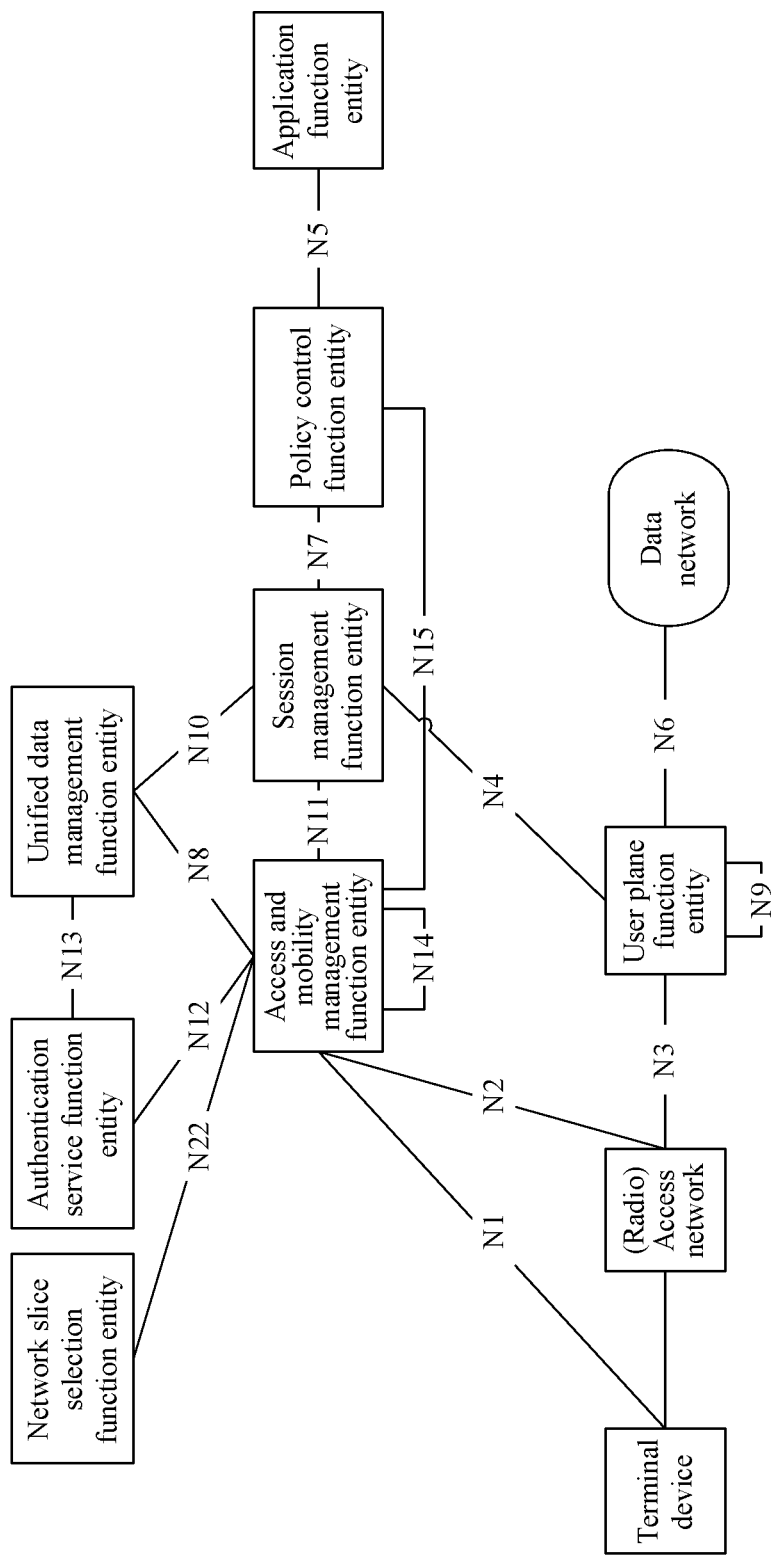
FIG. 3B is a schematic diagram of a non-roaming architecture based on a reference point in 5G.

The technical solutions of this application may be applied to the non-roaming architecture of the EPS network shown in FIG. 1, or may be applied to a roaming architecture of the EPS network, or may be applied to a non-roaming architecture and a roaming architecture of a next generation network, for example, the non-roaming architecture based on the service-based interface in the fifth generation mobile communications network shown in FIG. 3A and the non-roaming architecture based on the reference point in 5G shown in FIG. 3B.

Using the architectures of the 5G communications system shown in FIG. 3A and FIG. 3B as an example, the communications system mainly includes an AMF entity, a SMF entity, a UPF entity, a NEF entity, and an AF entity, and may further include a PCF entity, a UDR function entity, and a UDM function entity. It should be noted that, the functional entities and functions of the function entities included in FIG. 3A may be the same as those in FIG. 3B. In FIG. 3A, because the architecture is based on the service-based interface, a message sent by a function entity to another function entity needs to carry an identifier of the other function entity. In FIG. 3B, because the architecture is based on the reference point, a message between function entities is an interface message, and does not need to carry an identifier of a function entity.

The functions of the functional entities in FIG. 3A and FIG. 3B are as follows.

AMF entity is mainly responsible for signaling processing, for example, functions such as access control, mobility management, attachment and detachment, and gateway selection. When providing a service for a session in a terminal, the AMF entity provides a control plane storage resource for the session, to store a session identifier, an SMF entity identifier correlated with the session identifier, and the like.

SMF entity is mainly responsible for session management, and further responsible for selection of a UPF entity, redirection of the UPF entity, Internet Protocol (IP) address assignment, bearer setup, modification, and release, and control of quality of service (QoS).

UPF entity is responsible for forwarding and receiving of user data in a terminal. The UPF entity may receive user data from a data network, and transmit the user data to a terminal using an access network device. Alternatively, the UPF entity may receive user data from a terminal using an access network device, and forward the user data to a data network. Resource transmission and scheduling functions in the UPF entity that are used to provide a service for a terminal are managed and controlled by the SMF entity.

NEF entity is mainly supports secure interaction between a 3GPP network and a third-party application. The NEF can securely open a network capability and an event to a third-party application, to enhance or improve application service quality. The 3GPP network can also securely obtain related data from the third-party application, to enhance smart decision-making of the network. In addition, the function entity supports recovery of structured data from the UDR or storage of structured data in the UDR.

AF entity mainly supports interaction with the 3GPP network to provide a service, for example, affecting data routing decision, a PCF, or providing some services for a network side (where these services may be performed by a third party (3rd party), or may not be performed by a third party).

PCF entity mainly supports providing of a unified policy framework to control network behavior, and providing of a policy rule for a control layer network function, and responsible for obtaining user subscription information related to policy decision.

UDR entity is mainly responsible for storing structured data. Stored content includes subscription data, policy data, externally exposed structured data, and application-related data.

UDM entity is mainly configured to manage user subscription information.

It should be noted that the foregoing function entities are merely names, and the names do not constitute any limitation on the entities. For example, the session management function entity may alternatively be replaced with "session management function" or another name. The session management function entity may also correspond to an entity that includes another function in addition to a session management function. The UPF entity may alternatively be replaced with "user plane function" or another name. The UPF entity may also correspond to an entity that includes another function in addition to a UPF. These descriptions are provided herein, and are not provided below again.

A terminal accesses a network using a radio access network (RAN) device or an access network (AN) device. The RAN device is mainly a wireless network device in the 3GPP network, and the AN may be an access network device defined in the non-3GPP.

In this application, the terminal may be user equipment (UE), a handheld terminal, a notebook computer, a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, or another device that can access a network.

The terminal may communicate with the RAN device using an air interface technology. The RAN device is mainly responsible for functions on an air interface side, such as radio resource management, QoS management, and data compression and encryption. The access network may include a macro base station, a micro base station (also referred to as a small cell), a relay station, an access point, and the like in various forms. In systems that use different radio access technologies, names of a device that has a base station function may be different. For example, in a long term evaluation (LTE) system, the device is referred to as an evolved NodeB (eNB), and in a 3rd generation (3G) system, the device is referred to as a NodeB, or the like.

The AN device allows interconnection and interworking between the terminal and a 3GPP core network using a non-3GPP technology. For example, the non-3GPP technology is WI-FI, worldwide interoperability for microwave access (wWiMAX), code division multiple access (CDMA), or the like.

In this application, that a terminal is in an unavailable state means that a network initiates paging for the terminal but receives no response, the terminal is in a PSM mode, the terminal is in an MICO mode, and so on. In the PSM mode, the terminal is allowed to reduce an energy loss, and cannot immediately be reachable to receive service data that is sent to the terminal. In the MICO mode, only the terminal is allowed to initiate a connection. When the terminal is in this mode and the terminal is in an idle state, a network considers that the terminal is unreachable.

In this application, a DDN failure may be that the network detects that the terminal is in an unavailable state, or a data priority (that is, an allocation and retention priority (ARP) for triggering DDN is not higher than a previous data priority for triggering DDN.

In this application, a terminal event may be an event that various types of statuses or information need to be obtained from a network. For example, the technical solutions of this application may be applied to a high-latency communication scenario, and the terminal event may be an event of terminal availability after DDN failure. The application function entity providing a high-latency communication service can support service communication with a low latency requirement by subscribing to an event of terminal availability after DDN failure. The terminal event may be alternatively a terminal reachability event, or the like. The application function entity installs a related application to provide a corresponding service. Subscription to a terminal event is subscribing to an event notification or modifying a subscribed event using a service operation.

It should be noted that the terms "system" and "network" may be used interchangeably in the embodiments of this application. "A plurality of" means two or more than two. In view of this, in the embodiments of this application, "a plurality of" may also be understood as "at least two". The term "and/or" describes a correlation relationship for describing associated objects and represents that three relationships may exist. For example, A and/or B may represent the following three cases. Only A exists, both A and B exist, and only B exists. In addition, the character "/" generally indicates an "or" relationship between the associated objects.

The embodiments of this application provide a communications method and apparatus. A terminal event is subscribed to from a session management function entity that manages a specific service, when receiving a service detection notification from a UPF entity, the session management function entity instructs an AMF entity to monitor the terminal event. In this way, a terminal event may be subscribed to and monitored for a specific service in a 5G architecture.

In this application, subscribing to a terminal event from a network, activating the terminal event, and performing terminal event notification mainly include two procedures.

(1) First, an application function entity having an application installed configures a terminal event for the network. There may be the following several configuration methods. The AF configures an event for a UDM/PCF using an NEF, the AF configures an event for a UDR using the PCF, the AF configures an event for the UDR using the NEF, and so on. Detailed descriptions are provided below.

(2) The network activates the terminal event and notifies the terminal event. The following provides descriptions using a detailed communications method procedure.

Figure 4:
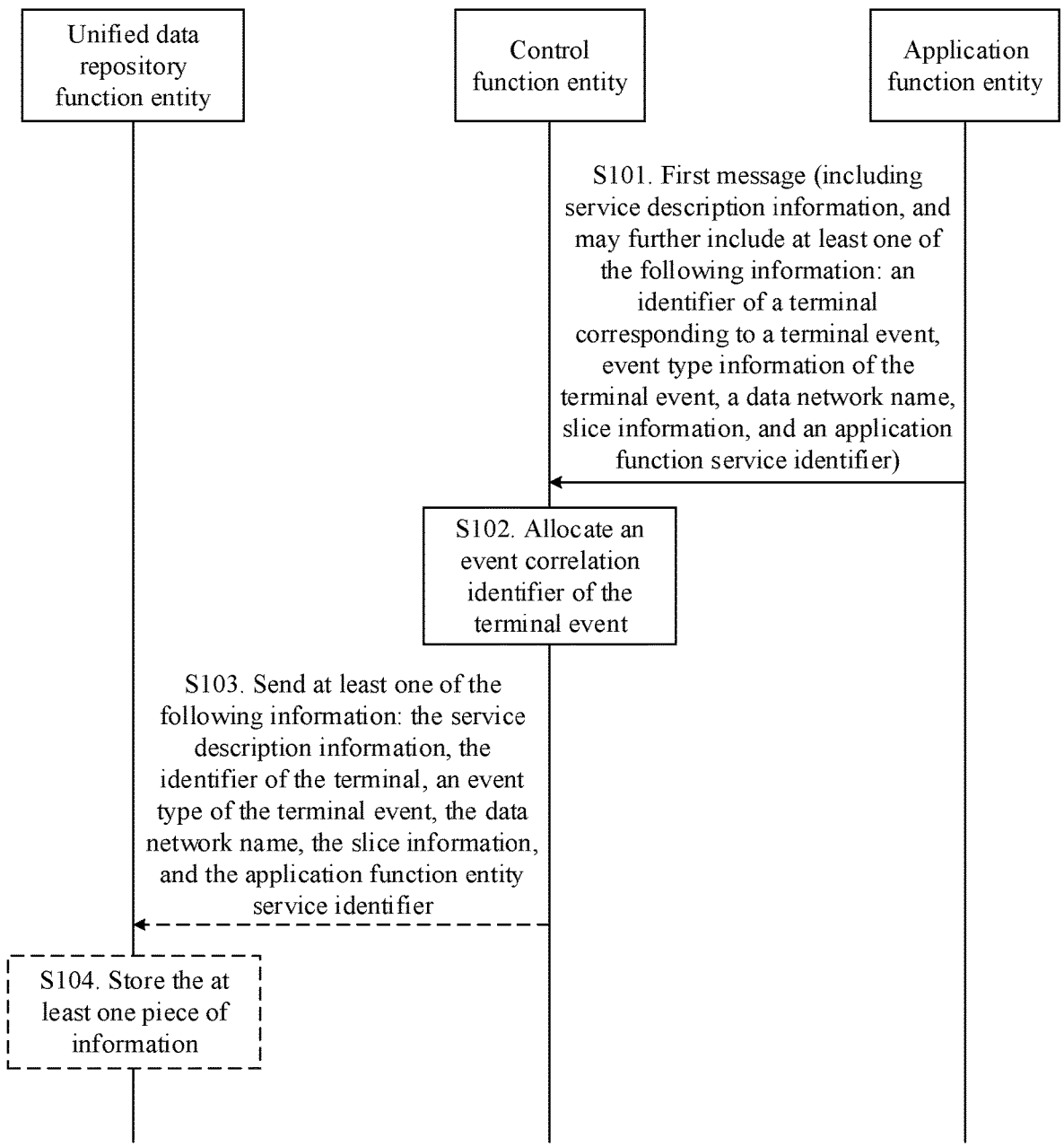
FIG. 4 is a schematic flowchart for configuring, by an application function entity, subscription of a terminal event for a network according to an embodiment of this application.

Specifically, FIG. 4 is a schematic flowchart for configuring, by an application function entity, subscription of a terminal event for a network according to an embodiment of this application. The method may include the following steps.

S101. The application function entity sends a first message to a control function entity. The control function entity receives the first message from the application function entity. The first message is used to subscribe to a terminal event, and the first message includes service description information.

The first message further includes at least one of the following information an identifier of a terminal corresponding to the terminal event, event type information of the terminal event, a DNN, slice information, and an application function service identifier.

S102. The control function entity allocates an event correlation identifier of the terminal event.

S103. Send at least one of the service description information, the event correlation identifier, the identifier of the terminal, an event type of the terminal event, the DNN, the slice information, and the application function service identifier to a unified data repository function entity for storage.

S104. The unified data repository function entity stores at least one piece of the foregoing information.

5G is used as an example in this embodiment. For a service, when a status of the terminal in a process of processing the service needs to be monitored, the application function entity providing the service may send a first message to the control function entity, where the first message is used to subscribe to a terminal event from the network. The control function entity may be a UDM, a PCF, an NEF, or the like. The control function entity receives the first message.

In this embodiment, one or more application function entities may subscribe to the terminal event from the network. The terminal event subscribed to by the plurality of application function entities may correspond to a same service or different services. For example, a plurality of application function entities may subscribe to a same terminal event from a plurality of terminals, or a plurality of application function entities may subscribe to different terminal events from a same terminal.

The first message carries the service description information. The service description information is used to indicate a service corresponding to the terminal event.

The service description information may be description information of service data. For example, the service description information may be any description information that can identify a service of a specific application function entity, such as an IP triplet (a destination IP address/IP version 6 (IPv6) prefix, a port number, an IP upper-layer protocol number (such as a transmission protocol), an application identifier (application ID), a non-IP descriptor, or Ethernet service description information. The destination IP address may be a destination IP version 4 (IPv4) address, a destination IPv6 prefix, or a destination IPv6 address.

A related function entity may distinguish between the plurality of application function entities based on the service description information. In addition, the first message further includes at least one of the following information the identifier of the terminal corresponding to the terminal event, the event type information of the terminal event, the DNN, the slice information, and the application function service identifier (AF-service-ID).

The identifier of the terminal may be a user equipment identifier (UE ID) of a single terminal, or may be a group identifier (group ID) of a plurality of terminals (that is, a group). The terminal identifier may be an identifier used to identify a user, such as a generic public user identifier (GPSI). The group identifier may be an external group identifier.

The terminal event may be an event that various types of statuses or information need to be obtained from the network, or the event type of the terminal event may be various defined terminal events. The event type information is used to identify the terminal event. For example, the technical solutions of this application may be applied to a high-latency communication scenario, and the event type of the terminal event may be an event of terminal availability after DDN failure. For the event of terminal availability after DDN failure, when the application function entity sends a downlink data packet to the terminal through the network, if the terminal is in an unavailable state, the network activates the event, and monitors a status of the terminal. When the terminal enters an available state, the network reports the available state of the terminal to the application function entity using the control function entity. A third-party application can support service communication with a low latency requirement by subscribing to the event of terminal availability after DDN failure. The event type of the terminal event may be alternatively a terminal reachability event, or the like. Alternatively, the event type of the terminal event may be a service detection event, and is used to notify a subscriber from a network when a service occurs. The event type information may be represented using an index number of an event type that is specified in a protocol, and the event type information is pre-stored in a network device and a terminal device.

The DNN is used to identify a data network accessed by a user. The slice information may be a slice instance and/or S-NSSAI. The S-NSSAI or the slice instance is used to select a specific slice network, namely, a network element of a core network, such as an SMF and a UPF. The AF-service-ID is an identifier of an application function service, and a network side may derive the DNN and the slice information based on the identifier.

In addition, the first message may further include a notification target address. The notification target address may be an NEF ID, an AF ID, or an AF address.

The control function entity receives the first message, and processes the first message, including checking, according to a local policy, whether the application function entity is authorized to execute a service request, whether the first message is valid, whether a quantity of times that the application function entity sends a request exceeds a limit or request frequency, and so on. If the check is passed, the control function entity stores the foregoing information, and allocates an event correlation identifier of the terminal event. The event correlation identifier is used to identify a correlation relationship between the terminal event and a function entity that subscribes to the terminal event. The event correlation identifier may also be referred to as a notification correlation ID. Alternatively, the event correlation identifier may be a subscription correlation identifier, and the subscription correlation identifier may be allocated by an AMF or the SMF.

In addition, the notification target address and the notification correlation ID may be used jointly. The notification target address and the notification correlation ID are used to correlate a notification received from an event provider with a subscription. One subscription is related to one independent notification target address and a notification correlation ID.

In addition, if the control function entity is the NEF, and the UDM/PCF configures the terminal event for the network, the control function entity may further send, to the UDM/PCF, a message of subscribing to the terminal event. The message includes service description information, and further includes at least one of the following information the identifier of the terminal corresponding to the terminal event, the event type information of the terminal event, the DNN, the slice information, and the application function service identifier.

Further, that the control function entity checks whether the message is valid includes checking whether the network supports event monitoring, whether the request is to be received, and so on. When the check is passed, the control function entity stores the foregoing information.

Further, the control function entity may send the foregoing information to the UDR, and the UDR stores all of the information.

Specifically, the control function entity sends any one or a combination of any two, three, four, five, six, or seven of the service description information, the event correlation identifier, the identifier of the terminal, the event type information of the terminal event, the DNN, the slice information, or the application function service identifier to the unified data repository function entity for storage.

The following are examples of the configuration.

Example 1. An AF Configures an Event for a UDM/PCF Using an NEF

Figure 5A:
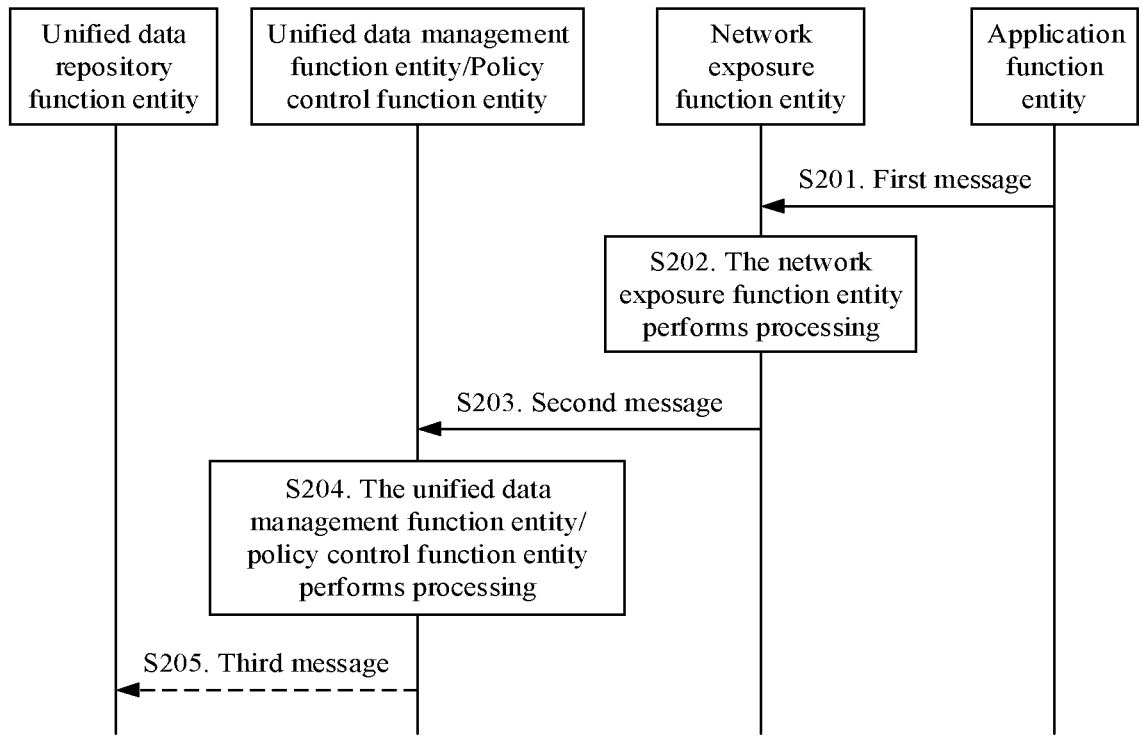
FIG. 5A is a schematic flowchart of an example of configuring, by an AF, subscription of a terminal event for a UDM/PCF using an NEF.

FIG. 5A is a schematic flowchart of an example of configuring, by an AF, subscription of a terminal event for a UDM/PCF using an NEF. The method may include the following steps.

S201. The AF determines to subscribe to an event of "terminal availability after DDN failure" from a network side. The AF sends a first message to the NEF, where the first message is used to subscribe to a terminal event. For example, in the system shown in FIG. 3A, the message may be Nnef_Event Exposure_subscribe. The subscription message includes the following information service description information, a terminal identifier (or a group identifier), an AF identifier, event type information, or a DNN/S-NSSAI/AF-service-ID.

S202. The NEF processes the message, including checking, according to a local policy, whether the AF is authorized to execute the service request, whether the message is valid, whether a quantity of times that the application function entity sends a request exceeds a limit or exceeds request frequency, and so on. If the check is passed, the NEF stores the following information the service description information, the terminal identifier (or the group identifier), the event type information, and the DNN/S-NSSAI/AF-service-ID. In addition, the NEF allocates an event correlation identifier (for example, an NEF reference ID) of the terminal event. The event correlation identifier is used to identify a correlation relationship between the terminal event and a function entity that subscribes to the terminal event. The event type information is used to identify the terminal event. Optionally, the NEF may further store the following information the AF identifier or an AF address. Based on the AF identifier or the AF address, the AF may be found and a message may be sent to the AF.

S203. The NEF sends a second message to the UDM/PCF, where the second message is used to subscribe to the terminal event. For example, in the system shown in FIG. 3A, the message may be Nudm_Event Exposure_subscribe/Npcf_EventExposure_subscribe. The subscription message includes the following information service description information, a terminal identifier (or a group identifier), event type information, an event correlation identifier, and a DNN/S-NSSAI/AF-service-ID. Optionally, the subscription message may further include an AF identifier or an AF address. The event type information is determined based on the event type information provided by the AF, and may indicate a same event type, or a new event type generated for supporting the event that is to be subscribed to by the AF.

In another embodiment, after receiving the event information from the AF, the NEF may send a message to the UDM and the PCF separately. The message sent to the UDM may include a terminal identifier (or a group identifier), event type information, and an event correlation identifier. The message sent to the PCF includes the terminal identifier (or the group identifier), the event type information, the event correlation identifier, service description information, and a DNN/S-NSSAI/AF-service-ID. The event type information is determined based on the event type information provided by the AF, and may indicate a same event type, or a new event type generated for supporting the event that is to be subscribed to by the AF. Optionally, the NEF may map the AF-service-ID to the DNN/S-NSSAI. In this case, stored information is the DNN/S-NSSAI.

S204. The UDM/PCF checks whether the message is valid, including checking whether a network supports event monitoring, whether the request is to be received, and so on. When the check is passed, the UDM/PCF stores the service description information, the terminal identifier (or the group identifier), the AF identifier, the event type information, the event correlation identifier, and the DNN/S-NSSAI/AF-service-ID. If the NEF can send the second message to the UDM and the PCF separately, information stored in the UDM is the terminal identifier (or the group identifier), the AF identifier, the event type information, and the event correlation identifier. The PCF stores the service description information, the terminal identifier (or the group identifier), the AF identifier, the event type information, the event correlation identifier, and the DNN/S-NSSAI. Optionally, the UDM may map the AF-service-ID to the DNN/S-NSSAI. In this case, stored information is the DNN/S-NSSAI.

S205. Further, optionally, the UDM/PCF may send a third message to a UDR, where the third message is used to subscribe to the terminal event. For example, in the system shown in FIG. 3A, the message may be Nudr_EventExposure_subscribe. The UDR stores the foregoing information for subscribing to the terminal event.

Example 2. An AF Configures an Event for a UDR Using a PCF

Figure 5B:
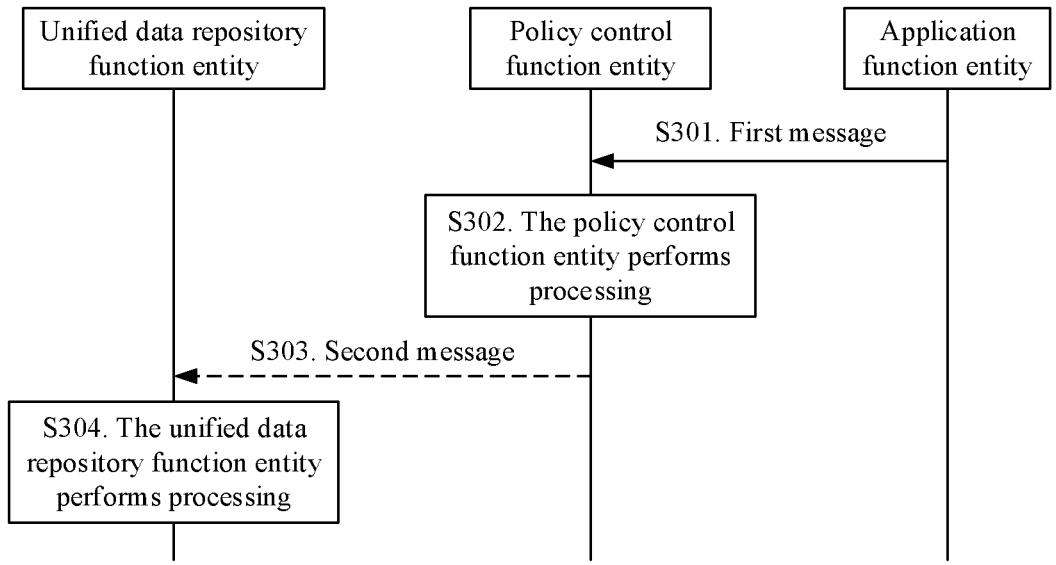
FIG. 5B is a schematic flowchart of an example of configuring, by an AF, subscription of a terminal event for a UDR using a PCF.

FIG. 5B is a schematic flowchart of an example of configuring, by an AF, subscription of a terminal event for a UDR using a PCF. The method may include the following steps.

S301. The AF determines to subscribe to an event of "terminal availability after DDN failure" from a network side. The AF sends a first message to the PCF, where the first message is used to subscribe to a terminal event. For example, in the system shown in FIG. 3A, the message may be Npcf_Event Exposure_subscribe. The subscription message includes the following information service description information, a terminal identifier (or a group identifier), an AF identifier, event type information, and a DNN/S-NSSAI/AF-service-ID.

S302. The PCF processes the message, including checking, according to a local policy, whether the AF is authorized to execute the service request, whether the message is valid, whether a quantity of times that the application function entity sends a request exceeds a limit or exceeds request frequency, and so on. If the check is passed, the PCF stores the following information the service description information, the terminal identifier (or the group identifier), the event type information, and the DNN/S-NSSAI/AF-service-ID. In addition, the PCF allocates an event correlation identifier (for example, a PCF reference ID) corresponding to the terminal event. The event correlation identifier is used to identify a correlation relationship between the terminal event and a function entity that subscribes to the terminal event. The event type information is used to identify the terminal event. Optionally, the subscription message may further include the AF identifier or an AF address.

S303. Further, optionally, the PCF sends a second message to the UDR, where the second message is used to subscribe to the terminal event. For example, in the system shown in FIG. 3A, the message may be Nudr_EventExposure_subscribe. The message includes the following information service description information, a terminal identifier or a group identifier, event type information, a PCF reference ID, and a DNN/S-NSSAI/AF-service-ID. The subscription message may further include an AF identifier or an AF address.

S304. Optionally, the UDR checks whether the message is valid, including checking whether a network supports event monitoring, whether the request is to be received, and so on. When the check is passed, the UDR stores the following information the service description information, the terminal identifier or the group identifier, the event type information, the PCF reference ID, and the DNN/S-NSSAI/AF-service-ID. The UDR may further store the AF identifier or the AF address.

Example 3. An AF Configures an Event for a UDR Using an NEF

Figure 5C:
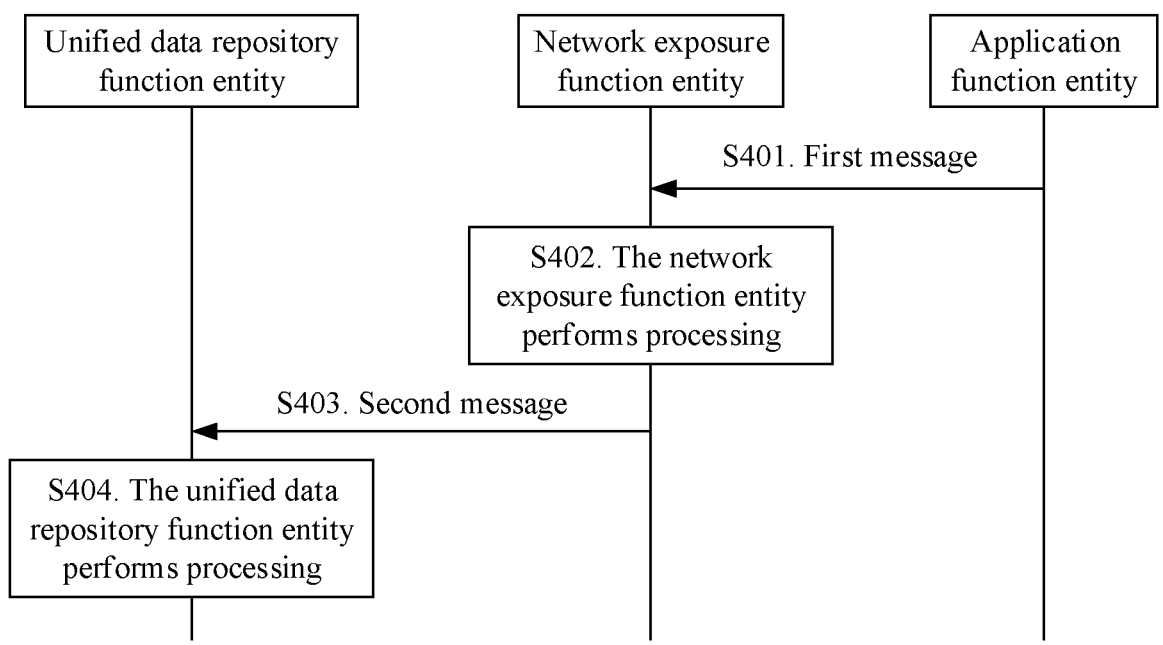
FIG. 5C is a schematic flowchart of an example of configuring, by an AF, subscription of a terminal event for a UDR using an NEF.

FIG. 5C is a schematic flowchart of an example of configuring, by an AF, subscription of a terminal event for a UDR using an NEF. The method may include the following steps.

S401. The AF determines to subscribe to an event of "terminal availability after DDN failure" from a network side. The AF sends a first message to the NEF, where the first message is used to subscribe to a terminal event. For example, in the system shown in FIG. 3A, the message may be Nnef_Event Exposure_subscribe. The message includes the following information service description information, a terminal identifier or a group identifier, an AF identifier, event type information, and a DNN/S-NSSAI/AF-service-ID.

S402. The NEF processes the message, including checking, according to a local policy, whether the AF is authorized to execute the service request, whether the message is valid, whether a quantity of times that the application function entity sends a request exceeds a limit or exceeds request frequency, and so on. If the check is passed, the NEF stores the following information the service description information, the terminal identifier or the group identifier, the event type information, and the DNN/S-NSSAI/AF-service-ID. In addition, the NEF allocates an event correlation identifier (for example, an NEF reference ID) of the terminal event. The event correlation identifier is used to identify a correlation relationship between the terminal event and a function entity that subscribes to the terminal event. The event type information is used to identify the terminal event. The NEF may further store an AF identifier or an AF address.

S403. The NEF sends a second message to the UDR, where the second message is used to subscribe to the terminal event. For example, in the system shown in FIG. 3A, the message may be Nudr_Event Exposure_subscribe. The message includes the following information service description information, a terminal identifier or a group identifier, event type information, an NEF reference ID, and a DNN/S-NSSAI/AF-service-ID. The message may further include an AF identifier or an AF address. The event type information is determined based on the event type information provided by the AF, and may indicate a same event type, or a new event type generated for supporting the event that is to be subscribed to by the AF. Further, optionally, the NEF may generate a plurality of events based on event information sent by the AF, and store the plurality of events in the UDR.

Optionally, the UDR checks whether the message is valid, including checking whether a network supports event monitoring, whether the request is to be received, and so on. When the check is passed, the UDR stores the following information the service description information, the terminal identifier (or the group identifier), the event type information, the NEF reference ID, and the DNN/S-NSSAI/AF-service-ID. The UDR may further store the AF identifier or the AF address.

According to the method in which the application function entity configures, for the network, the subscribed terminal event provided in this embodiment of this application, if a terminal event needs to be subscribed to for a service, the application function entity subscribes to the terminal event from the control function entity in the 5G network. Specifically, when the service is executed, the control function entity subscribes to the terminal event from a specific session management function entity. In this way, a terminal event may be subscribed to and monitored in a 5G architecture.

The following describes in detail a procedure of activating a terminal event and notifying the terminal event by a network.

Figure 6A:
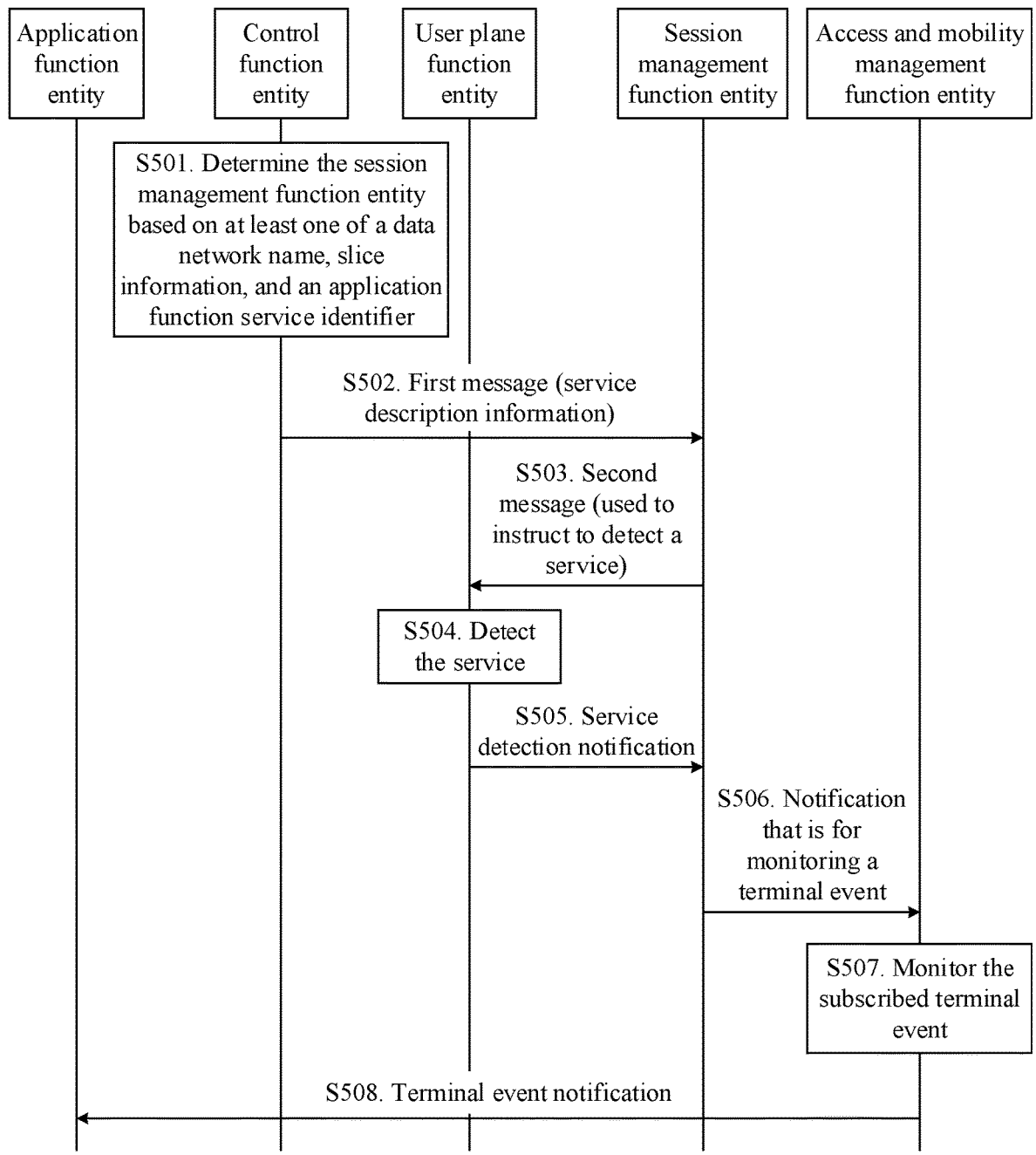
FIG. 6A is a schematic flowchart of a communications method according to an embodiment of this application.

FIG. 6A is a schematic flowchart of a communications method according to an embodiment of this application. The method may include the following steps.

S501. A control function entity determines a session management function entity based on at least one of a DNN, slice information, and an application function service identifier.

Specifically, that a control function entity determines a session management function entity based on at least one of a DNN, slice information, and an application function service identifier may be the control function entity determines the session management function entity based on the DNN, based on the slice information, based on the application function service identifier, based on the DNN and the slice information, based on the DNN and the application function service identifier, based on the slice information and the application function service identifier, or based on the DNN, the slice information, and the application function service identifier.

S502. The control function entity sends a first message to the session management function entity. The first message is used to subscribe to a terminal event, the first message includes service description information, and the service description information is used to indicate a service corresponding to the terminal event.

S503. The session management function entity sends a second message to a UPF entity. The second message is used to instruct the UPF entity to detect a service. The service is the service corresponding to the subscribed terminal event. In addition, in another implementation, the second message may be a service information request, and is used to instruct the UPF entity to report service information. In this case, S504 does not need to be performed. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

S504. Optionally, when the received second message is used to instruct the UPF entity to detect a service, the UPF entity detects the service.

S505. The UPF entity sends a service detection notification to the session management function entity. The service detection notification is used to indicate occurrence of service data. The session management function entity receives the service detection notification. In another implementation, the service detection notification may be service information, that is, the service information in S503. The service information is determined based on the downlink data packet, and further, is determined based on a packet header of the received downlink data packet. For example, when the downlink data packet is an IP data packet, a packet header of the downlink data packet includes IP quintuple information, when the downlink data packet is an Ethernet data packet, a packet header of the downlink data packet includes a media access control (MAC) address.

S506. In response to the service detection notification, the session management function entity sends a notification that is for monitoring the terminal event to an AMF entity. Optionally, the notification that is for monitoring the terminal event may include event correlation information, for example, an event correlation identifier (an NEF reference ID). The event correlation information is used to determine event reporting information. Optionally, the session management function entity sends the event correlation information to the MME based on the service description information and the service information. In other words, the session management function entity compares the service information with the service description information, and sends the event correlation information to the MME when the service information matches the service description information.

S507. The AMF entity monitors the subscribed terminal event.

S508. When detecting the terminal event, the AMF entity sends a terminal event notification to a function entity that subscribes to the terminal event. The terminal event notification includes at least one of the following information an identifier of a terminal corresponding to the terminal event and an event correlation identifier of the terminal event, where the event correlation identifier is used to identify a correlation relationship between the terminal event and the function entity that subscribes to the terminal event. The function entity that subscribes to the terminal event receives the terminal event notification.

5G is still used as an example in this embodiment. Based on the foregoing descriptions, if an AF intends to subscribe to a terminal event from a network, the AF configures subscription of the terminal event for the control function entity. The control function entity or a UDR stores an identifier of a terminal corresponding to the terminal event, event type information of the terminal event, a DNN, slice information, an application function service identifier, service description information, and an event correlation identifier.

When a session is set up, the control function entity (for example, the UDM/PCF) receives a correlation request sent by the SMF, where the correlation request is used to request to perform event subscription on a service corresponding to the session. The request may include a DNN, slice information, or an AF-service-ID. The control function entity obtains, locally or from the UDR, the DNN of the terminal event configured in the foregoing configuration procedure. The control function entity determines that the DNN included in the correlation request is consistent with the DNN of the terminal event configured in the foregoing configuration procedure. Alternatively, the control function entity obtains, locally or from the UDR, the slice information of the terminal event configured in the foregoing configuration procedure, and determines that the slice information used in the correlation request is consistent with the slice information configured in the foregoing configuration procedure (if the request includes the AF-service-ID, the DNN and the slice information may also be deduced using the AF-service-ID). In this case, the control function entity determines the SMF that sends the correlation request, and then sends the first message to the SMF, where the first message is used to subscribe to the terminal event.

Alternatively, after a session is set up, the control function entity receives the terminal event subscribed to by the AF, and determines a session that has a corresponding DNN and corresponding slice information. The control function entity determines the SMF that is correlated with the session corresponding to the DNN and the slice information, and may also actively send the first message to the SMF, to subscribe to the terminal event.

The first message includes the service description information. The service description information is used to indicate the service corresponding to the terminal event, and may be further used to determine the application function entity that provides a service for the terminal.

In addition, the first message may further include the event correlation identifier and the event type information of the terminal event. The event correlation identifier is used to identify the correlation relationship between the terminal event and the function entity that subscribes to the terminal event, and the event type information is used to identify the terminal event. The event correlation identifier may be a reference ID generated by the control function entity in the foregoing configuration process. The reference ID is correlated with the AF ID. The terminal event may be an event that various types of statuses or information need to be obtained from the network, or the event type of the terminal event may be various defined terminal events. For example, the event type of the terminal event includes an event of terminal availability after DDN failure, a terminal reachability event, and the like. Further, the event type may be represented by an event ID. The event ID indicates a type of an event that is being subscribed to, for example, availability after DDN failure.

The SMF receives the first message, and sends the second message to the UPF. The second message is used to instruct the UPF to detect a service. The service is the service corresponding to the subscribed terminal event, that is, a service corresponding to the service description information. The second message may include a corresponding rule delivered by the SMF to the UPF, and the UPF detects the service data based on the rule.

The UPF receives downlink data sent by a data network, and detects, according to a packet detection rule (PDR), for example, a packet filter or an indicator, the service corresponding to the subscribed terminal event. The packet detection rule includes the service description information, for example, an IP triplet.

For example, the rule may be that when the UPF does not store access network tunnel information of the session, the UPF needs to establish a user plane tunnel to send the downlink data to the terminal. In this case, the UPF sends the service detection notification to the SMF. The service detection notification is used to indicate occurrence of the service data. The service data is service data corresponding to the service description information.

In addition, in this embodiment, the service description information may be represented by event filter information. The event filter information is used to determine a condition of matching a notification event. The event filter information includes an event parameter type (event parameter types) and an event parameter value (event parameter value(s)). The event parameter type may be the service description information. The event parameter value may be specific service description information, such as an IP triplet or an application ID.

The SMF receives the service detection notification, and in response to the service detection notification, sends the notification that is for monitoring the terminal event to the AMF.

The AMF detects a status of the terminal.

An example in which the terminal event is an event of terminal availability after DDN failure is used. If detecting that the terminal is in an unavailable state, the AMF or the SMF activates the terminal event, and monitors the subscribed terminal event. That the terminal is in an unavailable state means that the network initiates paging for the terminal but receives no response, the terminal is in a PSM mode, or the terminal is in an MICO mode.

When the AMF detects that the terminal is connected to the network, for example, the terminal initiates a tracking area update (TAU) request or a service request, the AMF sends the terminal event notification to the function entity that subscribes to the terminal event. The terminal event notification includes at least one of the following information the identifier of the terminal corresponding to the terminal event and the event correlation identifier of the terminal event, where the event correlation identifier is used to identify the correlation relationship between the terminal event and the function entity that subscribes to the terminal event. The function entity that subscribes to the terminal event receives the terminal event notification.

If one AF subscribes to a same terminal event from a plurality of terminals, the AF that subscribes to the terminal event may be distinguished based on an identifier of a terminal in a terminal event notification. If a plurality of AFs subscribe to a plurality of terminal events from a same terminal, the AFs that subscribe to the terminal events may be distinguished from each other based on event correlation identifiers in terminal event notifications. If a plurality of AFs subscribe to a plurality of terminal events from a plurality of terminals, the AFs that subscribe to the terminal events may be distinguished from each other based on identifiers of the terminals and event correlation identifiers that are in terminal event notifications. Therefore, one or more application function entities may provide a service for a terminal. When subscribing to a terminal event, service description information is used to indicate the service corresponding to the terminal event such that the application function entities that subscribe to the terminal event can be distinguished from each other.

The function entity that subscribes to the terminal event may be the SMF, the AF, or the NEF.

If the event type of the terminal event is an event of terminal availability after DDN failure, after receiving the terminal event notification (notifying that the terminal is available), the AF may resend the downlink data to the terminal.

The event reporting information may be used to identify information about a reported event. In this embodiment, the event reporting information may be used to describe the event of availability after DDN failure reported by the AMF or the SMF.

Figure 6B:
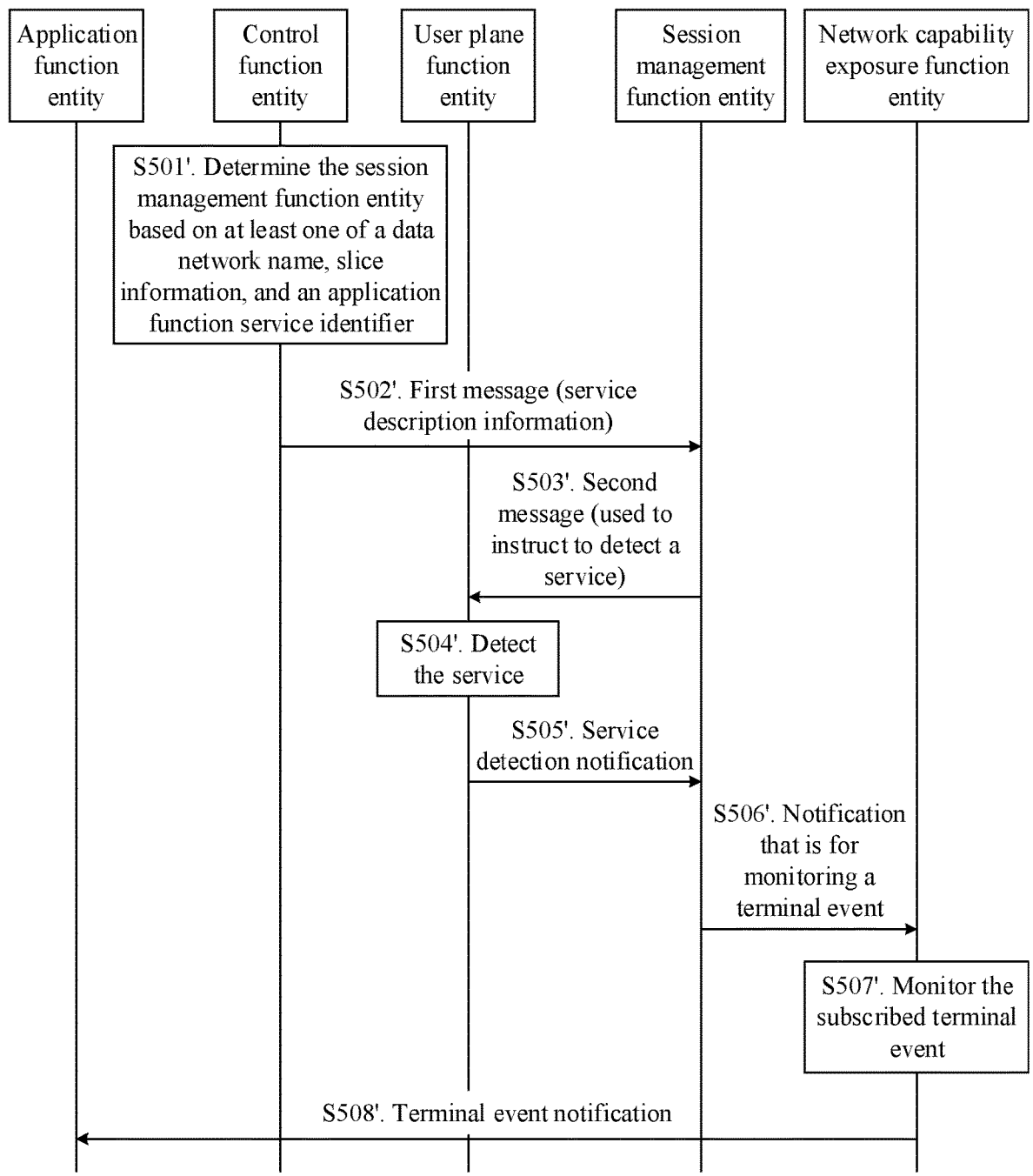
FIG. 6B is a schematic flowchart of another communications method according to an embodiment of this application.

FIG. 6B is a schematic flowchart of a communications method according to an embodiment of this application. The method may include the following steps.

S501'. A control function entity determines a session management function entity based on at least one of a DNN, slice information, and an application function service identifier.

Specifically, that a control function entity determines a session management function entity based on at least one of a DNN, slice information, and an application function service identifier may be the control function entity determines the session management function entity based on the DNN, based on the slice information, based on the application function service identifier, based on the DNN and the slice information, based on the DNN and the application function service identifier, based on the slice information and the application function service identifier, or based on the DNN, the slice information, and the application function service identifier.

S502'. The control function entity sends a first message to the session management function entity. The first message is used to subscribe to a terminal event, the first message includes service description information, and the service description information is used to indicate a service corresponding to the terminal event.

S503'. The session management function entity sends a second message to a UPF entity. The second message is used to instruct the UPF entity to detect a service. The service is the service corresponding to the subscribed terminal event. In addition, in another implementation, the second message may be a service information request, and is used to instruct the UPF entity to report service information. In this case, S504' does not need to be performed. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

S504'. Optionally, when the received second message is used to instruct the UPF entity to detect a service, the UPF entity detects the service.

S505'. The UPF entity sends a service detection notification to the session management function entity. The service detection notification is used to indicate occurrence of service data. The session management function entity receives the service detection notification. In another implementation, the service detection notification may be service information, that is, the service information in S503'. The service information is determined based on the downlink data packet, and further, is determined based on a packet header of the received downlink data packet. For example, when the downlink data packet is an IP data packet, a packet header of the downlink data packet includes IP quintuple information, when the downlink data packet is an Ethernet data packet, a packet header of the downlink data packet includes a MAC address.

For implementation of the foregoing steps, respectively refer to step S501 to S505 in the embodiment shown in FIG. 6A. Details are not described herein again.

S506'. The session management function entity sends a terminal service occurrence notification to a network exposure function entity in response to the service detection notification.

In the foregoing steps, the session management function entity receives subscription of the terminal event from the control function entity. In this case, after receiving the service detection notification sent by the UPF entity and determining that a terminal is unreachable, the session management function entity sends the terminal service occurrence notification to the NEF.

S507'. When receiving a terminal reachability notification, the network exposure function entity sends a terminal event notification to a function entity that subscribes to the terminal event. The terminal event notification includes at least one of the following information an identifier of a terminal corresponding to the terminal event and an event correlation identifier of the terminal event, where the event correlation identifier is used to identify a correlation relationship between the terminal event and the function entity that subscribes to the terminal event. The function entity that subscribes to the terminal event receives the terminal event notification.

Because NEF has received the terminal service occurrence notification from the SMF previously, when the NEF receives the terminal reachability notification sent by the AMF, the NEF sends the terminal event notification to an AF. According to the communications method provided in this embodiment of this application, the SMF receives subscription of the terminal event, notifies the NEF when the terminal is unreachable, and sends the terminal event notification to the AF when the NEF receives the terminal reachability notification that is sent by the AMF. In this way, a terminal event may be subscribed to and notified of for a specific service in a 5G architecture.

Figure 6C:
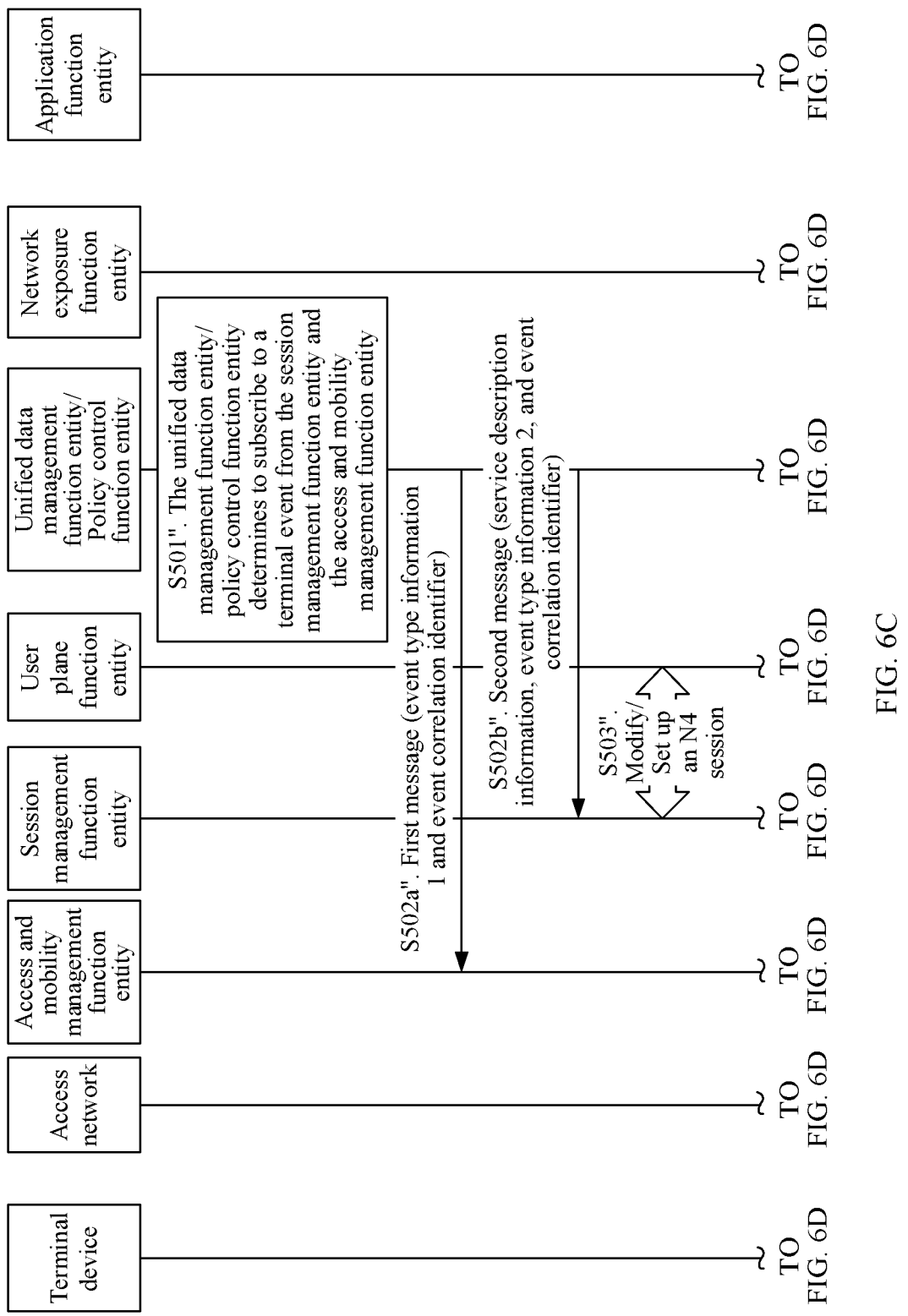
FIG. 6C and FIG. 6D are a schematic flowchart of a specific example of performing terminal event notification by an NEF.
Figure 6D:
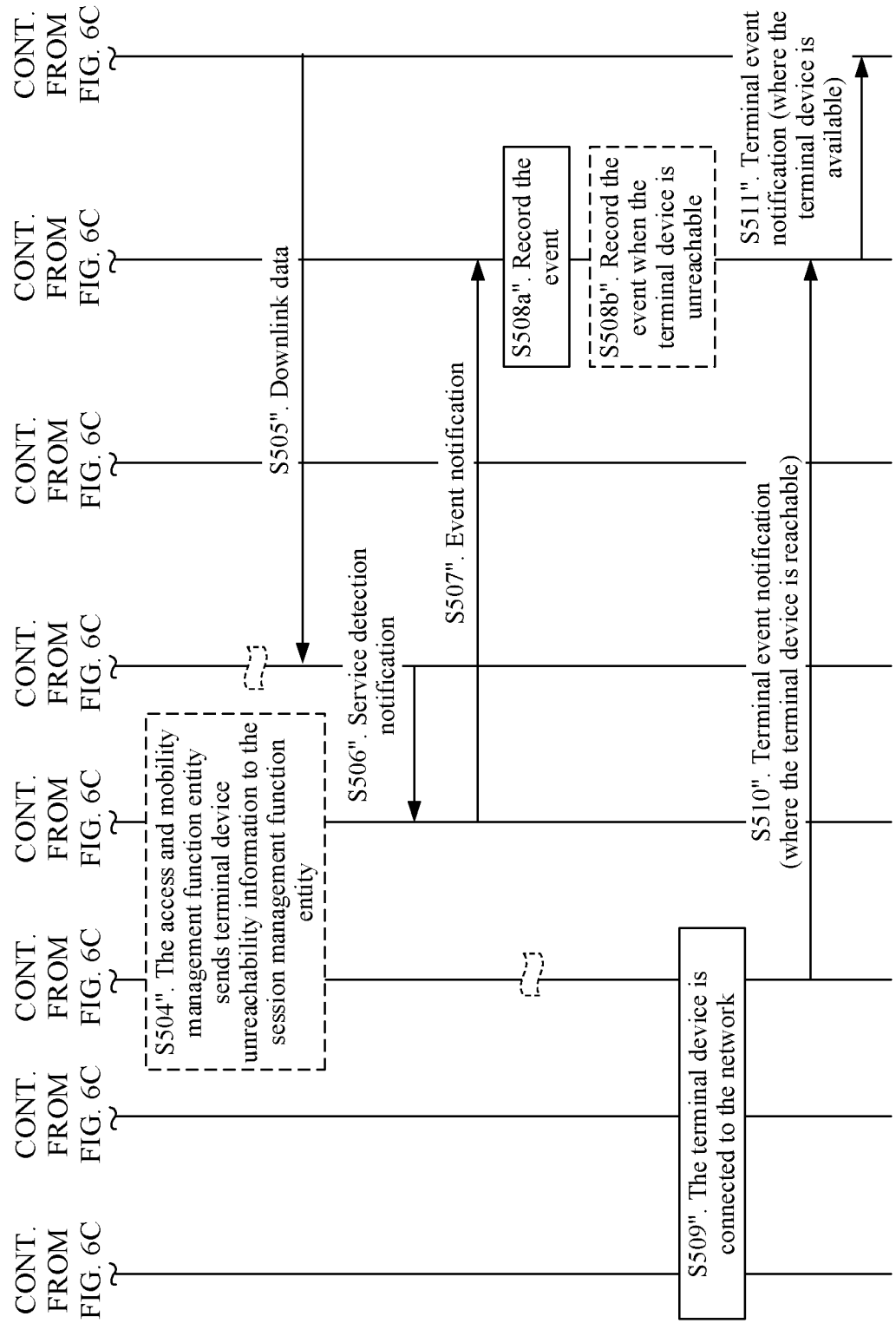

FIG. 6C and FIG. 6D are a schematic flowchart of a specific example of performing terminal event notification by an NEF.

S501". A UDM/PCF determines a target SMF based on a DNN/S-NSSAI/AF-service-ID, and subscribes to a terminal event from the SMF and an AMF.

The DNN/S-NSSAI/AF-service-ID may be obtained from a UDR or may be locally stored.

The UDM or the PCF may subscribe to the terminal event from the AMF and the SMF in the following two manners.

Method 1. The UDM or the PCF sends an event 1 (for example, an event of UE availability after DDN failure) and an event correlation identifier to the AMF, and sends an event 2 (for example, a service detection event), an event correlation identifier, and service description information to the SMF.

Method 2. The UDM sends an event 1 (for example, an event of UE availability after DDN failure) and an event correlation identifier to the AMF, and the PCF sends an event 2 (for example, a service detection event), an event correlation identifier, service description information to the SMF.

S502a". The UDM/PCF sends a first message to the AMF.

S502b". The UDM/PCF sends a second message (for example, Nsmf_EventExposure) to the target SMF.

The second message includes service description information, event type information, and an event correlation identifier (for example, an NEF reference ID), and may further include information such as an NEF ID. In this example, an event type is a service detection event.

The SMF/AMF receives the first message.

Specifically, after receiving the service detection event and the service description information, the SMF correlates the service detection event with the service description information. If the two are sent together (sent in a same message), it indicates that the two are correlated with each other. Alternatively, if the service description information is sent in a service detection event subscription message, it indicates that the two are correlated with each other.

S503". The SMF sends a service detection message to a UPF in a procedure for setting up or modifying an N4 session. The service detection message includes the service description information.

Specifically, when receiving, from the UPF, a notification that data corresponding to the service description information is detected, the SMF may determine an event to which the data corresponds triggers the event, and therefore send the event correlation identifier to the corresponding NEF.

The UPF detects a corresponding service based on the service detection message, that is, detects a service corresponding to the service description information.

In addition, in another implementation, the service detection message may be a service information request used to instruct the UPF entity to report service information. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

S504". The AMF sends UE unreachability information to the SMF.

The AMF may send the UE unreachability information to the SMF when receiving service data sent by another AF and detecting that UE is unreachable. Alternatively, the AMF sends the UE unreachability information to the SMF when receiving service data sent by an AF and detecting a DDN failure.

Optionally, S504" may be any step before S506".

S505". The AF sends a downlink data packet to the terminal.

S506". The UPF sends a service detection notification to the SMF.

The UPF detects, according to a packet detection rule, that the downlink data packet is a service corresponding to the subscribed terminal event.

When the UPF does not store access tunnel information of the session, a user plane tunnel needs to be established, and the UPF sends the service detection notification to the SMF. The service detection notification is used to indicate that occurrence of the service data is detected.

Specifically, the service corresponding to the subscribed terminal event is the service corresponding to the service description information. The packet detection rule includes the service description information. For example, the service description information is an IP quintuple, and the UPF detects the received downlink data packet based on the IP quintuple. When the downlink data packet corresponding to the IP quintuple is detected, it is determined that occurrence of the service data is detected.

In another implementation, the service detection notification may be service information, that is, the service information in S503". The service information is determined based on the downlink data packet, and further, is determined based on a packet header of the received downlink data packet. For example, when the downlink data packet is an IP data packet, a packet header of the downlink data packet includes IP quintuple information, when the downlink data packet is an Ethernet data packet, a packet header of the downlink data packet includes a MAC address.

S507". The SMF sends an event notification to the NEF.

Specifically, the SMF notifies the NEF that a terminal service occurs.

S508a". If the SMF reports an event to the NEF when the UE is unreachable, this step is performed, and the NEF records the event.

S508b". If the SMF reports an event to the NEF when detecting a service at any time, the NEF records the event, and the NEF determines that the UE is unreachable.

S509". The terminal initiates a connection to a network. For example, the terminal initiates a TAU request or a service request to the network.

S510". The AMF sends a UE reachability event notification to the NEF.

S511". The NEF sends a UE terminal event notification to the AF.

Specifically, corresponding to S508a'', when the UE reachability event is received, the event is sent to the AF based on a record. For example, the UE reachability event is sent to an AF of the recorded event corresponding to the service.

Corresponding to S508b'', the record is deleted when the UE is reachable. If the UE is unreachable, a record is stored, when the UE reachability event is received, the event is sent to the AF based on the record. For example, the UE reachability event is sent to an AF of the recorded event corresponding to the service.

The following further describes examples of the foregoing communications method in detail with reference to specific communication scenarios.

Figure 7A:
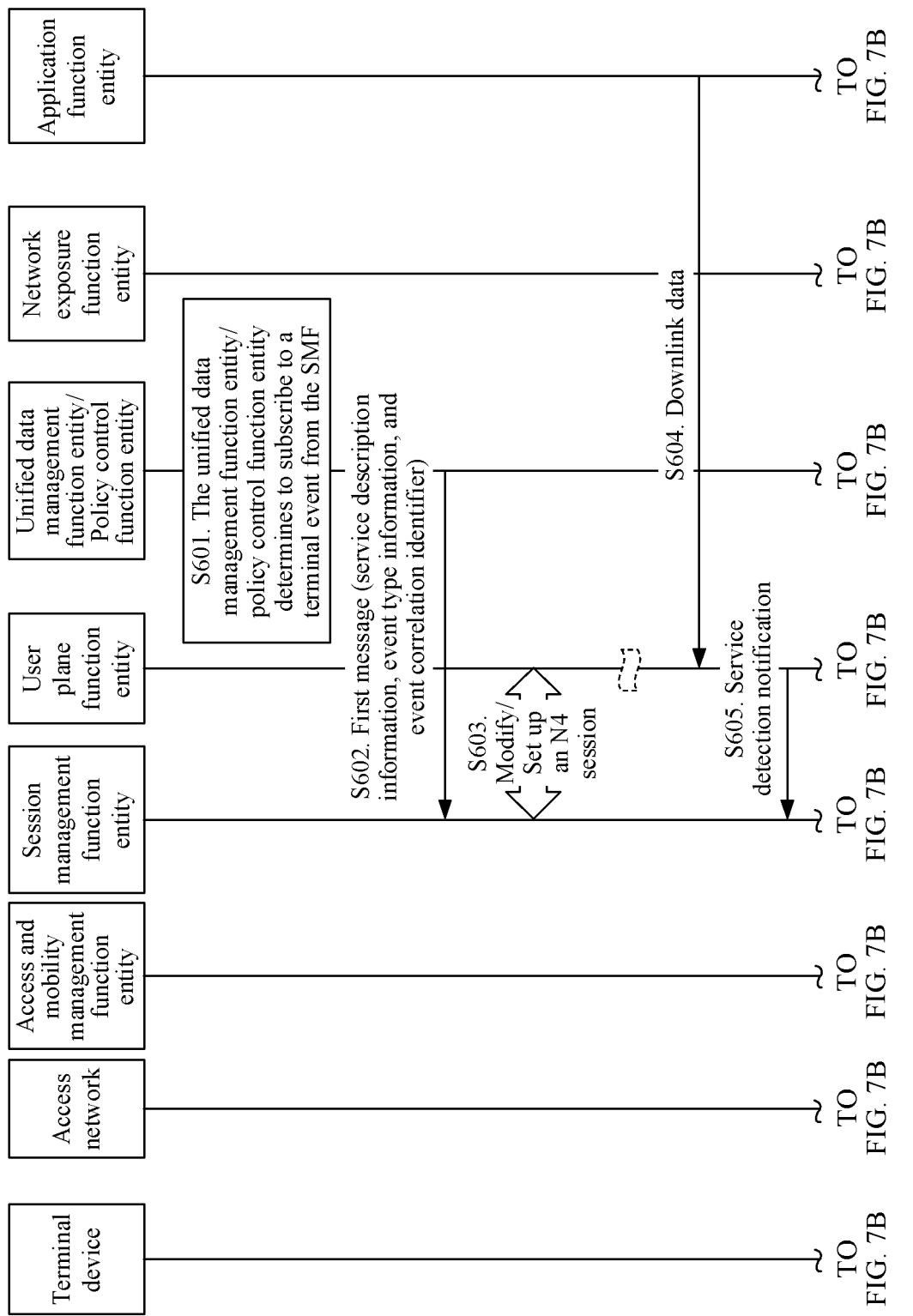
FIG. 7A and FIG. 7B are a schematic flowchart of an example of a communications method.
Figure 7B:
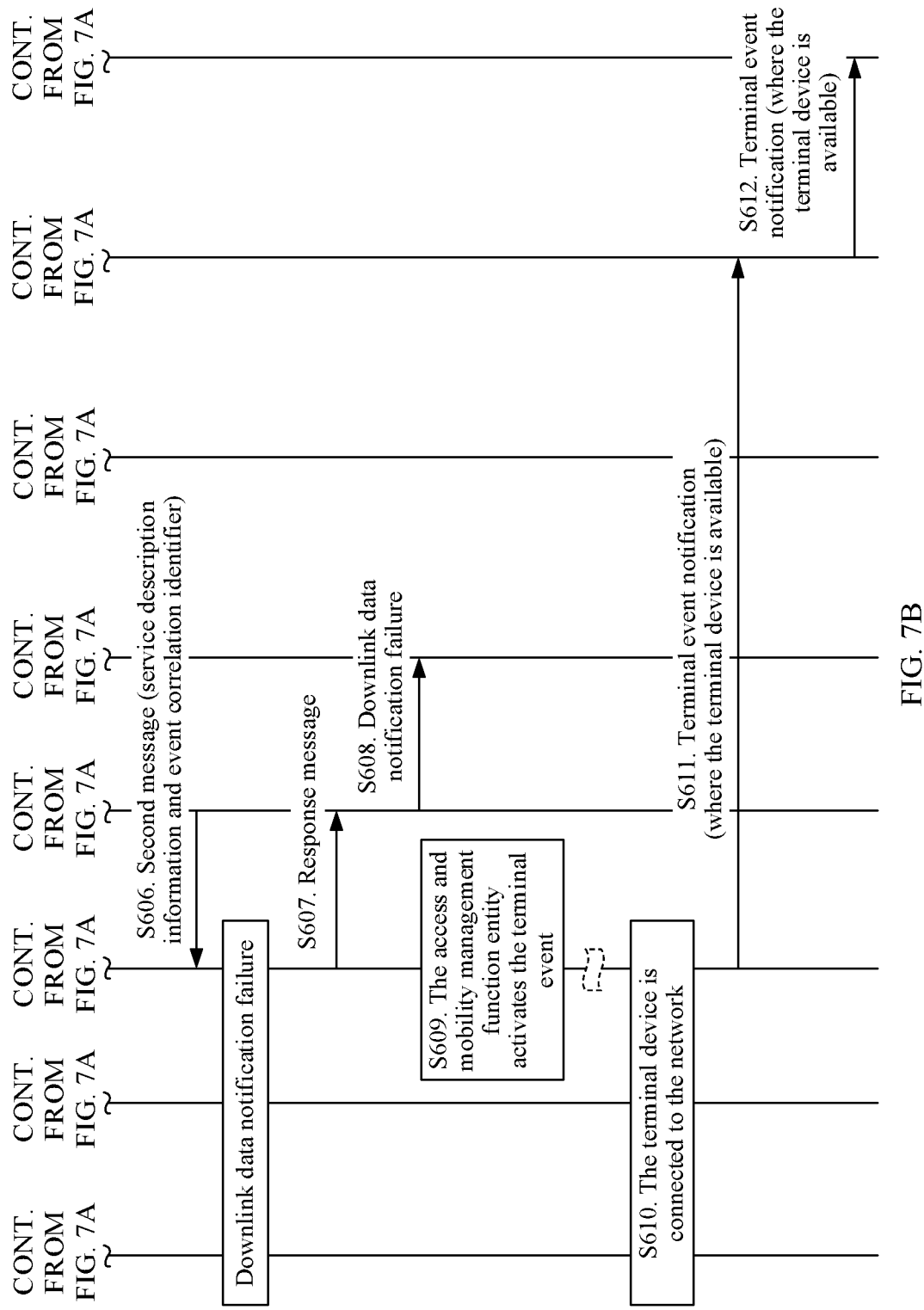

Example 1. An AMF Receives Subscription of a Terminal Event from an SMF, and Performs Event Monitoring and Notification FIG. 7A and FIG. 7B are a schematic flowchart of an example of a communications method. In this example, an SMF instructs an AMF to monitor a terminal event. Specifically, during or after session setup, a UDM/PCF performs the following procedure.

S601. The UDM/PCF determines a target SMF based on a DNN/S-NSSAI/AF-service-ID. The DNN/S-NSSAI/AF-service-ID may be obtained from a UDR or may be locally stored.

S602. The UDM/PCF sends a first message (for example, Nsmf_EventExposure) to the target SMF. The first message includes service description information, event type information, and an event correlation identifier (for example, an NEF reference ID), and may further include information such as an NEF ID. In this example, an event type is an event of terminal availability after DDN failure.

The SMF receives the first message.

Specifically, after the SMF receives the event of availability after DDN failure and the service description information, the SMF correlates the event of availability after DDN failure with the service description information. If the two are sent together (sent in a same message), it indicates that the two are correlated with each other. Alternatively, if the service description information is sent in a subscription message on the event of availability after DDN failure, it indicates that the two are correlated with each other.

S603. The SMF sends a service detection message to a UPF in a procedure for setting up or modifying an N4 session. The service detection message includes service description information.

Specifically, when receiving, from the UPF, a notification that data corresponding to the service description information is detected, the SMF may determine an event to which the data corresponds triggers the event, and therefore send the event correlation identifier to the corresponding AMF. In addition, in another implementation, the service detection message may be a service information request used to instruct the UPF entity to report service information. In this case, S605 does not need to be performed. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

The UPF detects a corresponding service based on the service detection message, that is, detects a service corresponding to the service description information.

S604. An AF sends a downlink data packet to a terminal.

S605. Optionally, when the received service detection message is used to instruct the UPF entity to detect a service, the UPF detects, according to a packet detection rule, that the downlink data packet is a service corresponding to the subscribed terminal event.

When the UPF does not store access tunnel information of the session, a user plane tunnel needs to be established, and the UPF sends a service detection notification to the SMF. The service detection notification is used to indicate that occurrence of the service data is detected.

Specifically, the service corresponding to the subscribed terminal event is the service corresponding to the service description information. The packet detection rule includes the service description information. For example, the service description information is an IP triplet, and the UPF detects the received downlink data packet based on the IP triplet. When the downlink data packet corresponding to the IP triplet is detected, it is determined that occurrence of the service data is detected.

S606. The SMF sends a second message (for example, Namf_CommunicationN1N2MessageTransfer) to the AMF in response to the service detection notification sent by the UPF. The second message includes event type information and an event correlation identifier (for example, an NEF reference ID), and may further include an NEF ID. The NEF ID is used by the AMF to send a notification to an NEF corresponding to the NEF ID.

As an alternative of S606, the event type information and the event correlation identifier may be carried in different messages. For example, the SMF may add the NEF reference ID to Namf_CommunicationN1N2MessageTransfer, and add the event type information to Namf_EventExposure_Subscribe. In addition, an order of sending the two messages is not limited. In another implementation, the service detection notification may be service information, that is, the service information in S603. The service information is determined based on the downlink data packet, and further, is determined based on a packet header of the received downlink data packet. For example, when the downlink data packet is an IP data packet, a packet header of the downlink data packet includes IP quintuple information, when the downlink data packet is an Ethernet data packet, a packet header of the downlink data packet includes a MAC address.

S607. When the AMF detects that the terminal is unavailable, the AMF sends a response message (for example, Namf_CommunicationN1N2MessageTransfer) to the SMF, to notify the SMF of a DDN failure.

S608. The SMF further sends a DDN failure indication to the UPF.

S609. When the AMF determines that the terminal is unavailable, the AMF sets or activates an event of availability after DDN failure, and the AMF starts to monitor an availability state of the terminal.

S610. The terminal initiates a connection to a network. For example, the terminal initiates a TAU request or a service request to the network.

S611. If determining that the event of availability after DDN failure is locally set, the AMF sends a terminal event notification (for example, Namf_EventExposure_Notify) to the NEF. The terminal event notification includes at least one of the following information an identifier of the terminal and an event correlation identifier (for example, an NEF reference ID).

S612. The NEF sends the terminal event notification (for example, Namf_EventExposure_Notify) to the AF based on the identifier of the terminal and/or the NEF reference ID.

After receiving the terminal event notification, the AF determines that the terminal is available, and may resend downlink data to the terminal.

Example 2. An SMF Performs Event Monitoring and Notification

Figure 7D:
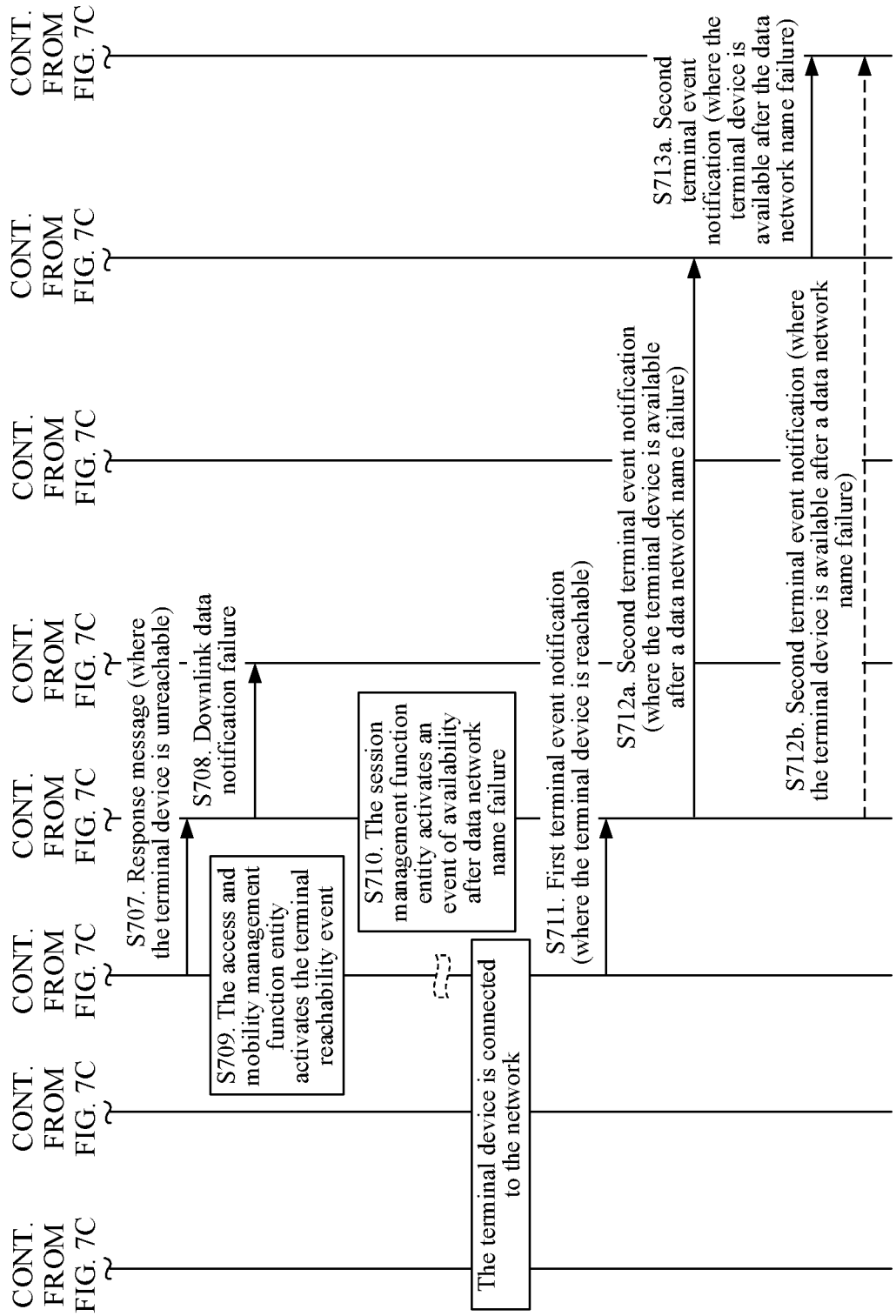

FIG. 7C and FIG. 7D are a schematic flowchart of another example of a communications method. Different from the example shown in 7A, in this example, an AMF monitors a terminal reachability event, and sends a terminal reachability notification to a session management function entity when detecting that a terminal is reachable, where the notification is used to instruct the SMF to monitor an event of terminal availability after DDN failure. Specifically, during or after session setup, a UDM/PCF performs the following procedure.

S701. The UDM/PCF determines a target SMF based on a DNN/S-NSSAI/AF-service-ID. The DNN/S-NSSAI/AF-service-ID is obtained from a UDR or is locally stored.

S702. The UDM/PCF sends a first message (for example, Nsmf_EventExposure) to the target SMF. The first message includes service description information, event type information, and an event correlation identifier (for example, an NEF reference ID), and may further include information such as an NEF ID. In this example, the event type is an event of terminal availability after DDN failure.

S703. The SMF sends a service detection message to a UPF in a procedure for setting up or modifying an N4 session. The service detection message is used to instruct the UPF to detect a service corresponding to a subscribed terminal event, that is, a service corresponding to the service description information. In addition, in another implementation, the service detection message may be a service information request used to instruct the UPF entity to report service information. In this case, S705 does not need to be performed. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

S704. An AF sends a downlink data packet to the terminal.

S705. Optionally, when the received service detection message is used to instruct the UPF entity to detect a service, the UPF determines, according to a packet detection rule, that the downlink data packet is a service corresponding to the subscribed terminal event. When a user plane tunnel needs to be established, the UPF sends a service detection notification to the SMF. The service detection notification is used to indicate that occurrence of service data is detected.

S706. The SMF sends a second message (for example, Namf_CommunicationN1N2MessageTransfer) to the AMF in response to the service detection notification sent by the UPF. The second message is used to subscribe to the terminal event, and the second message includes event type information. The event type is a terminal reachability event.

S707. If detecting that the terminal is unreachable, the AMF sends a response message (for example, Namf_CommunicationN1N2MessageTransfer) to the SMF. The response message is used to indicate that the terminal is unreachable.

S708. The SMF further sends a DDN failure indication to the UPF.

S709. The AMF activates the terminal reachability event.

S710. When the SMF determines that the terminal is unavailable (for example, the terminal is in a PSM state, or the terminal is in an MICO status), the SMF sets an event of availability after DDN failure.

The terminal initiates a connection to a network. For example, the terminal initiates a TAU request or a service request to the network.

S711. If determining that the SMF subscribes to a terminal reachability reporting event, the AMF sends a first terminal event notification (for example, Namf_EventExposure_Notify) to the SMF. The first terminal event notification is used to notify that the terminal is reachable.

S712a. After determining that the event of availability after DDN failure is set, the SMF sends a second terminal event notification to an NEF. The second terminal event notification includes at least one of the following information an identifier of the terminal and an event correlation identifier of the terminal event.

S713. The NEF sends the second terminal event notification to the AF based on the identifier of the terminal and/or the event correlation identifier.

As an alternative of S712a and S713, S712b that the SMF may send a second terminal event notification to the AF may be alternatively performed. The second terminal event notification includes at least one of the following information an AF identifier, an identifier of the terminal, and an event correlation identifier of the terminal event.

After receiving the terminal event notification, the AF determines that the terminal is available, and may resend downlink data to the terminal.

Figure 7E:
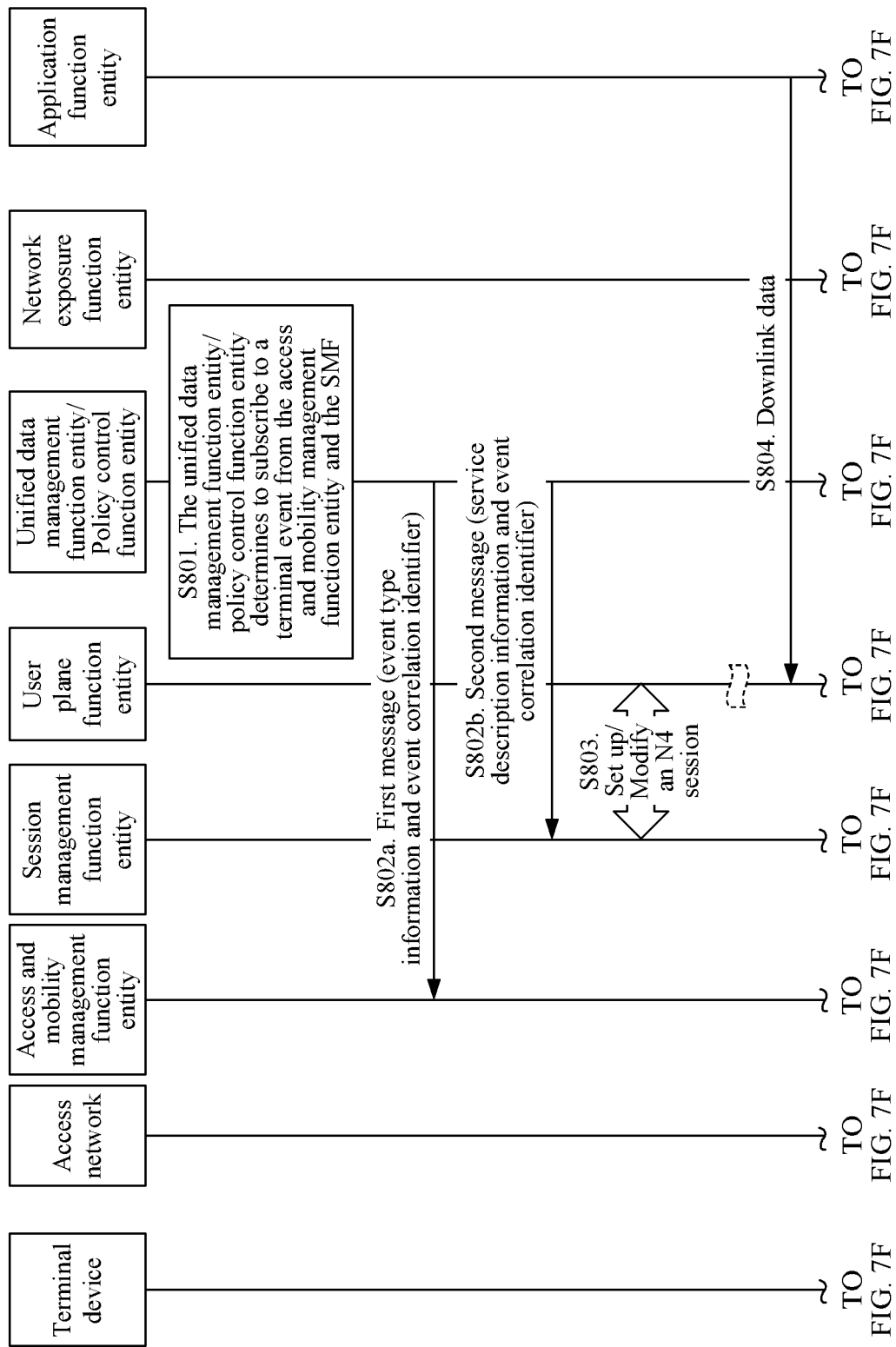
FIG. 7E and FIG. 7F are a schematic flowchart of still another example of a communications method.
Figure 7F:
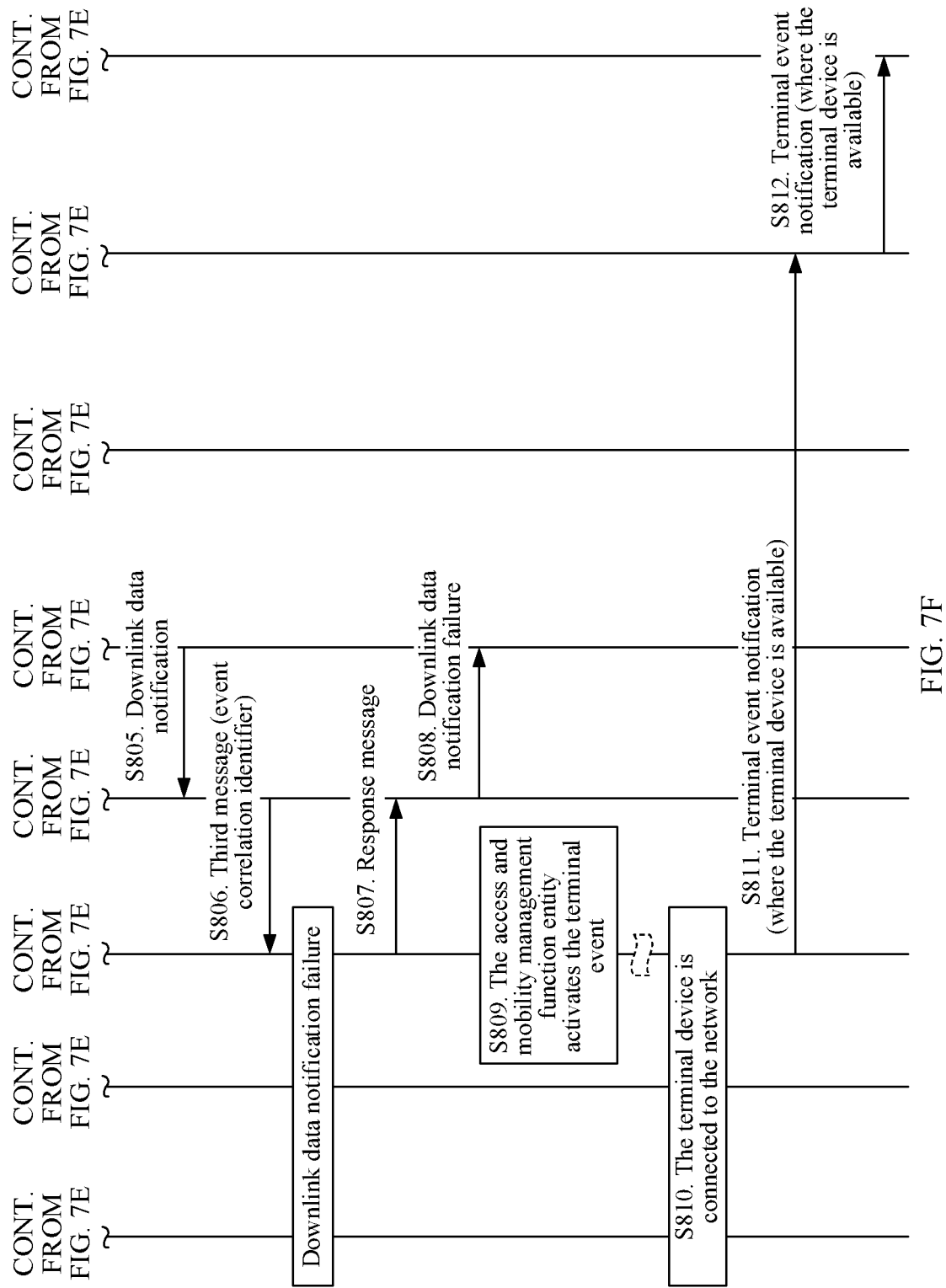

Example 3. An SMF Detects a Service, and an AMF Receives Subscription of a Terminal Event from a UDM/PCF, and Performs Event Detection and Notification FIG. 7E and FIG. 7F are a schematic flowchart of still another example of a communications method. A specific procedure is described as follows.

S801. A UDM/PCF (SMF-PCF) determines a target SMF based on a DNN/S-NSSAI/AF-service-ID. The DNN/S-NSSAI/AF-service-ID is obtained from a UDR or is locally stored. Further, a UDM/PCF (AMF-PCF) determines an AMF based on an identifier of UE.

S802. The UDM/PCF (AMF-PCF) sends a first message (for example, Nsmf_EventExposure) to the AMF in a registration process of the UE or at any other time at which the terminal is in a registration state. The first message includes event type information and an event correlation identifier (for example, an NEF reference ID), and may further include an NEF ID. In this example, an event type is an event of terminal availability after DDN failure.

During or after session setup, the UDM/PCF (SMF-PCF) sends a second message (for example, Nsmf_EventExposure service message) to the target SMF. The second message includes service description information and an event correlation identifier (for example, an NEF reference ID).

The AMF-PCF is a PCF correlated with the AMF, and is configured to provide the AMF with a policy related to access and mobility and a terminal policy. The SMF-PCF is a PCF correlated with the SMF, and is configured to provide a session-related policy to the SMF. The AMF-PCF and the SMF-PCF may be a same function entity, or may be independent function entities.

S803. The SMF sends a service detection message to a UPF in a procedure for setting up or modifying an N4 session. The service detection message is used to instruct the UPF to detect a service corresponding to a subscribed terminal event, that is, a service corresponding to the service description information. In addition, in another implementation, the service detection message may be a service information request used to instruct the UPF entity to report service information. In this case, S805 does not need to be performed. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

S804. An AF sends a downlink data packet to the terminal.

S805. Optionally, when the received second message is used to instruct the UPF entity to detect a service, the UPF receives the downlink data packet, and determines, according to a packet detection rule, that the downlink data packet is a service corresponding to the subscribed terminal event. When a user plane tunnel needs to be established, the UPF sends a DDN to the SMF. The DDN is used to indicate occurrence of service data. In another implementation, the DDN may be service information, that is, the service information in S803. The service information is determined based on the downlink data packet, and further, is determined based on a packet header of the received downlink data packet. For example, when the downlink data packet is an IP data packet, a packet header of the downlink data packet includes IP quintuple information, when the downlink data packet is an Ethernet data packet, a packet header of the downlink data packet includes a MAC address.

S806. The SMF sends a third message (for example, Namf_CommunicationN1N2MessageTransfer) to the AMF in response to a service detection notification sent by the UPF. The third message includes an NEF reference ID, and may further include an NEF ID. It should be noted that, in this embodiment, the SMF activates, using the third message, the AMF to monitor the terminal event. In this case, the SMF instructs the AMF to start to monitor the terminal event, and the UDM/PCF has configured, using the first message, the AMF to monitor the terminal event. That is, configuring terminal event monitoring and detecting the service corresponding to the service description information may be independent processes, and may be indicated in different messages. Optionally, the third message may include event correlation information, for example, an event correlation identifier. The event correlation information is used to determine event reporting information. Optionally, the session management function entity sends the event correlation information to the MME based on the service description information and the service information. In other words, the session management function entity compares the service information with the service description information, and sends the event correlation information to the MME when the service information matches the service description information.

In the foregoing procedure, an event subscription message and an event monitoring notification are sent by different function entities or by the SMF. The AMF first receives subscription information of the event of availability after DDN failure, and then the AMF receives an event monitoring notification, where the event monitoring notification includes the NEF reference ID. In this case, the AMF may correlate the monitoring notification with the event.

S807. When the AMF detects that the terminal is unavailable and DDN fails, the AMF sends a response message (for example, Namf_Communication N1N2MessageTransfer) to the SMF, to notify the SMF of the DDN failure.

S808. The SMF further sends a DDN failure indication to the UPF.

S809. When the AMF determines that the UE is unavailable (for example, the UE is in a PSM status, or the UE is in an MICO status), the AMF sets or activates a corresponding event of terminal availability after DDN failure based on the NEF reference ID.

S810. The terminal initiates a connection to a network. For example, the terminal initiates a TAU request or a service request to the network.

S811. If determining that the event of terminal availability after DDN failure is locally set, the AMF sends a terminal event notification (for example, Namf_EventExposure_Notify) to the NEF. The terminal event notification includes at least one of the following information the identifier of the terminal and an NEF reference ID.

In this example, one or more AFs subscribe to a terminal event, and the terminal event is correlated to the AMF mainly in two manners (1) In one manner, one event of availability after DDN failure is subscribed to from the AMF only for one UE, and the event may have different NEF reference IDs such that the AMF can report the event to different AFs using NEFs. (2) In the other manner, each AF serving the UE may subscribe to an event of availability after DDN failure from the AMF for each event such that each event of availability after DDN failure may correspond to a different AF.

In an optional manner, alternatively, the AMF may directly report the event to the AF.

S812. The NEF sends a terminal event notification (for example, Namf_EventExposure_Notify) to the AF based on the identifier of the terminal and/or the event correlation identifier.

After receiving the terminal event notification, the AF determines that the terminal is available, and may resend downlink data to the terminal. According to the communications method provided in this embodiment of this application, the terminal event is subscribed to from the session management function entity that manages a specific service, when receiving the service detection notification from the UPF entity, the session management function entity instructs the AMF entity to monitor the terminal event. In this way, a terminal event may be subscribed to and monitored for a specific service in a 5G architecture.

Figure 7G:
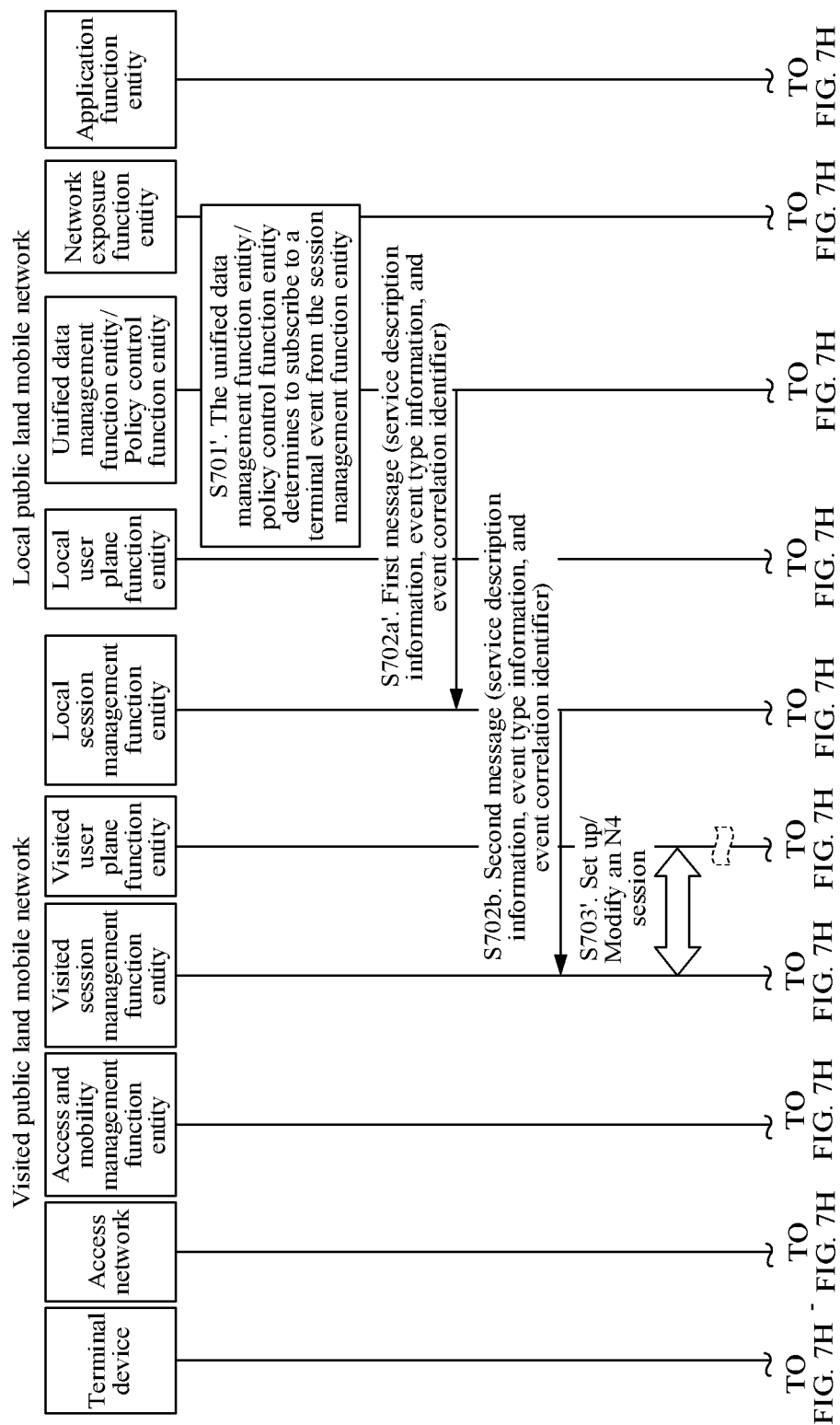
FIG. 7G to FIG. 7I are a schematic flowchart of still another example of a communications method.
Figure 7H:
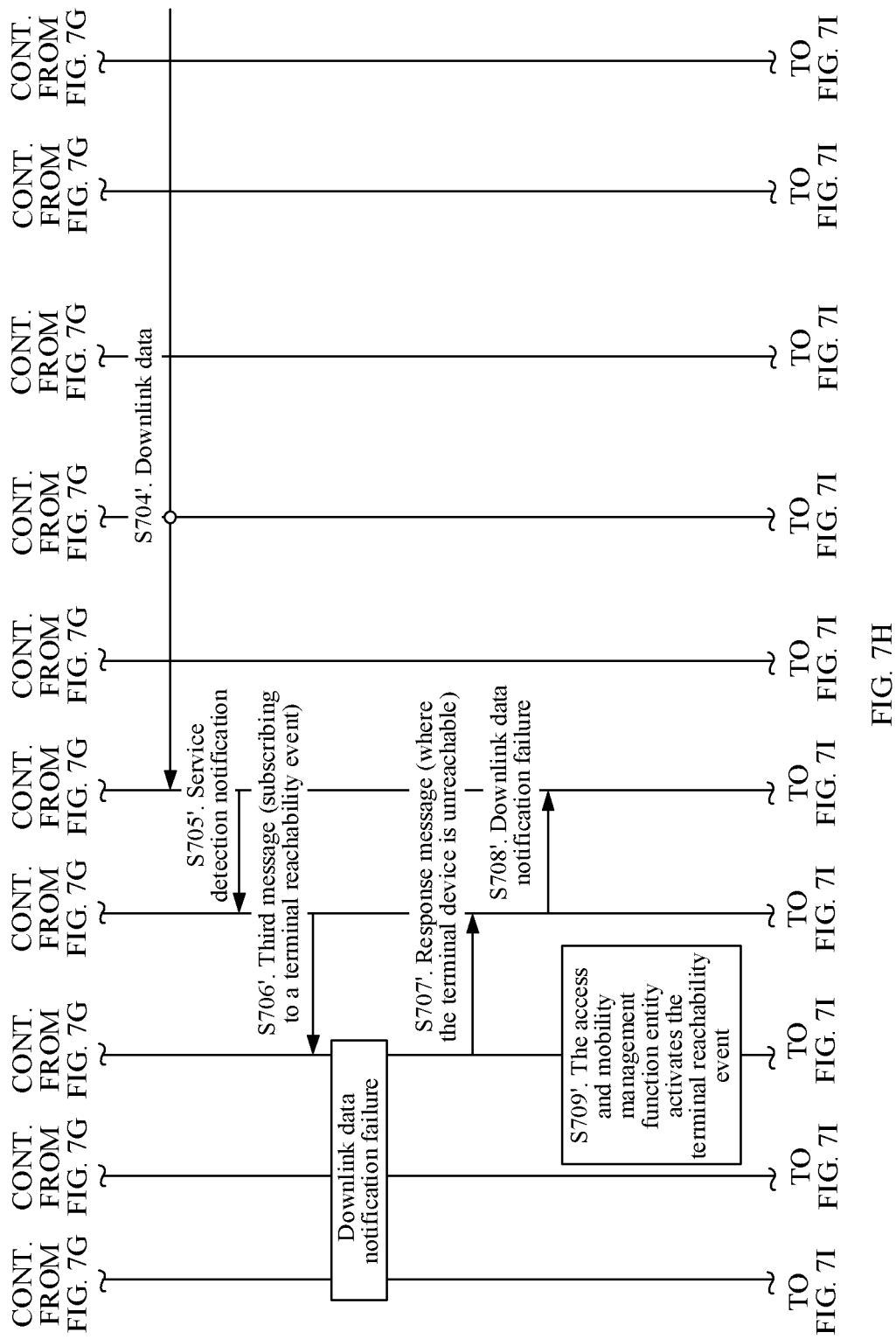
Figure 7I:
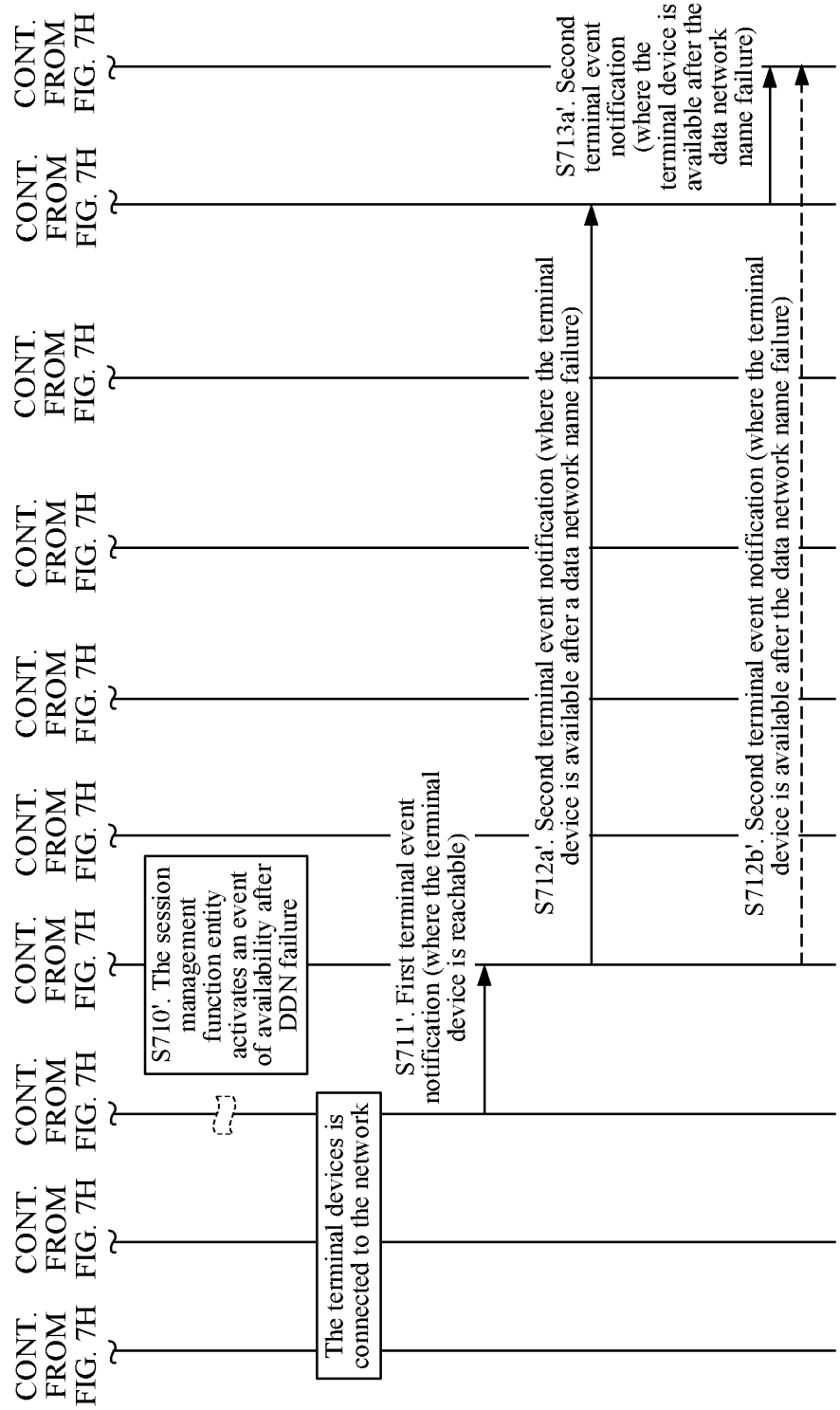

Example 4. In a Roaming Scenario, a Roaming SMF (V-SMF) Performs Event Monitoring and Notification FIG. 7G to FIG. 7I are a schematic flowchart of still another example of a communications method. Different from the example shown in FIG. 7C and FIG. 7D, a local session management function entity (H-SMF) forwards a subscription message on an event of terminal availability after DDN failure to a V-SMF, and then the V-SMF performs event monitoring and notification. Specifically, during or after session setup, a UDM/PCF performs the following procedure.

S701'. The UDM/PCF determines a target H-SMF based on a DNN/S-NSSAI/AF-service-ID. The DNN/S-NS-SAI/AF-service-ID is obtained from a UDR or is locally stored.

S702a'. The UDM/PCF sends a first message (for example, Nsmf_EventExposure) to the target H-SMF. The first message includes service description information, event type information, and an event correlation identifier (for example, an NEF reference ID), and may further include information such as an NEF ID. In this example, the event type is an event of terminal availability after DDN failure.

S702b'. The H-SMF sends the first message to the V-SMF.

S703'. The V-SMF sends a service detection message to a roaming UPF entity (V-UPF) in a procedure for setting up or modifying an N4 session. The service detection message is used to instruct the V-UPF to detect a service corresponding to a subscribed terminal event, that is, a service corresponding to the service description information. In addition, in another implementation, the service detection message may be a service information request used to instruct the UPF entity to report service information. In this case, S705' does not need to be performed. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

S704'. An AF sends a downlink data packet to a terminal.

S705'. Optionally, when the received service detection message is used to instruct the UPF entity to detect a service, the V-UPF determines, according to a packet detection rule, that the downlink data packet is the service corresponding to the subscribed terminal event. When a user plane tunnel needs to be established, the V-UPF sends a service detection notification to the V-SMF. The service detection notification is used to indicate that occurrence of service data is detected. In another implementation, the service detection notification may be service information, that is, the service information in S703'. The service information is determined based on the downlink data packet, and further, is determined based on a packet header of the received downlink data packet. For example, when the downlink data packet is an IP data packet, a packet header of the downlink data packet includes IP quintuple information, when the downlink data packet is an Ethernet data packet, a packet header of the downlink data packet includes a MAC address.

S706'. The V-SMF sends a second message (for example, Namf_CommunicationN1N2MessageTransfer) to an AMF in response to the service detection notification sent by the V-UPF. The second message is used to subscribe to the terminal event, and the second message includes event type information. The event type is a terminal reachability event. Optionally, the second message may include event correlation information, for example, an event correlation identifier. The event correlation information is used to determine event reporting information. Optionally, the session management function entity sends the event correlation information to the MME based on the service description information and the service information. In other words, the session management function entity compares the service information with the service description information, and sends the event correlation information to the MME when the service information matches the service description information.

S707'. If detecting that the terminal is unreachable, the AMF sends a response message (for example, Namf_CommunicationN1N2MessageTransfer) to the V-SMF. The response message is used to indicate that the terminal is unreachable.

S708'. The V-SMF further sends a DDN failure indication to the V-UPF.

S709'. The AMF activates the terminal reachability event.

S710'. When the V-SMF determines that the terminal is unavailable (for example, the terminal is in a PSM state, or the terminal is in an MICO status), the V-SMF sets an event of availability after DDN failure.

The terminal initiates a connection to a network. For example, the terminal initiates a TAU request or a service request to the network.

S711'. If determining that the V-SMF subscribes to a terminal reachability reporting event, the AMF sends a first terminal event notification (for example, Namf_EventExposure_Notify) to the V-SMF. The first terminal event notification is used to notify that the terminal is reachable.

S712a'. After determining that the event of availability after DDN failure is set, the V-SMF sends a second terminal event notification to an NEF. The second terminal event notification includes at least one of the following information an identifier of the terminal and an event correlation identifier of the terminal event.

S713'. The NEF sends the second terminal event notification to the AF based on the identifier of the terminal and/or the event correlation identifier.

As an alternative of S712a' and S713', S712b' that the V-SMF may send a second terminal event notification to the AF may be alternatively performed. The second terminal event notification includes at least one of the following information an AF identifier, an identifier of the terminal, and an event correlation identifier of the terminal event.

After receiving the terminal event notification, the AF determines that the terminal is available, and may resend downlink data to the terminal.

Figure 7J:
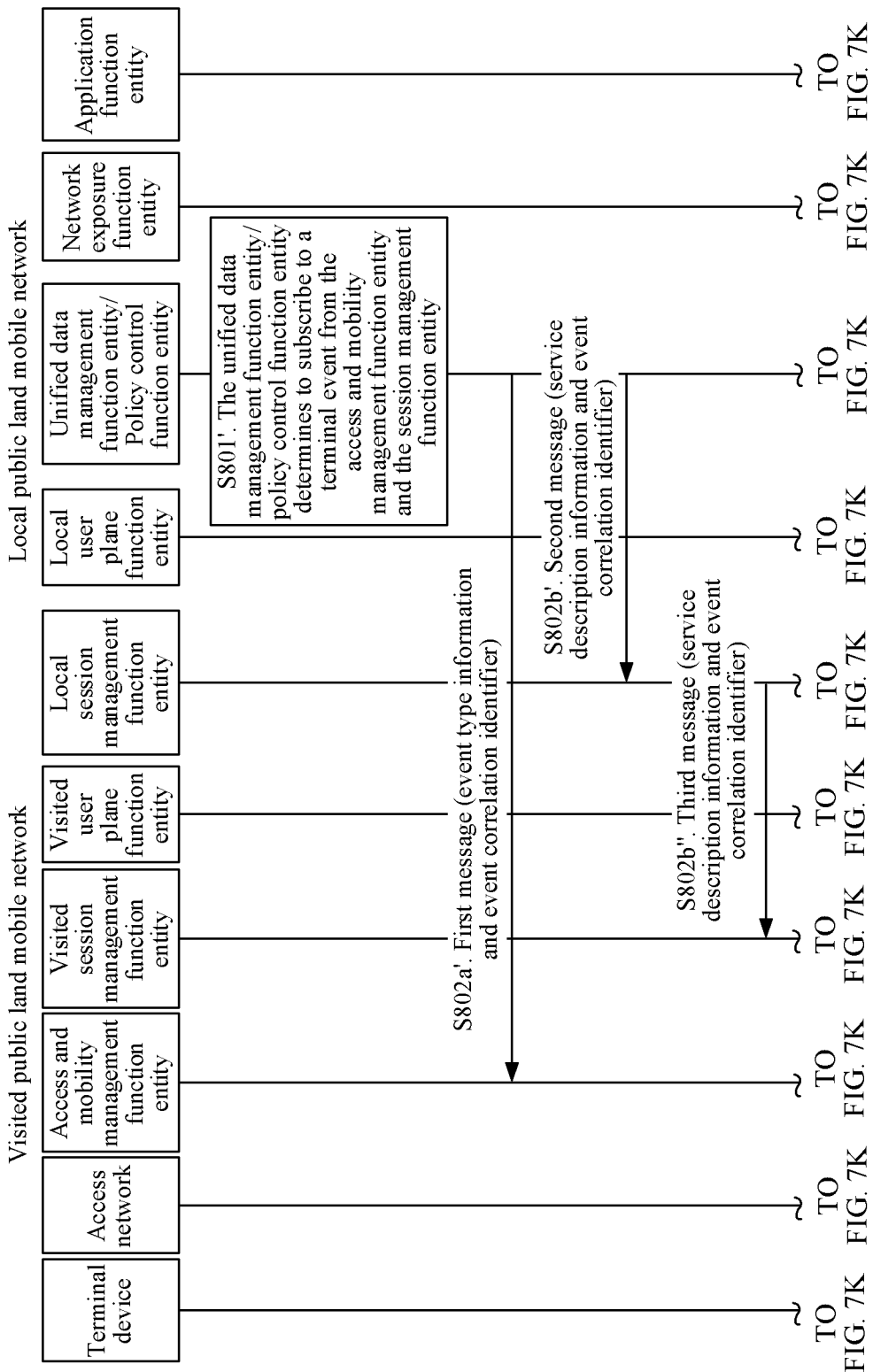
Figure 7K:
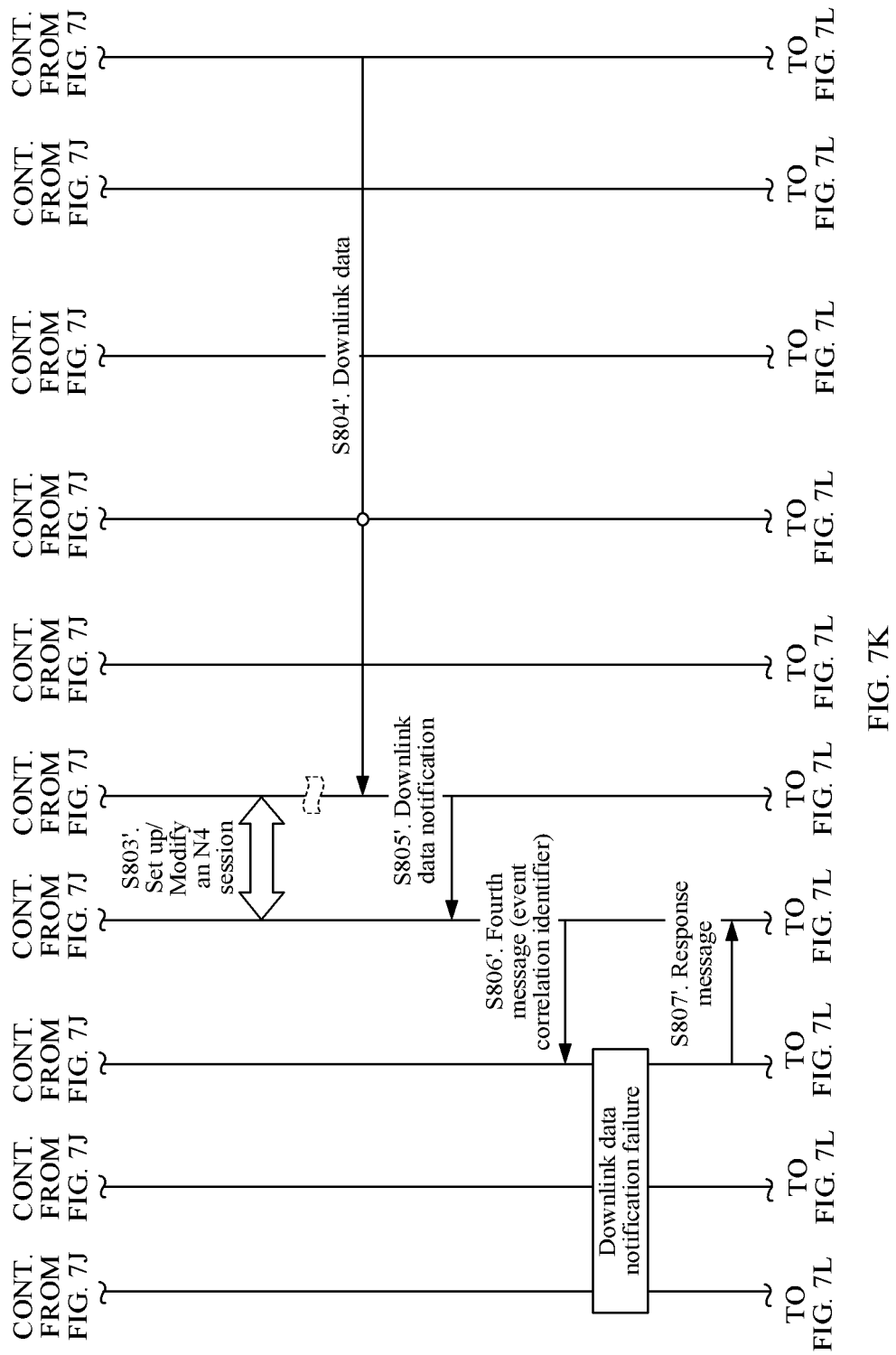

Example 5. In a Roaming Scenario, a V-SMF Detects a Service, and an AMF Receives Subscription of a Terminal Event from a UDM/PCF, and Performs Event Detection and Notification FIG. 7J to FIG. 7L are a schematic flowchart of still another example of a communications method. A specific procedure is described as follows.

S801'. A UDM/PCF (SMF-PCF) determines a target H-SMF based on a DNN/S-NSSAI/AF-service-ID. The DNN/S-NSSAI/AF-service-ID is obtained from a UDR or is locally stored. Further, a UDM/PCF (AMF-PCF) determines an AMF based on an identifier of UE.

S802a'. The UDM/PCF (AMF-PCF) sends a first message (for example, Nsmf_EventExposure) to the AMF in a registration process of the terminal or at any other time at which the terminal is in a registration state. The first message includes event type information and an event correlation identifier (for example, an NEF reference ID), and may further include an NEF ID. In this example, an event type is an event of terminal availability after DDN failure.

S802b'. During or after session setup, the UDM/PCF (SMF-PCF) sends a second message (for example, Nsmf_EventExposure service message) to the target H-SMF. The second message includes service description information and an event correlation identifier (for example, an NEF reference ID).

The AMF-PCF is a PCF correlated with the AMF, and is configured to provide the AMF with a policy related to access and mobility and a terminal policy. The SMF-PCF is a PCF correlated with the H-SMF, and is configured to provide a session-related policy to the H-SMF. The AMF-PCF and the SMF-PCF may be a same function entity, or may be independent function entities.

S802b''. The H-SMF sends a third message to the V-SMF. The third message includes service description information and an event correlation identifier.

S803'. The V-SMF sends a service detection message to a V-UPF in a procedure for setting up or modifying an N4 session. The service detection message is used to instruct the V-UPF to detect a service corresponding to a subscribed terminal event, that is, a service corresponding to the service description information. In addition, in another implementation, the service detection message may be a service information request used to instruct the UPF entity to report service information. In this case, S805' does not need to be performed. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

S804'. An AF sends a downlink data packet to the terminal.

S805'. Optionally, when the received service detection message is used to instruct the UPF entity to detect a service, the V-UPF receives the downlink data packet, and determines, according to a packet detection rule, that the downlink data packet is the service corresponding to the subscribed terminal event. When a user plane tunnel needs to be established, the V-UPF sends a DDN to the V-SMF. The DDN is used to indicate occurrence of service data.

S806'. The V-SMF sends a fourth message (for example, Namf_CommunicationN1N2MessageTransfer) to the AMF in response to a service detection notification sent by the V-UPF. The fourth message includes an NEF reference ID, and may further include an NEF ID. It should be noted that, in this embodiment, the V-SMF activates, using the fourth message, the AMF to monitor the terminal event. In this case, the V-SMF instructs the AMF to start to monitor the terminal event, and the UDM/PCF has configured, using the first message, the AMF to monitor the terminal event. That is, configuring terminal event monitoring and detecting the service corresponding to the service description information may be independent processes, and may be indicated in different messages.

In the foregoing procedure, an event subscription message and an event monitoring notification are sent by different function entities or by the V-SMF. The AMF first receives subscription information of the event of availability after DDN failure, and then the AMF receives an event monitoring notification, where the event monitoring notification includes the NEF reference ID. In this case, the AMF may correlate the monitoring notification with the event. In another implementation, the service detection notification may be service information, that is, the service information in S803'. The service information is determined based on the downlink data packet, and further, is determined based on a packet header of the received downlink data packet. For example, when the downlink data packet is an IP data packet, a packet header of the downlink data packet includes IP quintuple information, when the downlink data packet is an Ethernet data packet, a packet header of the downlink data packet includes a MAC address.

Optionally, the fourth message may include event correlation information, for example, an event correlation identifier (an NEF reference ID). The event correlation information is used to determine event reporting information. Optionally, the session management function entity sends the event correlation information to the MME based on the service description information and the service information. In other words, the session management function entity compares the service information with the service description information, and sends the event correlation information to the MME when the service information matches the service description information.

S807'. When the AMF detects that the terminal is unavailable and DDN fails, the AMF sends a response message (for example, Namf_CommunicationN1N2MessageTransfer) to the V-SMF, to notify the V-SMF of the DDN failure.

S808'. The V-SMF further sends a DDN failure indication to the V-UPF.

S809'. When the AMF determines that the UE is unavailable (for example, the UE is in a PSM status, or the UE is in an MICO status), the AMF sets or activates a corresponding event of terminal availability after DDN failure based on the NEF reference ID.

S810'. The terminal initiates a connection to a network. For example, the terminal initiates a TAU request or a service request to the network.

S811'. If determining that the event of terminal availability after DDN failure is locally set, the AMF sends a terminal event notification (for example, Namf_EventExposure_Notify) to the NEF. The terminal event notification includes at least one of the following information the identifier of the terminal and an NEF reference ID.

In this example, one or more AFs subscribe to a terminal event, and the terminal event is correlated to the AMF mainly in two manners (1) In one manner, one event of availability after DDN failure is subscribed to from the AMF only for one UE, and the event may have different NEF reference IDs such that the AMF can report the event to different AFs using NEFs. (2) In the other manner, each AF serving the UE may subscribe to an event of availability after DDN failure from the AMF for each event such that each event of availability after DDN failure may correspond to a different AF.

In an optional manner, alternatively, the AMF may directly report the event to the AF.

S812'. The NEF sends a terminal event notification (for example, Namf_EventExposure_Notify) to the AF based on the identifier of the terminal and/or the event correlation identifier.

After receiving the terminal event notification, the AF determines that the terminal is available, and may resend downlink data to the terminal. According to the communications method provided in this embodiment of this application, the terminal event is subscribed to from the session management function entity that manages a specific service, when receiving the service detection notification from the UPF entity, the session management function entity instructs the AMF entity to monitor the terminal event. In this way, a terminal event may be subscribed to and monitored for a specific service in a 5G architecture.

The foregoing describes in detail the methods in the embodiments of this application. The following provides apparatuses in the embodiments of this application.

Figure 8:
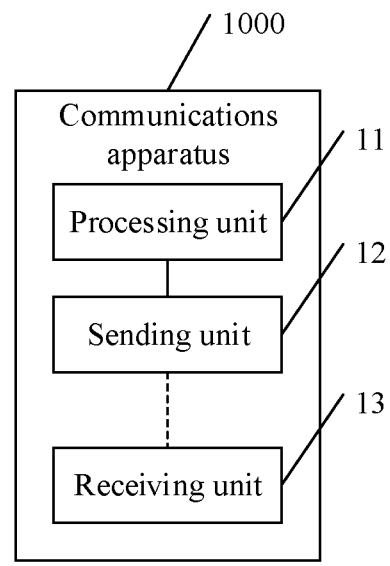
FIG. 8 is a schematic block diagram of a communications apparatus according to an embodiment of this application.

FIG. 8 is a schematic block diagram of a communications apparatus according to an embodiment of this application. The communications apparatus may be the control function entity described in the foregoing communications system, and may be further a UDM, a PCF, an NEF, or the like. Specifically, the communications apparatus 1000 may include a receiving unit 11 and a sending unit 12.

The processing unit 11 is configured to determine a session management function entity based on at least one of a DNN, slice information, and an application function service identifier.

The sending unit 12 is configured to send a first message to the session management function entity, where the first message is used to subscribe to a terminal event, the first message includes service description information, and the service description information is used to indicate a service corresponding to the terminal event.

In an implementation, the service description information is further used to determine an application function entity that provides a service for the terminal.

In another implementation, the first message further includes an event correlation identifier and event type information of the terminal event, the event correlation identifier is used to identify a correlation relationship between the terminal event and a function entity that subscribes to the terminal event, and the event type information is used to identify the terminal event.

In still another implementation, the sending unit is further configured to send a second message to an AMF entity, where the second message is used to subscribe to the terminal event, and the second message includes an event correlation identifier and event type information of the terminal event, the event correlation identifier is used to identify a correlation relationship between the terminal event and a function entity that subscribes to the terminal event, and the event type information is used to identify the terminal event.

In still another implementation, the communications apparatus 1000 may further include a receiving unit 13.

The receiving unit 13 is configured to receive a third message from the application function entity, where the third message is used to subscribe to the terminal event, and the third message includes the service description information.

In still another implementation, the third message further includes at least one of the following information an identifier of the terminal corresponding to the terminal event, the event type information of the terminal event, the DNN, the slice information, and the application function service identifier.

In still another implementation, the receiving unit 13 is further configured to receive the third message forwarded by the network exposure function entity.

In still another implementation, the sending unit 12 is further configured to send at least one of the service description information, the event correlation identifier, the identifier of the terminal, the event type of the terminal event, the DNN, the slice information, and the application function service identifier to a unified data repository function entity for storage.

In still another implementation, the processing unit 11 is further configured to obtain at least one of the service description information, the event correlation identifier, the identifier of the terminal, the event type information of the terminal event, the DNN, the slice information, and the application function service identifier locally or from the unified data repository function entity.

In still another implementation, the receiving unit 13 is further configured to receive the terminal event notification from the AMF entity or the session management function entity. The sending unit 11 is further configured to send the terminal event notification to the application function entity.

In still another implementation, the event type of the terminal event includes an event of terminal availability after DDN failure.

Figure 9A:
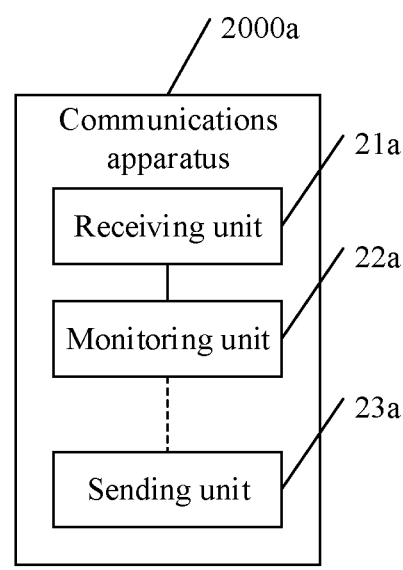
FIG. 9A is a schematic block diagram of another communications apparatus according to an embodiment of this application.

FIG. 9A is a schematic block diagram of another communications apparatus according to an embodiment of this application. The communications apparatus may be the AMF entity described in the foregoing communications system. Specifically, the communications apparatus 2000*a* may include a receiving unit 21*a*, a monitoring unit 22*a*, and a sending unit 23*a*.

The receiving unit 21*a* is configured to receive a first message sent by a session management function entity, where the first message is used to subscribe to a terminal event.

The monitoring unit 22*a* is configured to monitor the subscribed terminal event.

The sending unit 23*a* is configured to, when the monitoring unit detects the terminal event, send the terminal event notification to a function entity that subscribes to the terminal event, where the terminal event notification includes at least one of the following information an identifier of a terminal corresponding to the terminal event and an event correlation identifier of the terminal event, where the event correlation identifier is used to identify a correlation relationship between the terminal event and a function entity that subscribes to the terminal event.

Figure 9B:
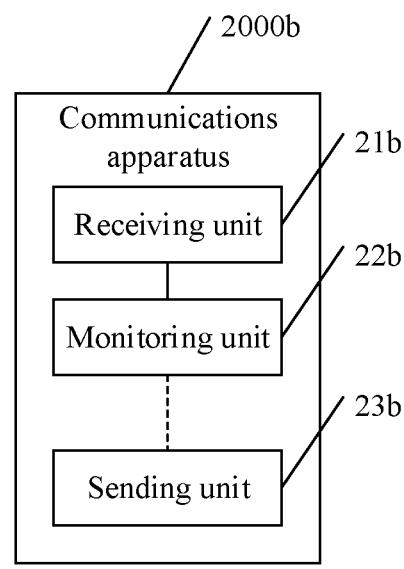
FIG. 9B is a schematic block diagram of still another communications apparatus according to an embodiment of this application.

FIG. 9B is a schematic block diagram of still another communications apparatus according to an embodiment of this application. The communications apparatus may be the AMF entity described in the foregoing communications system. Specifically, the communications apparatus 2000*b* may include a receiving unit 21*b*, a monitoring unit 22*b*, and a sending unit 23*b*.

The receiving unit 21*b* is configured to receive a notification that is for monitoring a terminal reachability event and that is sent by a session management function entity.

The monitoring unit 22*b* is configured to monitor terminal reachability event.

The sending unit 23b is configured to send a terminal reachability notification to the session management function entity when the monitoring unit detects the terminal reachability event, where the terminal reachability notification is used to monitor an event of terminal availability after DDN failure.

Figure 10:
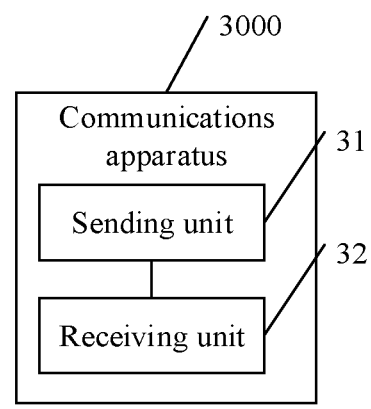
FIG. 10 is a schematic block diagram of still another communications apparatus according to an embodiment of this application.

FIG. 10 is a schematic block diagram of still another communications apparatus according to an embodiment of this application. The communications apparatus may be the session management function entity described in the foregoing communications system. Specifically, the communications apparatus 3000 may include a sending unit 31 and a receiving unit 32.

The sending unit 31 is configured to instruct a UPF entity to detect a service, where the service is a service corresponding to a subscribed terminal event, or is configured to send a service information request to a UPF entity. The receiving unit 32 is configured to receive a service detection notification or service information sent by the UPF entity, where the service detection notification is used to indicate occurrence of the service data. The sending unit 31 is further configured to send, in response to the service detection notification, a notification that is for monitoring the terminal event to an AMF entity.

In an implementation, the receiving unit 32 is further configured to receive a first message sent by a control function entity, where the first message is used to indicate the service, and the first message includes service description information of the service.

In another implementation, the first message is further used to subscribe to the terminal event, the first message includes an event correlation identifier and event type information of the terminal event, the event correlation identifier is used to identify a correlation relationship between the terminal event and a function entity that subscribes to the terminal event, and the event type information is used to identify the terminal event.

In still another implementation, the sending unit 31 is configured to instruct the UPF entity to detect a service when the UPF entity does not store access network tunnel information for transmitting the service data.

In still another implementation, the terminal event includes an event of terminal availability after DDN failure. The receiving unit 32 is further configured to receive a terminal reachability notification or a notification on an event of terminal availability after DDN failure that is sent by the AMF entity, and send the notification on terminal availability after DDN failure to a network exposure function entity or an application function entity.

Figure 11:
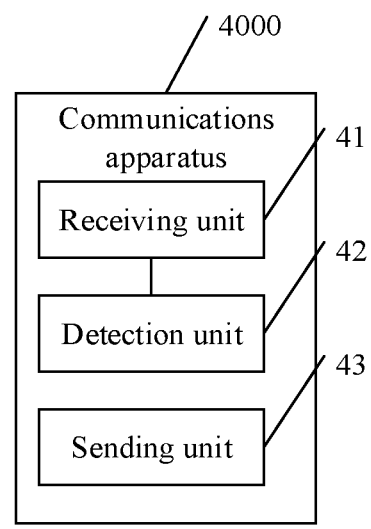
FIG. 11 is a schematic block diagram of still another communications apparatus according to an embodiment of this application.

FIG. 11 is a schematic block diagram of still another communications apparatus according to an embodiment of this application. The communications apparatus may be the UPF entity described in the foregoing communications system. Specifically, the communications apparatus 4000 may include a receiving unit 41, a detection unit 42, and a sending unit 43.

The receiving unit 41 is configured to receive a first message or a service information request sent by a session management function entity, where the first message is used to instruct to detect a service, and the service is a service corresponding to a subscribed terminal event. The detection unit 42 is configured to detect the service based on the first message. The sending unit 43 is configured to send a service detection notification or service information to the session management function entity, where the service detection notification is used to indicate occurrence of the service data.

In an implementation, the detection unit 42 is configured to detect the service based on the first message when access network tunnel information for transmitting the service data is not stored.

Figure 12:
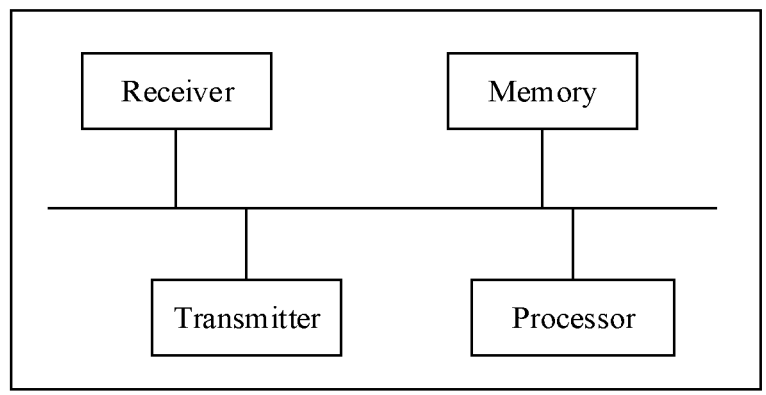
FIG. 12 is a schematic structural diagram of hardware of a communications apparatus according to an embodiment of this application.

FIG. 12 is a schematic structural diagram of hardware of a communications apparatus according to an embodiment of this application. The communications apparatus includes a processor, and may further include a receiver, a transmitter, and a memory. The receiver, the transmitter, the memory, and the processor are connected to each other using a bus.

The memory includes but is not limited to a random-access memory (RAM), a read-only memory (ROM), an erasable programmable read-only memory (EPROM), or a compact disc ROM (CD-ROM). The memory is configured to store a related instruction and related data.

The receiver is configured to receive data and/or a signal, and the transmitter is configured to send data and/or a signal. The transmitter and the receiver may be independent components, or may be an integral component.

The processor may include one or more processors, for example, includes one or more central processing units (CPU). When the processor is one CPU, the CPU may be a single-core CPU, or may be a multi-core CPU.

The memory is configured to store program code and data of the communications apparatus.

The processor is configured to invoke the program code and the data in the memory, to perform the steps in the foregoing method embodiments. For details, refer to the descriptions in the method embodiments, and details are not described herein again.

It may be understood that FIG. 12 shows only a simplified design of the communications apparatus. In an embodiment, the communications apparatus may further include other necessary components, including but not limited to any quantity of transceivers, processors, controllers, memories, and the like, and all communications apparatuses that can implement the embodiments of the present disclosure shall all fall within the protection scope of the present disclosure.

In an embodiment, the communications apparatus may be the control function entity in the foregoing communications system. In FIG. 8, a related function implemented by the receiving unit 13 may be implemented by a receiver, a related function implemented by the sending unit 12 may be implemented by a transmitter, and a related function implemented by the processing unit 11 may be implemented by one or more processors.

Specifically, the processor is configured to determine a session management function entity based on at least one of a DNN, slice information, and an application function service identifier.

The transmitter is configured to send a first message to the session management function entity, where the first message is used to subscribe to a terminal event, the first message includes service description information, and the service description information is used to indicate a service corresponding to the terminal event.

In an implementation, the service description information is further used to determine an application function entity that provides a service for the terminal.

In another implementation, the first message further includes an event correlation identifier and event type information of the terminal event, the event correlation identifier is used to identify a correlation relationship between the terminal event and a function entity that subscribes to the terminal event, and the event type information is used to identify the terminal event.

In still another implementation, the transmitter is further configured to send a second message to an AMF entity, where the second message is used to subscribe to the terminal event, and the second message includes an event correlation identifier and event type information of the terminal event, the event correlation identifier is used to identify a correlation relationship between the terminal event and a function entity that subscribes to the terminal event, and the event type information is used to identify the terminal event.

In still another implementation, the receiver is configured to receive a third message from the application function entity, where the third message is used to subscribe to the terminal event, and the third message includes the service description information.

In still another implementation, the third message further includes at least one of the following information an identifier of the terminal corresponding to the terminal event, the event type information of the terminal event, the DNN, the slice information, and the application function service identifier.

In still another implementation, the receiver is further configured to receive the third message forwarded by a network exposure function entity.

In still another implementation, the transmitter is further configured to send at least one of the service description information, the event correlation identifier, the identifier of the terminal, the event type of the terminal event, the DNN, the slice information, and the application function service identifier to a unified data repository function entity for storage.

In still another implementation, the processor is further configured to obtain at least one of the service description information, the event correlation identifier, the identifier of the terminal, the event type information of the terminal event, the DNN, the slice information, and the application function service identifier locally or from the unified data repository function entity.

In still another implementation, the receiver is further configured to receive the terminal event notification from the AMF entity or the session management function entity. The transmitter is further configured to send the terminal event notification to the application function entity.

In still another implementation, the event type of the terminal event includes an event of terminal availability after DDN failure.

In another embodiment, the communications apparatus may be the AMF entity in the foregoing communications system. In FIG. 9A, a related function implemented by the monitoring unit 22a may be implemented by one or more processors, a related function implemented by the sending unit 23a may be implemented by a transmitter, and a related function implemented by the receiving unit 21a may be implemented by a receiver.

Specifically, the receiver is configured to receive a first message sent by a session management function entity, where the first message is used to subscribe to a terminal event.

The processor is configured to monitor the subscribed terminal event.

The transmitter is configured to, when the processor detects the terminal event, send the terminal event notification to a function entity that subscribes to the terminal event, where the terminal event notification includes at least one of the following information an identifier of a terminal corresponding to the terminal event and an event correlation identifier of the terminal event, where the event correlation identifier is used to identify a correlation relationship between the terminal event and a function entity that subscribes to the terminal event.

In still another embodiment, the communications apparatus may be the AMF entity in the foregoing communications system. In FIG. 9B, a related function implemented by the receiving unit 21b may be implemented by a receiver, a related function implemented by the monitoring unit 22b may be implemented by one or more processors, and a related function implemented by the sending unit 23b may be implemented by a transmitter.

Specifically, the receiver is configured to receive a notification that is for monitoring a terminal reachability event and that is sent by a session management function entity.

The processor is configured to monitor a terminal reachability event.

The transmitter is configured to send a terminal reachability notification to the session management function entity when the monitoring unit detects the terminal reachability event, where the terminal reachability notification is used to monitor an event of terminal availability after DDN failure.

In still another embodiment, the communications apparatus may be the session management function entity in the foregoing communications system. In FIG. 10, a related function implemented by the sending unit 31 may be implemented by the transmitter, and a related function implemented by the receiving unit 32 may be implemented by the receiver.

Specifically, the transmitter is configured to instruct a UPF entity to detect a service, where the service is a service corresponding to a subscribed terminal event.

The receiver is configured to receive a service detection notification sent by the UPF entity, where the service detection notification is used to indicate occurrence of the service data.

The transmitter is further configured to send, in response to the service detection notification, a notification that is for monitoring the terminal event to an AMF entity.

In an implementation, the receiver is further configured to receive a first message sent by a control function entity, where the first message is used to indicate the service, and the first message includes service description information of the service.

In another implementation, the first message is further used to subscribe to the terminal event, the first message includes an event correlation identifier and event type information of the terminal event, the event correlation identifier is used to identify a correlation relationship between the terminal event and a function entity that subscribes to the terminal event, and the event type information is used to identify the terminal event.

In still another implementation, the transmitter is configured to instruct the UPF entity to detect a service when the UPF entity does not store access network tunnel information for transmitting the service data.

In still another implementation, the terminal event includes an event of terminal availability after DDN failure. The receiver is further configured to receive a terminal reachability notification or a notification on an event of terminal availability after DDN failure that is sent by the AMF entity, and send the notification on terminal availability after DDN failure to a network exposure function entity or an application function entity.

In still another embodiment, the communications apparatus may be the UPF entity in the foregoing communications system. In FIG. 11, a related function implemented by the receiving unit 41 may be implemented by a receiver, a related function implemented by the detection unit 42 may be implemented by one or more processors, and a related function implemented by the sending unit 43 may be implemented by a transmitter.

Specifically, the receiver is configured to receive a first message sent by a session management function entity, where the first message is used to instruct to detect a service, and the service is a service corresponding to a subscribed terminal event.

The processor is configured to detect the service based on the first message.

The transmitter is configured to send a service detection notification to the session management function entity, where the service detection notification is used to indicate occurrence of the service data.

In an implementation, the processor is configured to detect the service based on the first message when access network tunnel information for transmitting the service data is not stored.

Figure 15:
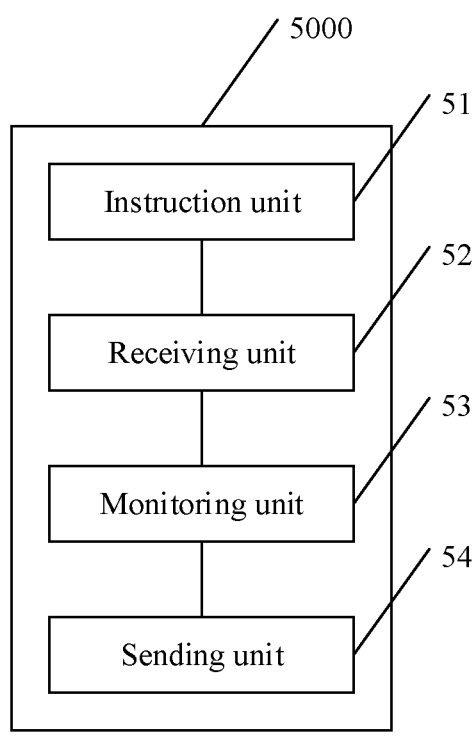
FIG. 15 is a schematic block diagram of still another communications apparatus according to an embodiment of this application.

In still another embodiment, the communications apparatus may be the session management function entity in the foregoing communications system. In FIG. 15, a related function implemented by a receiving unit 52 may be implemented by a receiver, a related function implemented by an instruction unit 51 and a monitoring unit 53 may be implemented by one or more processors, and a related function implemented by a sending unit 54 may be implemented by a transmitter.

Specifically, the processor is configured to instruct a UPF entity to detect a service, where the service is a service corresponding to a terminal event subscribed to by a first application function entity.

The receiver is configured to receive a service detection notification sent by the UPF entity, where the service detection notification is used to indicate that data of the service is detected.

The processor is further configured to monitor the terminal event based on the service detection notification when the terminal is unreachable.

The transmitter is configured to, when the terminal event is detected, send a terminal event notification to a network exposure function entity or the first application function entity.

Figure 13:
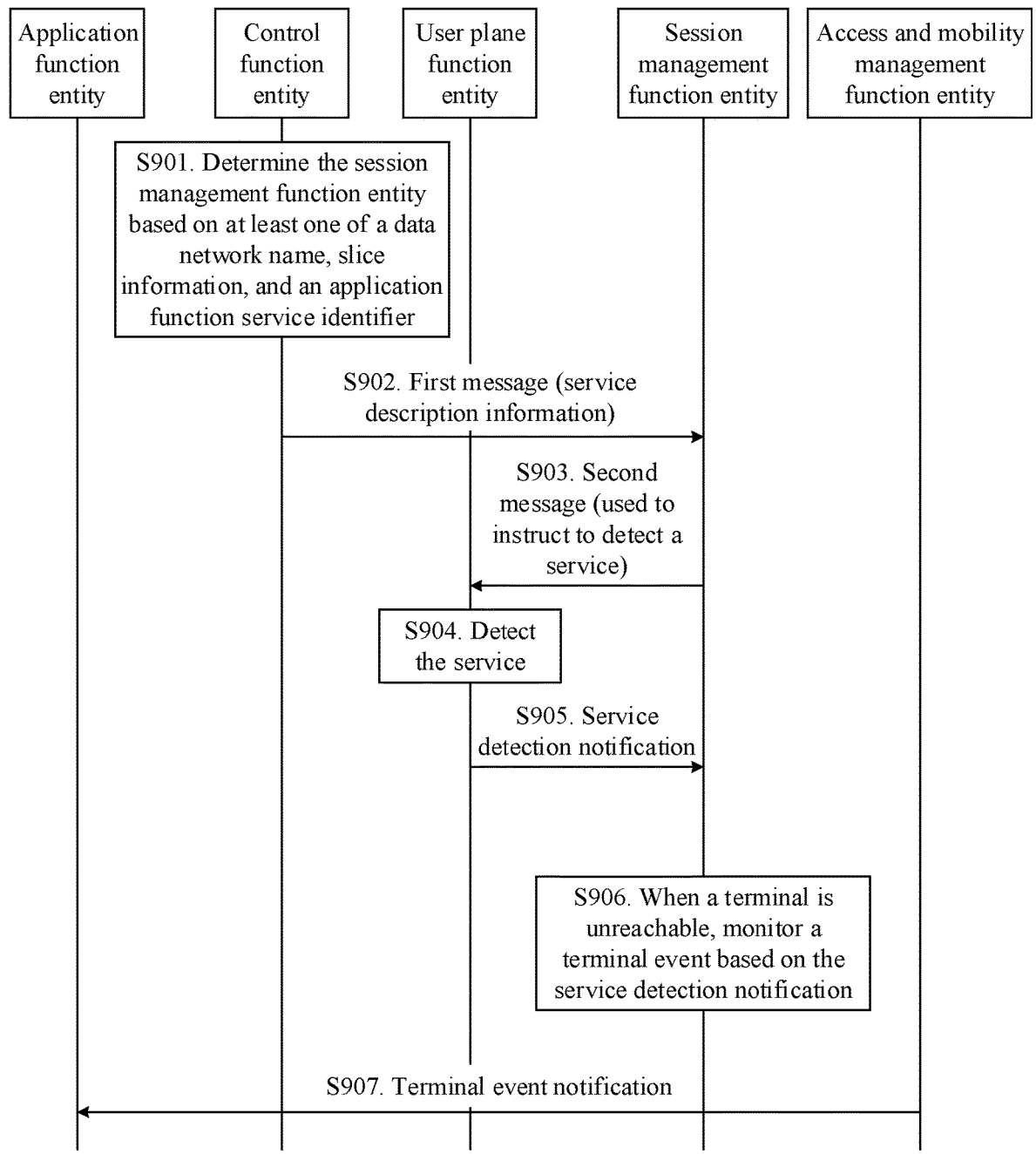
FIG. 13 is a schematic flowchart of still another communications method according to an embodiment of this application.

FIG. 13 is a schematic flowchart of still another communications method according to an embodiment of this application. The method may include the following steps.

S901. A control function entity determines a session management function entity based on at least one of a DNN, slice information, and an application function service identifier.

Specifically, that a control function entity determines a session management function entity based on at least one of a DNN, slice information, and an application function service identifier may be the control function entity determines the session management function entity based on the DNN, based on the slice information, based on the application function service identifier, based on the DNN and the slice information, based on the DNN and the application function service identifier, based on the slice information and the application function service identifier, or based on the DNN, the slice information, and the application function service identifier.

S902. The control function entity sends a first message to the session management function entity. The first message is used to subscribe to a terminal event, the first message includes service description information, and the service description information is used to indicate a service corresponding to the terminal event.

The terminal event includes an event of terminal availability after DDN failure or a terminal reachability event.

The subscribing to a terminal event means that, when service data is sent, UE is unreachable, or when service data fails to be sent, a UE reachability event or a data availability event is monitored such that an AF resends the service data.

S903. The session management function entity sends a second message to a UPF entity. The second message is used to instruct the UPF entity to detect a service. The service is the service corresponding to the subscribed terminal event. In addition, in another implementation, the second message may be a service information request, and is used to instruct the UPF entity to report service information. In this case, S904 does not need to be performed. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

Optionally, the SMF instructs, by sending a second message, the UPF to detect a service.

S904. Optionally, when the received second message is used to instruct the UPF entity to detect a service, the UPF entity detects the service.

S905. The UPF entity sends a service detection notification to the session management function entity. The service detection notification is used to indicate occurrence of service data. The session management function entity receives the service detection notification. In another implementation, the service detection notification may be service information, that is, the service information in S903. The service information is determined based on the downlink data packet, and further, is determined based on a packet header of the received downlink data packet. For example, when the downlink data packet is an IP data packet, a packet header of the downlink data packet includes IP quintuple information, when the downlink data packet is an Ethernet data packet, a packet header of the downlink data packet includes a MAC address.

S906. When the terminal is unreachable, the session management function entity monitors the terminal event based on the service detection notification.

Specifically, when the notification on a downlink data sending failure sent by the AMF entity is received or service data of a second application function entity is detected, it is determined that the terminal is unreachable if an unreachability notification sent by the AMF entity is received.

That the SMF monitors the terminal event based on the service detection notification means that the SMF monitors the terminal event after the SMF receives the service detection notification and when the UE is unreachable.

S907. When detecting the terminal event, the session management function entity sends a terminal event notification to the application function entity.

An optional manner of monitoring the terminal event is receiving a terminal reachability event notification or a notification on an event of terminal availability after downlink data sending failure that is sent by the AMF entity, and monitoring the terminal event when the terminal reachability event notification or the notification on the event of terminal availability after downlink data sending failure that is sent by the AMF entity is received.

Specifically, the terminal event notification is sent to the NEF or a first application function entity.

According to the communications method provided in this embodiment of this application, the session management function entity instructs the UPF entity to detect a specific service, when the terminal is unreachable, monitors the terminal event based on the service detection notification sent by the UPF entity, and sends the terminal event notification when detecting the terminal event. In this way, a terminal event may be subscribed to and notified of for a specific service in a 5G architecture.

The following describes in detail the embodiment shown in FIG. 13 with reference to specific examples.

Figure 14B:
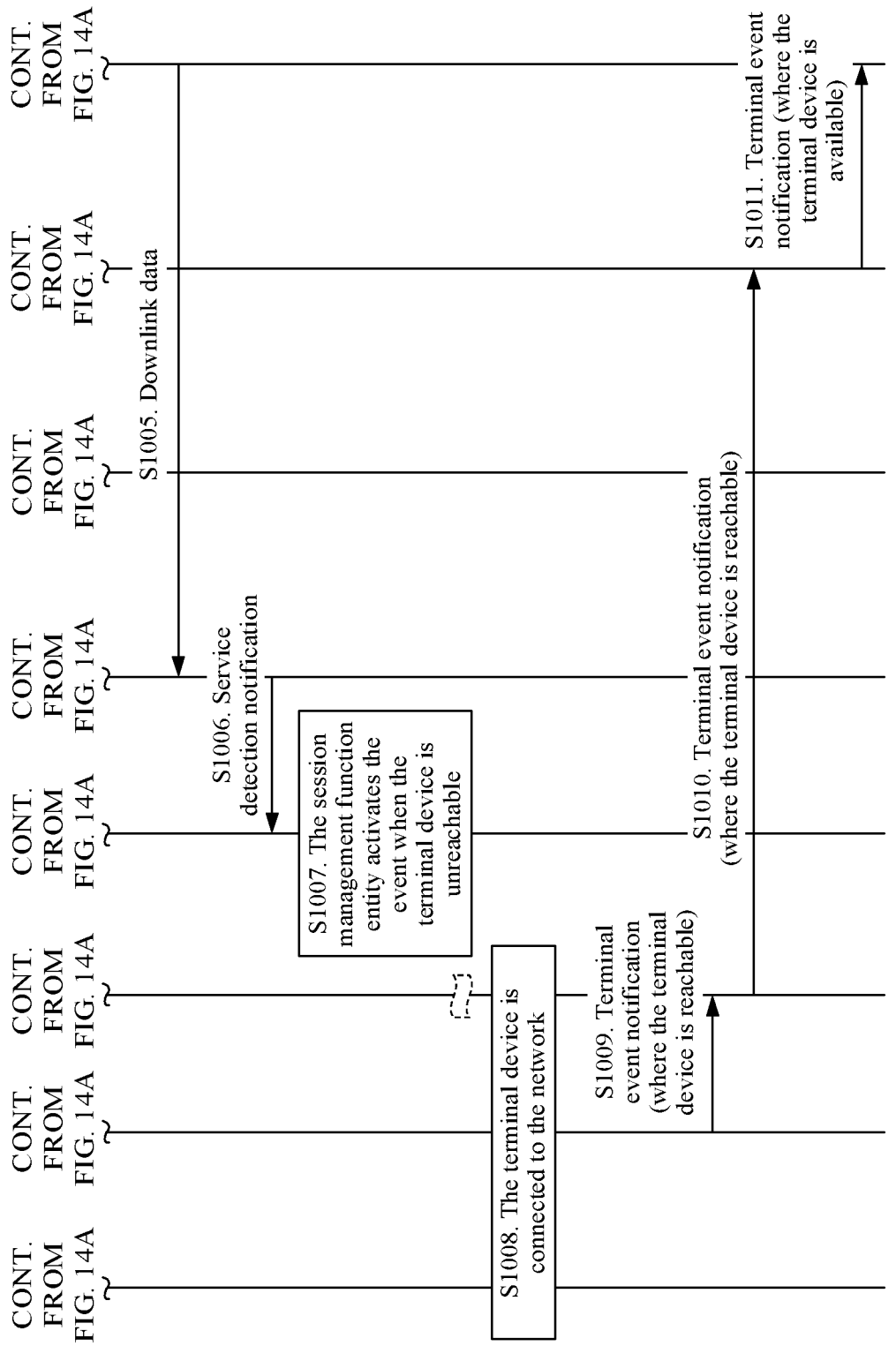

FIG. 14A and FIG. 14B are a schematic flowchart of still another communications method according to an embodiment of this application. The method may include the following steps.

S1001. A UDM/PCF determines a target SMF based on a DNN/S-NSSAI/AF-service-ID. The DNN/S-NSSAI/AF-service-ID may be obtained from a UDR or may be locally stored.

S1002. The UDM/PCF sends a first message (for example, Nsmf_EventExposure) to the target SMF. The first message includes service description information, event type information, and an event correlation identifier (for example, an NEF reference ID), and may further include information such as an NEF ID. In this example, an event type is an event of terminal availability after DDN failure.

The SMF receives the first message.

Specifically, after the SMF receives the event of availability after DDN failure and the service description information, the SMF correlates the event of availability after DDN failure with the service description information. If the two are sent together (sent in a same message), it indicates that the two are correlated with each other. Alternatively, if the service description information is sent in a subscription message on the event of availability after DDN failure, it indicates that the two are correlated with each other.

S1003. The SMF sends a service detection message to a UPF in a procedure for setting up or modifying an N4 session. The service detection message includes the service description information.

Specifically, when receiving, from the UPF, a notification that data corresponding to the service description information is detected, the SMF may determine an event to which the data corresponds triggers the event, and therefore send the event correlation identifier to a corresponding AMF. In addition, in another implementation, the service detection message may be a service information request used to instruct the UPF entity to report service information. In this case, S1006 does not need to be performed. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

The UPF detects a corresponding service based on the service detection message, that is, detects a service corresponding to the service description information.

S1004. The AMF sends UE unreachability information to the SMF.

The AMF may send the UE unreachability information to the SMF when receiving service data sent by another AF and detecting that UE is unreachable. Alternatively, the AMF sends the UE unreachability information to the SMF in case of a DDN failure.

Optionally, S1004 may be any step before S1007.

S1005. An AF sends a downlink data packet to the terminal.

S1006. Optionally, when the received service detection message is used to instruct the UPF entity to detect a service, the UPF detects, according to a packet detection rule, that the downlink data packet is a service corresponding to the subscribed terminal event.

When the UPF does not store access tunnel information of the session, a user plane tunnel needs to be established, and the UPF sends a service detection notification to the SMF. The service detection notification is used to indicate that occurrence of the service data is detected.

Specifically, the service corresponding to the subscribed terminal event is the service corresponding to the service description information. The packet detection rule includes the service description information. For example, the service description information is an IP triplet, and the UPF detects the received downlink data packet based on the IP triplet. When the downlink data packet corresponding to the IP triplet is detected, it is determined that occurrence of the service data is detected.

S1007. The SMF activates an event when the UE is unreachable.

In this embodiment, the SMF monitors a terminal reachability event.

For a subsequent procedure, refer to the embodiment shown in FIG. 7A and FIG. 7B. Details are not described herein again.

S1008. The terminal initiates a connection to a network. For example, the terminal initiates a TAU request or a service request to the network.

S1009. The AMF sends a UE reachability event notification to the SMF.

In another implementation, the service detection notification may be service information, that is, the service information in S1003. The service information is determined based on the downlink data packet, and further, is determined based on a packet header of the received downlink data packet. For example, when the downlink data packet is an IP data packet, a packet header of the downlink data packet includes IP quintuple information, when the downlink data packet is an Ethernet data packet, a packet header of the downlink data packet includes a MAC address.

S1010. The SMF sends a terminal event notification to an NEF if determining that the UE reachability event is locally set. The terminal event notification includes at least one of the following information an identifier of the terminal and an event correlation identifier (for example, an NEF reference ID).

S1011. The NEF sends a terminal availability event notification (for example, Namf_EventExposure_Notify) to the AF based on the identifier of the terminal and/or the NEF reference ID.

After receiving the terminal event notification, the AF determines that the terminal is available, and may resend downlink data to the terminal.

Figure 2:
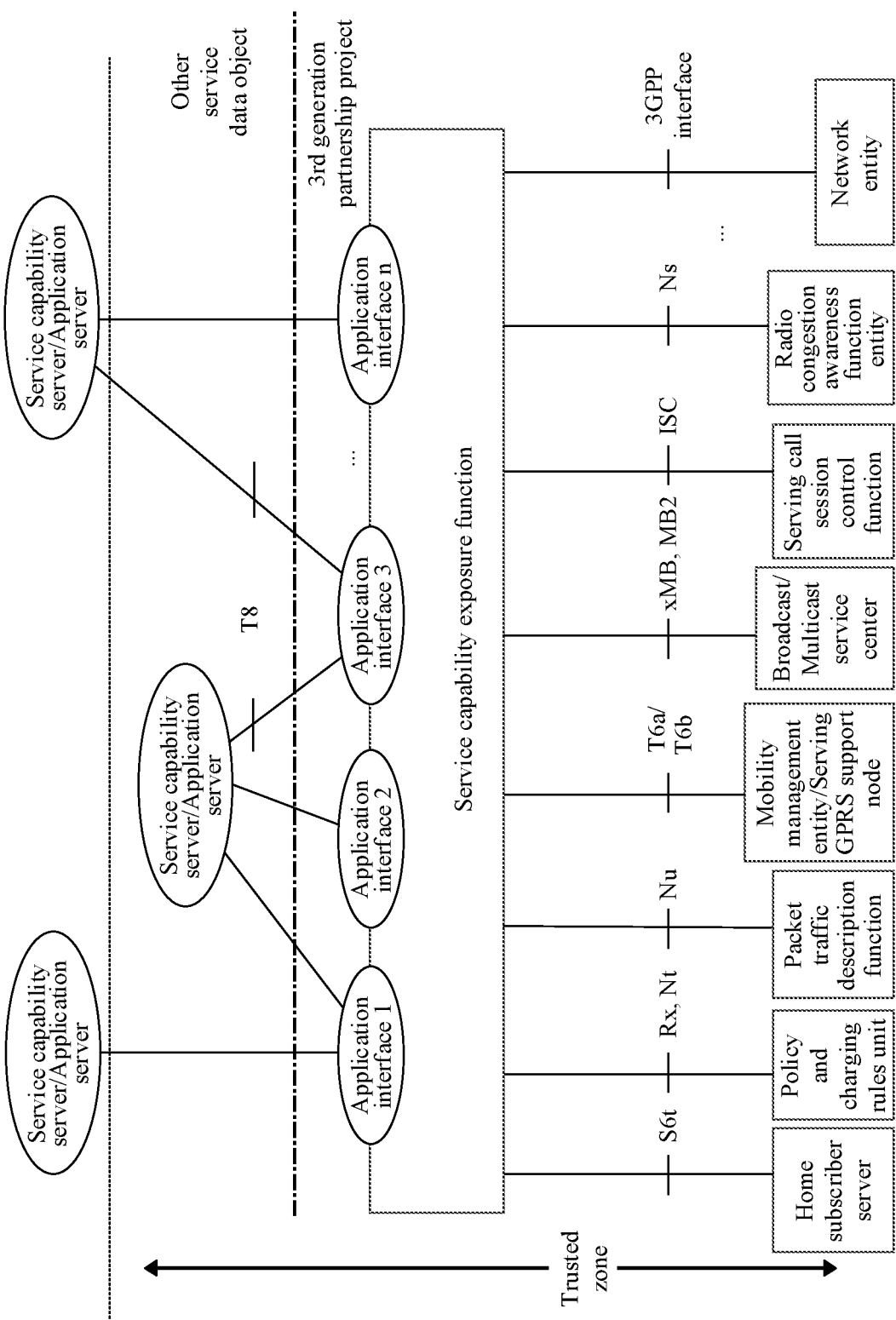
FIG. 2 is a schematic architecture diagram of an interface in a 3GPP EPS network architecture opened using an SCEF.

FIG. 14b-1 and FIG. 14b-2 are a schematic flowchart of still another communications method according to an embodiment of this application. The method may include the following steps.

S1101. A UDM/PCF determines a target SMF based on a DNN/S-NSSAI/AF-service-ID. The DNN/S-NSSAI/AF-service-ID may be obtained from a UDR or may be locally stored.

S1102. The UDM/PCF sends a first message to the target SMF.

S1103. The SMF sends a service detection message to a UPF in a procedure for setting up or modifying an N4 session.

S1104. An AF sends a downlink data packet to a terminal.

S1105. The UPF sends a service detection notification to the SMF.

S1106. The SMF sends a second message to the AMF.

Different from the embodiment shown in FIG. 14A and FIG. 14B, the second message herein is an ordinary DDN message instead of an event subscription message. For implementation of other steps, refer to descriptions of corresponding steps in FIG. 14A and FIG. 14B. Details are not described herein again. In addition, in another implementation, the second message may be a service information request, and is used to instruct the UPF entity to report service information. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

S1107. The AMF sends a response message to the SMF, to notify the SMF that the UE is unreachable.

Correspondingly, after receiving the second message, if detecting that the UE is unreachable, the AMF notifies the SMF that the UE is unreachable.

S1108. The SMF activates an event when the UE is unreachable.

S1109. The SMF sends a DDN failure message to the UPF.

S1110. The AMF stores a first indication, where the first indication is used to indicate that the SMF has been notified that the UE is unreachable.

The AMF stores the first indication, to notify the SMF when the UE is reachable.

For a subsequent procedure, refer to the embodiment shown in FIG. 7A and FIG. 7B. Details are not described herein again.

S1111. The terminal initiates a connection to a network.

S1112. The AMF sends a UE reachability event notification to the SMF.

S1113. The SMF sends a terminal event notification to an NEF if determining that a UE reachability event is locally set.

S1114. The NEF sends a terminal availability event notification to the AF based on an identifier of the terminal and/or an NEF reference ID.

After receiving the terminal event notification, the AF determines that the terminal is available, and may resend downlink data to the terminal.

FIG. 14c-1 to FIG. 14c-3 are a schematic flowchart of still another communications method according to an embodiment of this application. The method is applied to a roaming scenario. The method may include the following steps.

S1201. A UDM/PCF determines to subscribe to a terminal event from an SMF.

Specifically, the UDM/PCF determines a target H-SMF based on a DNN/S-NSSAI/AF-service-ID. The DNN/S-NSSAI/AF-service-ID may be obtained from a UDR or may be locally stored.

S1202a. The UDM/PCF sends a first message (for example, Nsmf_EventExposure) to the target H-SMF. The first message includes service description information, event type information, and an event correlation identifier (for example, an NEF reference ID), and may further include information such as an NEF ID. In this example, an event type is an event of terminal availability after DDN failure.

The H-SMF receives the first message.

S1202b. The H-SMF forwards the first message to a V-SMF.

After the V-SMF receives the event of availability after DDN failure and the service description information, the V-SMF correlates the event of availability after DDN failure with the service description information. If the two are sent together (sent in a same message), it indicates that the two are correlated with each other. Alternatively, if the service description information is sent in a subscription message on the event of availability after DDN failure, it indicates that the two are correlated with each other.

S1203. The V-SMF sends a service detection message to a V-UPF in a procedure for setting up or modifying an N4 session. The service detection message includes the service description information.

Specifically, when receiving, from the V-UPF, a notification that data corresponding to the service description information is detected, the V-SMF may determine an event to which the data corresponds triggers the event, and therefore send the event correlation identifier to a corresponding AMF.

The V-UPF detects a corresponding service based on the service detection message, that is, detects a service corresponding to the service description information.

In addition, in another implementation, a second message may be a service information request, and is used to instruct the UPF entity to report service information. In this case, S1205 does not need to be performed. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

For a subsequent procedure such as detecting, by the AMF, whether UE is reachable, refer to the embodiment shown in FIG. 7A and FIG. 7B. Details are not described herein again.

S1204. An AF sends a downlink data packet to a terminal.

S1205. Optionally, when the received second message is used to instruct the UPF entity to detect a service, the V-UPF detects, according to a packet detection rule, that the downlink data packet is a service corresponding to the subscribed terminal event.

When the V-UPF does not store access tunnel information of the session, a user plane tunnel needs to be established, and the V-UPF sends a service detection notification to the V-SMF. The service detection notification is used to indicate that occurrence of service data is detected.

S1206. When the UE is unreachable, the V-SMF activates an event of availability after DDN failure.

In this embodiment, the V-SMF monitors the terminal event.

For a subsequent procedure such as detecting, by the AMF, that the UE is reachable and notifying the V-SMF, refer to the embodiment shown in FIG. 7A and FIG. 7B. Details are not described herein again.

The terminal initiates a connection to a network.

S1207. The AMF sends a first terminal event notification to the V-SMF. The first terminal event notification is a UE reachability event notification.

S1208a. The V-SMF sends a terminal event notification to an NEF if determining that a UE reachability event is locally set.

S1209. The NEF sends a terminal availability event notification (for example, Namf_EventExposure_Notify) to the AF based on an identifier of the terminal and/or the NEF reference ID.

As an alternative step of S1208a and S1209, in S1208b, the V-SMF sends a terminal availability event notification to the AF.

After receiving the terminal event notification, the AF determines that the terminal is available, and may resend downlink data to the terminal.

FIG. 14d-1 and FIG. 14d-2 are a schematic flowchart of still another communications method according to an embodiment of this application. The method is applied to a roaming scenario. The method may include the following steps.

S1301. A UDM/PCF determines to subscribe to a terminal event from an SMF.

Specifically, the UDM/PCF determines a target H-SMF based on a DNN/S-NSSAI/AF-service-ID. The DNN/S-NSSAI/AF-service-ID may be obtained from a UDR or may be locally stored.

S1302. The UDM/PCF sends a first message (for example, Nsmf_EventExposure) to the target H-SMF. The first message includes service description information, event type information, and an event correlation identifier (for example, an NEF reference ID), and may further include information such as an NEF ID. In this example, an event type is an event of terminal availability after DDN failure.

The H-SMF receives the first message.

After the H-SMF receives the event of availability after DDN failure and the service description information, the H-SMF correlates the event of availability after DDN failure with the service description information. If the two are sent together (sent in a same message), it indicates that the two are correlated with each other. Alternatively, if the service description information is sent in a subscription message on the event of availability after DDN failure, it indicates that the two are correlated with each other.

S1303. The H-SMF sends a service detection message to an H-UPF in a procedure for setting up or modifying an N4 session. The service detection message includes the service description information.

Specifically, when receiving, from the H-UPF, a notification that data corresponding to the service description information is detected, the H-SMF may determine an event to which the data corresponds triggers the event, and therefore send the event correlation identifier to a corresponding AMF.

The H-UPF detects a corresponding service based on the service detection message, that is, detects a service corresponding to the service description information.

In addition, in another implementation, a second message may be a service information request, and is used to instruct the UPF entity to report service information. In this case, S1306 does not need to be performed. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

S1304. The H-SMF receives UE unreachability information.

The AMF may send the UE reachability information to the H-SMF when receiving service data sent by another AF and detecting that the UE is unreachable.

Optionally, S1304 may be any step before S1307.

S1305. An AF sends a downlink data packet to the terminal.

S1306. Optionally, when the received service detection message is used to instruct the UPF entity to detect a service, the H-UPF detects, according to the packet detection rule, that the downlink data packet is a service corresponding to the subscribed terminal event.

When the H-UPF does not store access tunnel information of the session, a user plane tunnel needs to be established, and the H-UPF sends a service detection notification to the H-SMF. The service detection notification is used to indicate that occurrence of service data is detected.

S1307. When the UE is unreachable, the H-SMF activates an event of availability after DDN failure.

In this embodiment, the H-SMF monitors the terminal event.

For a subsequent procedure such as detecting, by the AMF, that the UE is reachable and notifying the H-SMF, refer to the embodiment shown in FIG. 7A and FIG. 7B. Details are not described herein again.

The terminal initiates a connection to a network.

S1308. The AMF sends a terminal event notification to a V-SMF. The terminal event notification is a UE reachability event notification.

S1309a. The V-SMF forwards the terminal event notification to the H-SMF.

S1309b. The H-SMF sends a terminal event notification to an NEF if determining that a UE reachability event is locally set.

S1310. The NEF sends a terminal availability event notification (for example, Namf_EventExposure_Notify) to the AF based on an identifier of the terminal and/or the NEF reference ID.

After receiving the terminal event notification, the AF determines that the terminal is available, and may resend downlink data to the terminal.

Figure 14E:
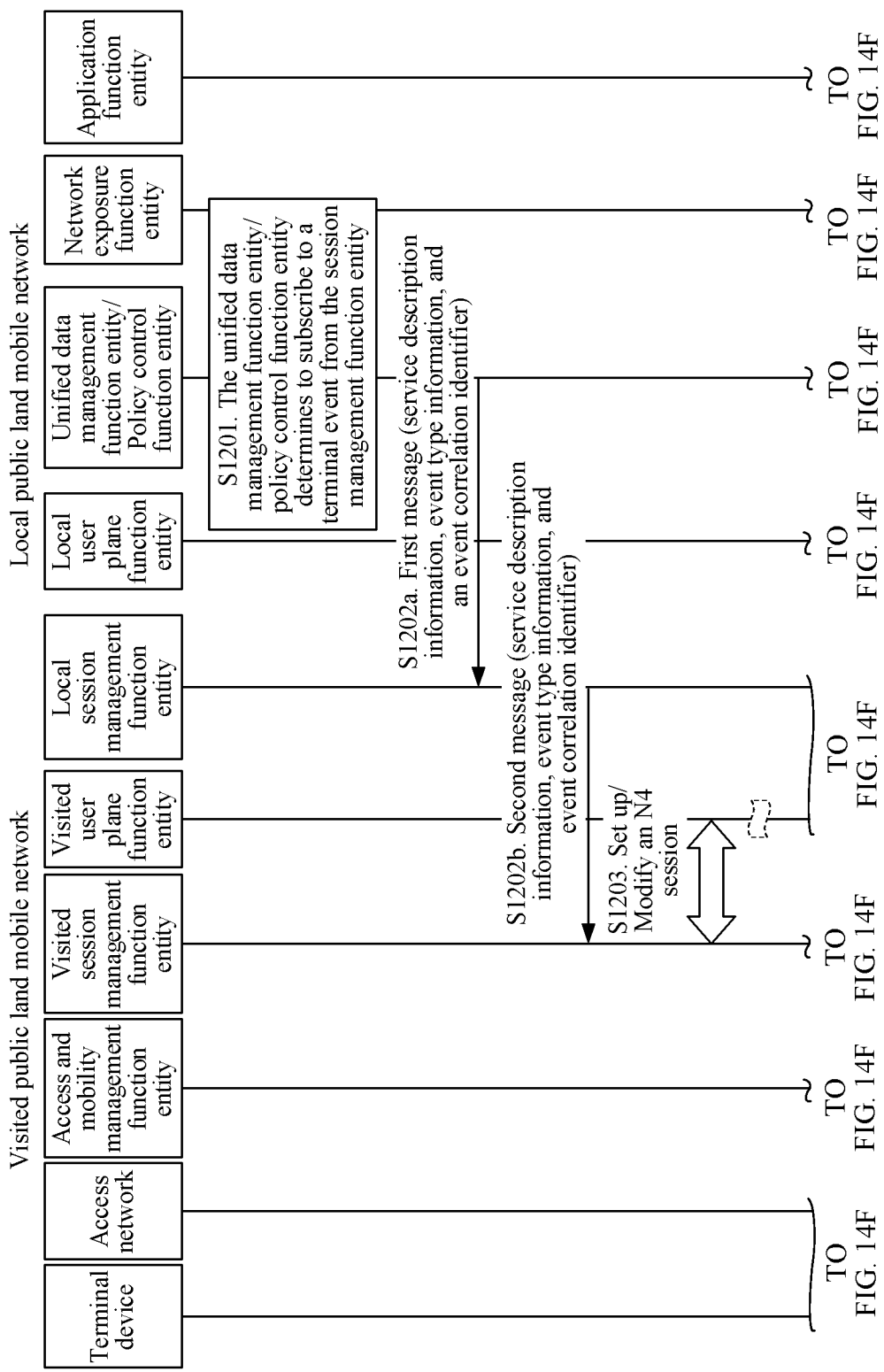

FIG. 14e is a schematic flowchart of still another communications method according to an embodiment of this application. The method may include the following steps.

S1400. A V-SMF receives event information or instruction information from an H-SMF. The instruction information is used to instruct the V-SMF to send an N4 session release request to a V-UPF when the V-SMF receives session deactivation information sent by an AMF.

S1401a. UE and a (R)AN perform a connection release procedure.

S1401b. The (R)AN sends a UE context release request to the AMF.

S1402. The AMF sends a UE context release command to the (R)AN.

S1403. The (R)AN and the UE complete the connection release procedure.

S1404. The (R)AN sends a UE context release complete message to the AMF.

S1405. The AMF sends a session update session context (PDU session update SM context) message to the V-SMF.

S1406. The V-SMF deletes an N4 session of the V-UPF according to the instruction information, and instructs the H-SMF to modify an N4 session of an A-UPF. In the foregoing embodiment, the V-SMF obtains event monitoring information, and may manage the session based on the event monitoring information.

Specifically, the following steps are included.

S1406a. The V-SMF sends a session release request (N4 session release request) to the V-UPF.

S1406'a. The V-SMF sends a session update request (PDU session update request) to the H-SMF.

S1406b. The V-UPF sends a session release response (N4 session release response) to the V-SMF.

S1406'b. The H-SMF sends a session update response (PDU session update response) to the V-SMF.

S1407. The V-SMF sends a session update session management context response (PDU session update session management (SM) context acknowledgement (ACK)) to the AMF.

Figure 14F:
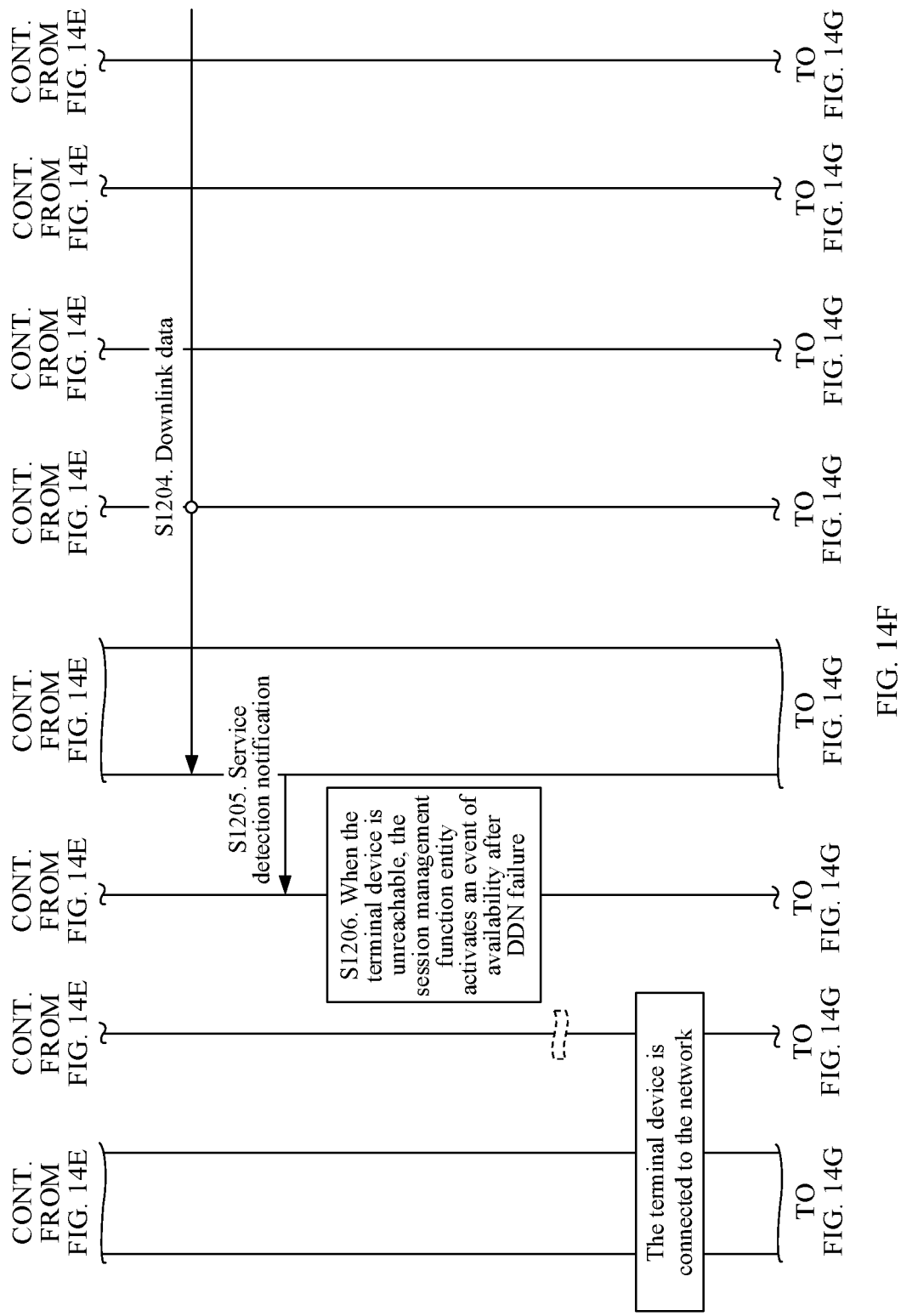
Figure 14G:
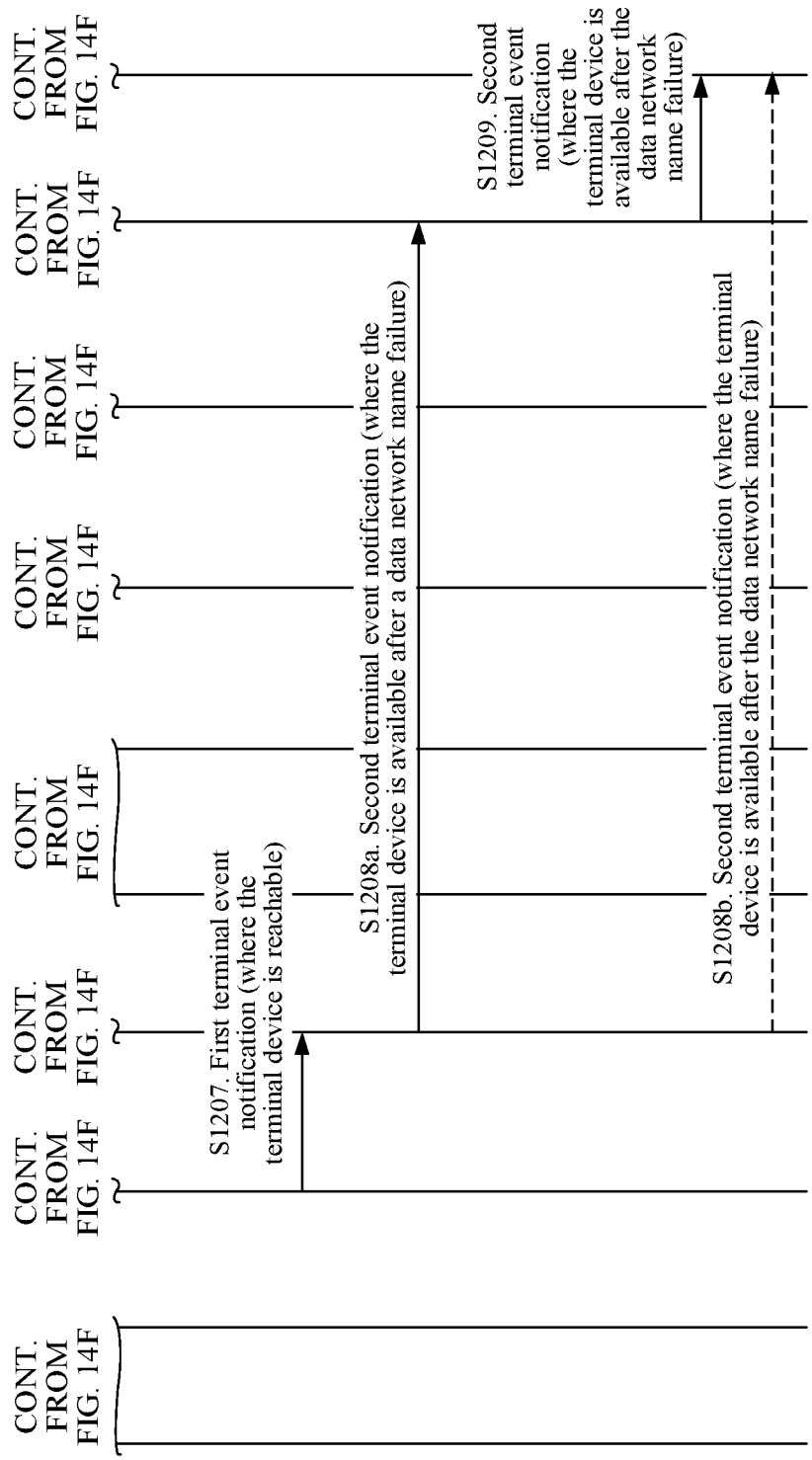
Figure 14H:
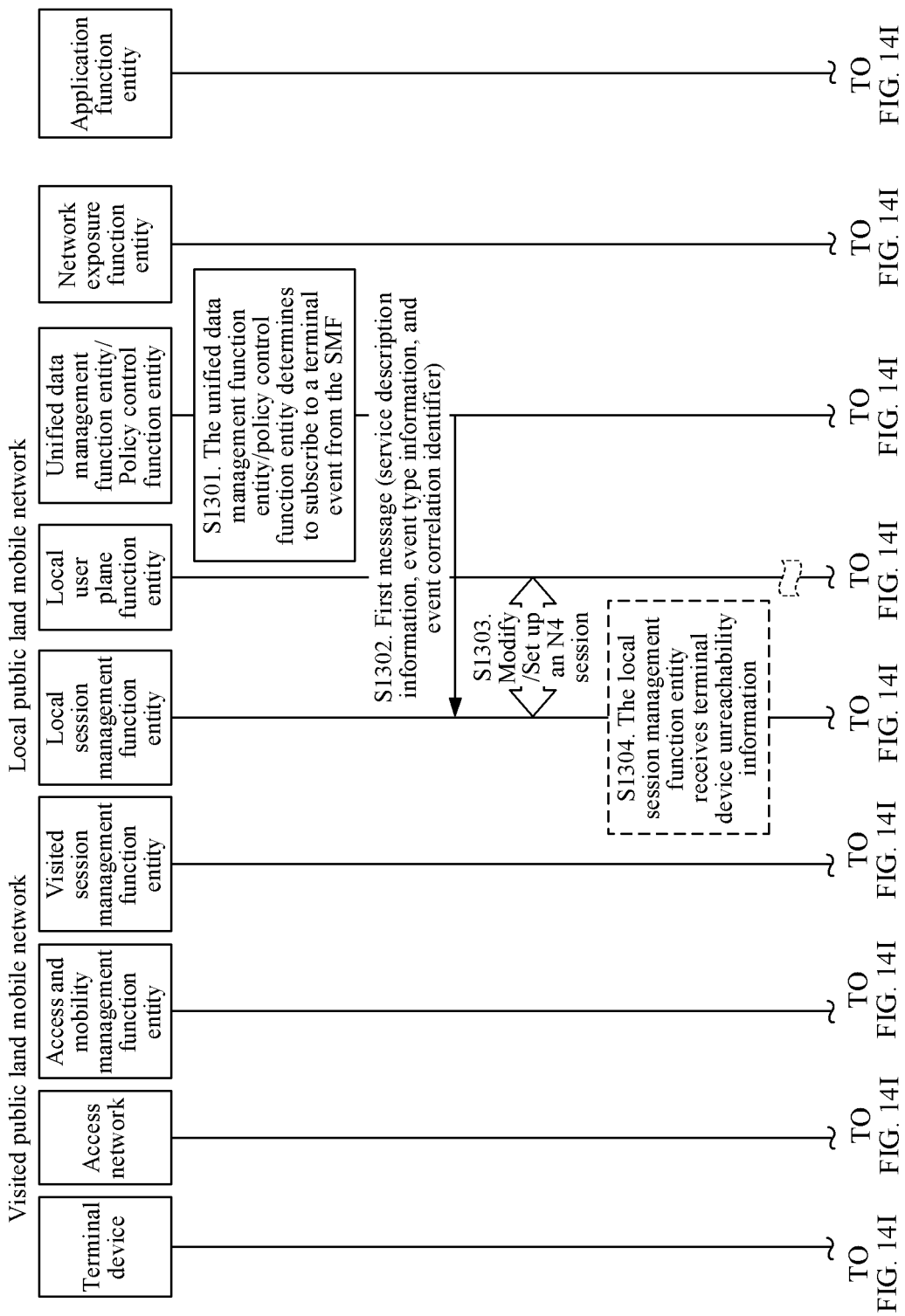
Figure 14I:
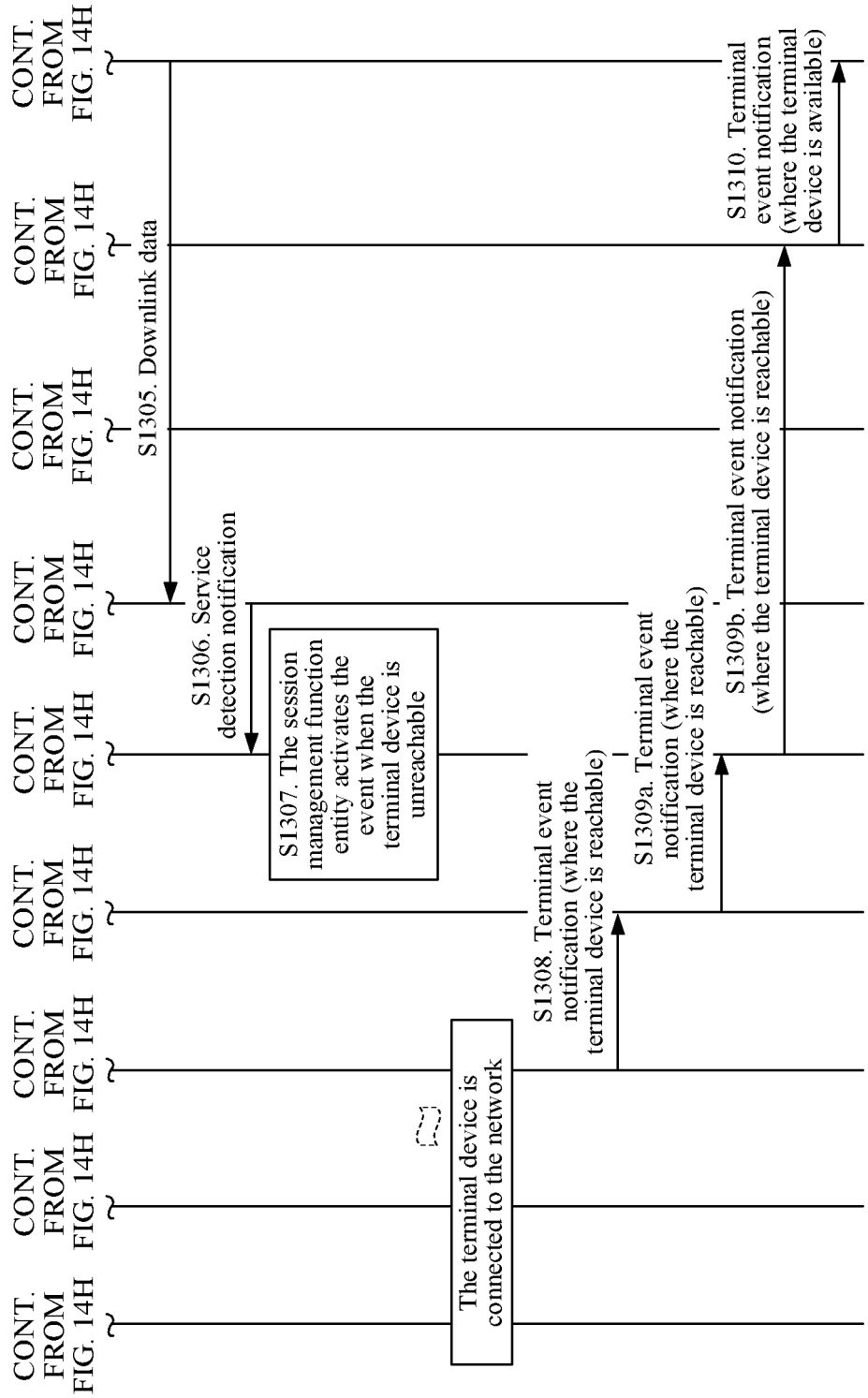
Figure 14J:
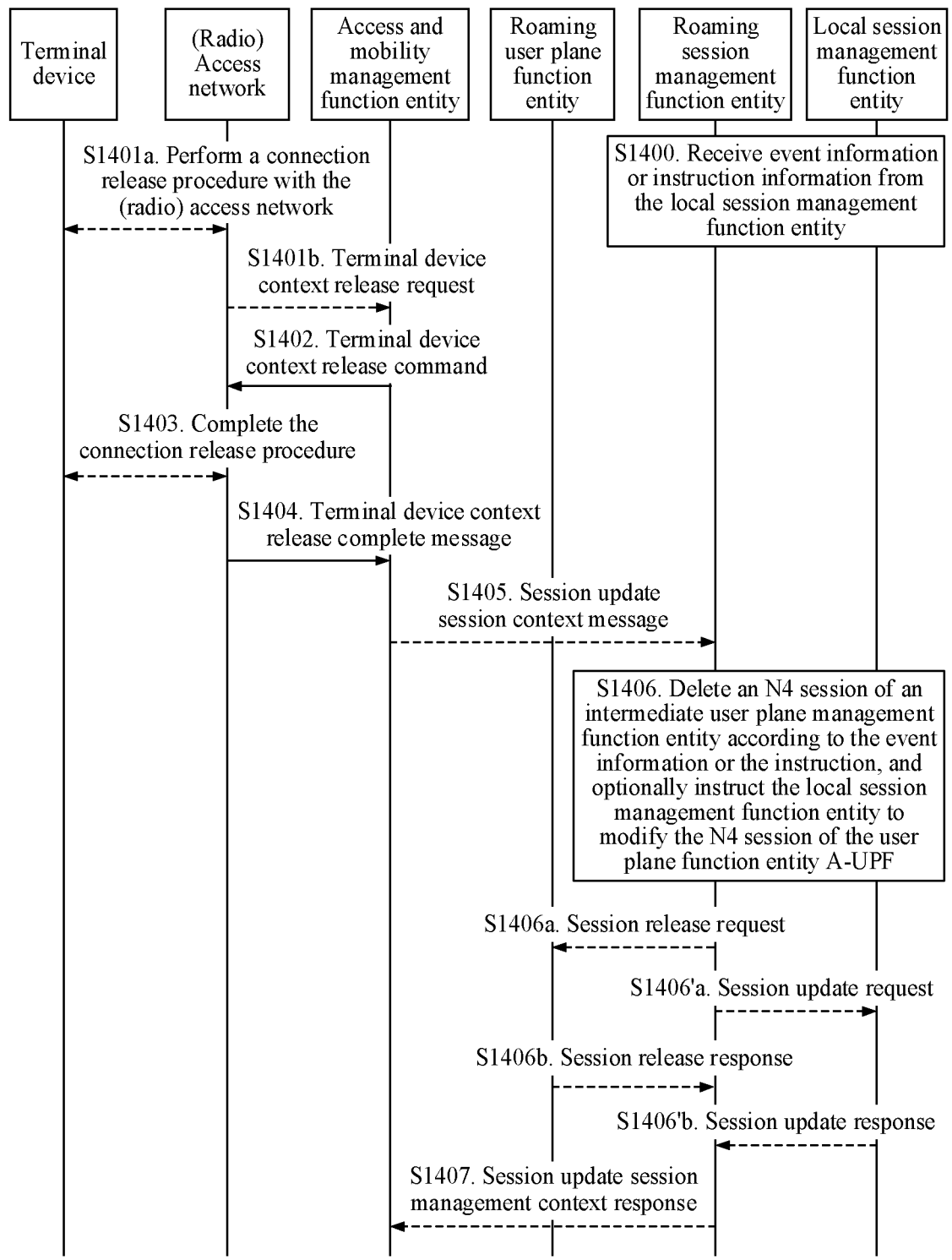
Figure 14K:
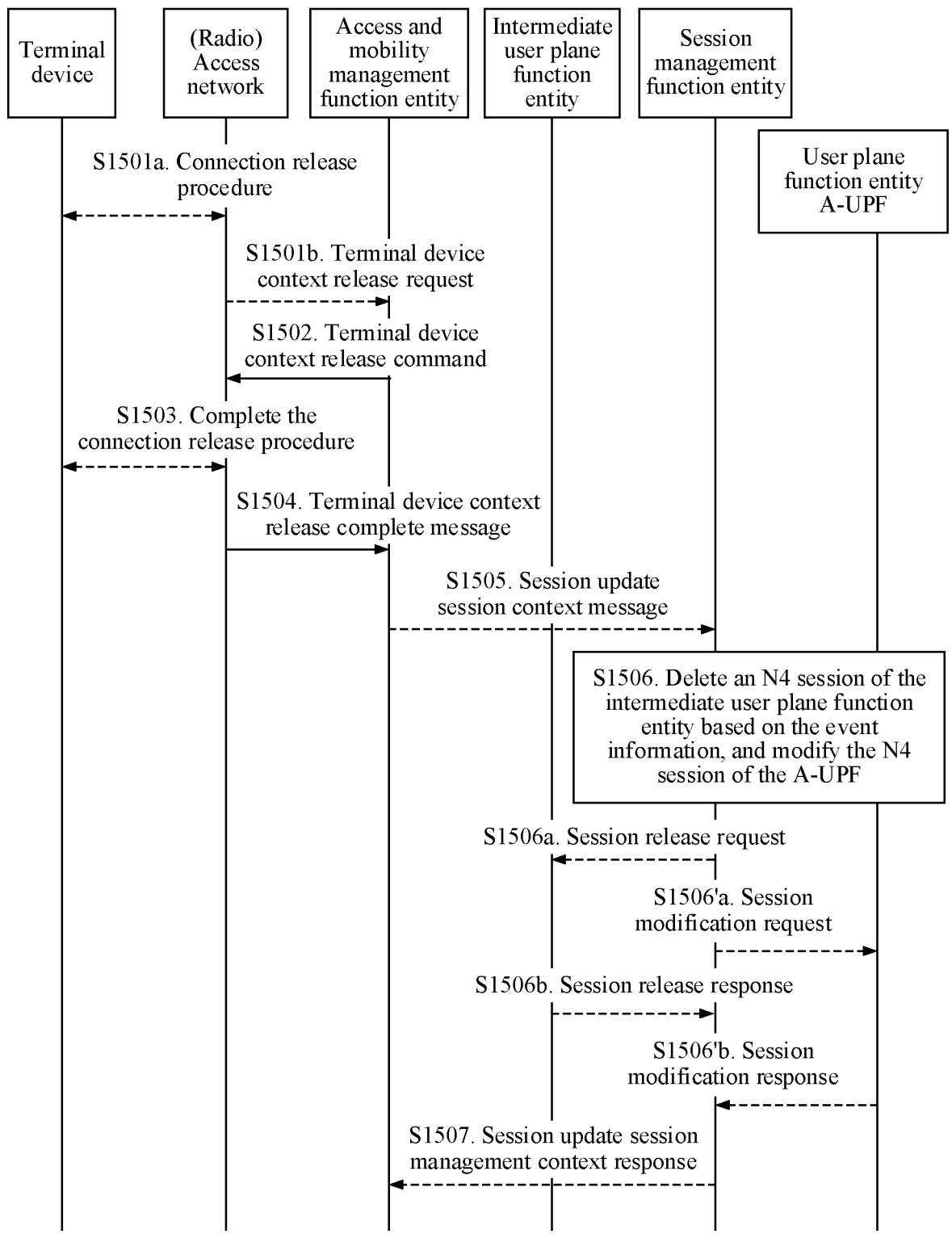

FIG. 14f is a schematic flowchart of still another communications method according to an embodiment of this application. The communications method may be applied to a multi-UPF scenario. For example, in this embodiment, an A-UPF manages an intermediate UPF entity (I-UPF). The method may include the following steps.

S1501a. UE and a (R)AN perform a connection release procedure.

S1501b. The (R)AN sends a UE context release request to an AMF.

S1502. The AMF sends a UE context release command to the (R)AN.

S1503. The (R)AN and the UE complete the connection release procedure.

S1504. The (R)AN sends a UE context release complete message to the AMF.

S1505. The AMF sends a session update session context (PDU session update SM context) message to an SMF.

S1506. The SMF deletes an N4 session of the I-UPF based on event monitoring information, and modifies an N4 session of the A-UPF. In the foregoing embodiment, the SMF obtains the event monitoring information, and may manage the session based on the event monitoring information. The N4 session is a session corresponding to service description information.

Specifically, the following steps are included.

S1506a. The SMF sends a session release request (N4 session release request) to the I-UPF.

S1506'a. The SMF sends a session modification request (N4 session modification request) to the A-UPF.

S1506b. The I-UPF sends a session release response (N4 session release response) to the SMF.

S1506'b. The A-UPF sends a session modification response (N4 session modification response) to the SMF.

S1507. The SMF sends a session update session management context response (PDU session update SM context ACK) to the AMF.

FIG. 15 is a schematic structural diagram of still another communications apparatus according to an embodiment of this application. The apparatus 5000 may include an instruction unit 51 configured to instruct a UPF entity to detect a service, where the service is a service corresponding to a terminal event subscribed to by a first application function entity, a receiving unit 52 configured to receive a service detection notification sent by the UPF entity, where the service detection notification is used to indicate that data of the service is detected, a monitoring unit 53 configured to, when a terminal is unreachable, monitoring the terminal event based on the service detection notification, and a sending unit 54 configured to, when the terminal event is detected, send a terminal event notification to a network exposure function entity or the first application function entity.

In a first possible implementation, the terminal event includes an event of terminal availability after DDN failure or a terminal reachability event.

In a second possible implementation, the monitoring a terminal event is receiving a terminal reachability event notification or a notification on an event of terminal availability after downlink data sending failure that is sent by the AMF entity.

In a third possible implementation, the apparatus further includes a determining unit configured to, when the notification on a downlink data sending failure sent by the AMF entity is received or service data of a second application function entity is detected, determine that the terminal is unreachable if an unreachability notification sent by the AMF entity is received.

In a fourth possible implementation, the receiving unit 52 is further configured to receive a first message sent by a local session management function entity, where the first message is used to indicate the service and instruct to subscribe to the terminal event, and the first message includes service description information of the service and an event correlation identifier and event type information of the terminal event, where the event correlation identifier is used to identify a correlation relationship between the terminal event and a function entity that subscribes to the terminal event, and the event type information is used to identify the terminal event.

For specific implementation of the instruction unit 51, the receiving unit 52, the monitoring unit 53, and the sending unit 54, refer to the embodiments shown in FIG. 13 to FIG. 14f.

Figure 16:
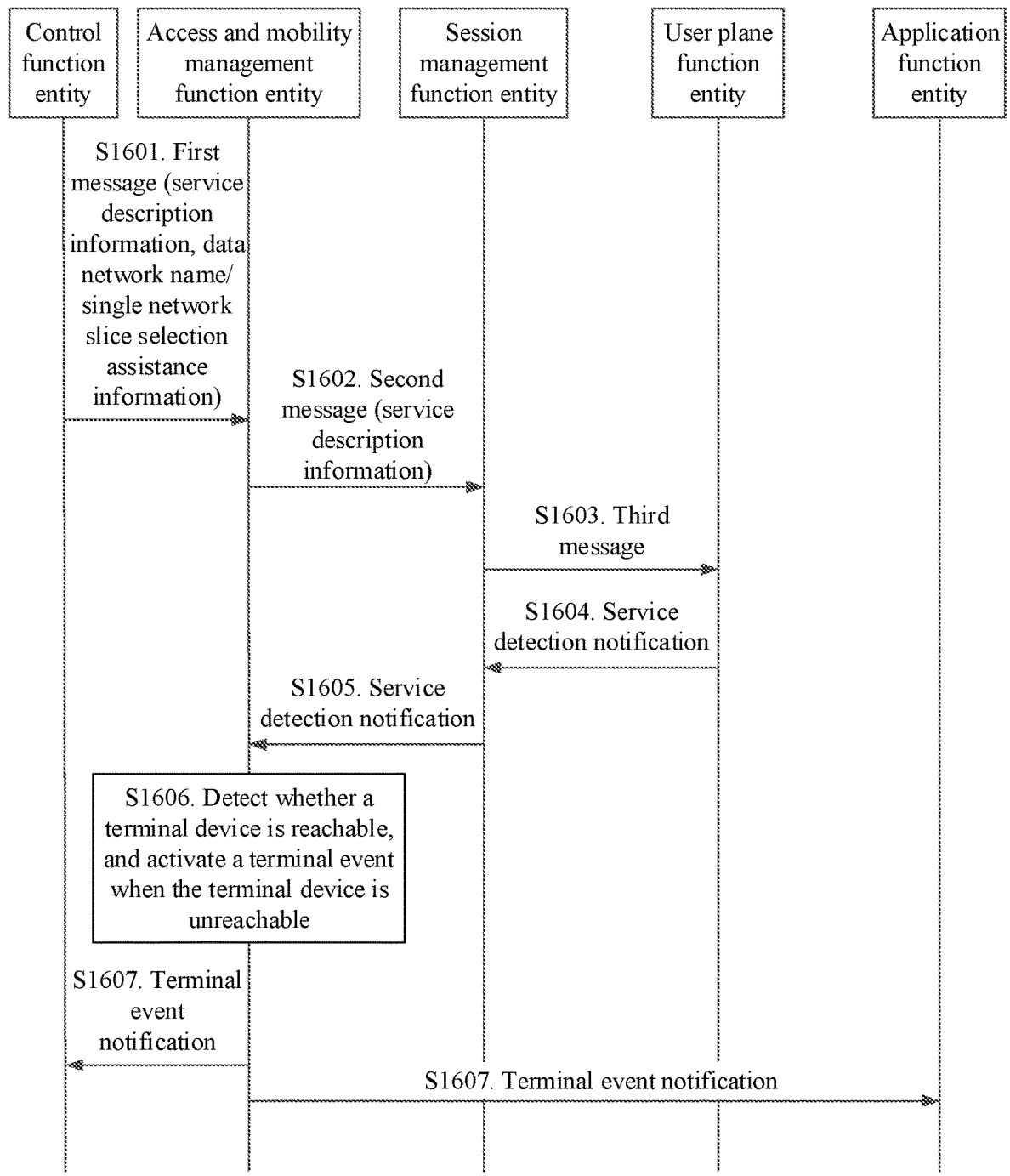
FIG. 16 is a schematic flowchart of still another communications method according to an embodiment of this application.

FIG. 16 is a schematic flowchart of still another communications method according to an embodiment of this application.

S1601. A control function entity sends a first message for a terminal event to an AMF.

When or after UE is registered with a network, the UDM/PCF determines to subscribe to an event from the AMF. The UDM/PCF determines to subscribe to an event from the AMF. The first message is used to subscribe to a terminal event, and the first message includes service description information and a DNN/S-NSSAI. The first message may further include an event type, an NEF ID, and an NEF reference ID.

S1602. After the AMF receives the first message, the AMF sends a second message to an SMF.

The second message is used to subscribe to a service detection event, and the second message includes the service description information. The second message may further include the event type, the NEF ID, and the NEF reference ID, or includes the event type, an AMF ID, and an AMF reference ID. The AMF reference ID is generated by the AMF and is used to correlate a corresponding event or event reporting.

In an implementation, the AMF determines whether a DNN/S-NSSAI of a PDU session that has been set up or that is being set up is the same as the DNN/S-NSSAI included in the first message. When the DNN/S-NSSAI is the same as the DNN/S-NSSAI included in the first message, the AMF sends the second message to the SMF.

In still another implementation, S1602 further includes sending a subscription request to a local session management function entity or a roaming session management function entity, or sending a session context update request to a local session management function entity or a roaming session management function entity, where the session context update request is used to subscribe to the terminal event.

S1603. After receiving the second message, the SMF sends a third message to a UPF.

The third message is used to instruct to detect a service, and the service is a service corresponding to the subscribed terminal event.

In an implementation, S1603 includes sending the third message to the UPF entity during or after PDU session deactivation, where the third message is used to instruct to detect the service, and the service is a service corresponding to the subscribed terminal event. Specifically, the SMF subscribes to the service detection event from the UPF using an N4 session setup or modification procedure or a new N4 message.

In addition, in another implementation, the third message may be a service information request, and is used to instruct the UPF entity to report service information. In this case, S1604 does not need to be performed. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

S1604. Optionally, when the received third message is used to instruct the UPF entity to detect a service, the UPF receives the third message, when detecting service data, the UPF sends a service detection notification to the SMF.

The service detection notification is used to indicate occurrence of the service data. In another implementation, the service detection notification may be service information, that is, the service information in S1603. The service information is determined based on the downlink data packet, and further, is determined based on a packet header of the received downlink data packet. For example, when the downlink data packet is an IP data packet, a packet header of the downlink data packet includes IP quintuple information, when the downlink data packet is an Ethernet data packet, a packet header of the downlink data packet includes a MAC address.

S1605. After receiving the service detection notification, the SMF sends the service detection notification to the AMF.

The service detection notification carries a reference ID, which is used to index a specific event. The reference ID is generated by the AMF or an NEF. If the reference ID is generated by the NEF, the NEF ID is optionally included, to prevent that a particular event cannot be uniquely identified because different NEFs may generate a same reference ID. Optionally, the service detection notification that is for monitoring the terminal event may include event correlation information, for example, an NEF reference ID. The event correlation information is used to determine event reporting information. Optionally, the session management function entity sends the event correlation information to the MME based on the service description information and the service information. In other words, the session management function entity compares the service information with the service description information, and sends the event correlation information to the MME when the service information matches the service description information.

S1606. After receiving the service detection notification, the AMF detects whether UE is reachable, and activates the foregoing terminal event when the UE is unreachable.

S1607. When detecting that the UE is reachable, the AMF sends a terminal event notification to a capability exposure node or an application function entity.

According to the communications method provided in this embodiment of this application, the control function entity may subscribe to the terminal event from the AMF. The AMF activates the terminal event when receiving the service detection notification and detecting that the terminal is unreachable, and sends the terminal event notification to the capability exposure node or the application function entity when detecting that the terminal is reachable. In this way, a terminal event may be subscribed to for a specific service in a 5G architecture.

The following describes the foregoing communications method completely and in detail with reference to specific scenarios.

Figure 17A:
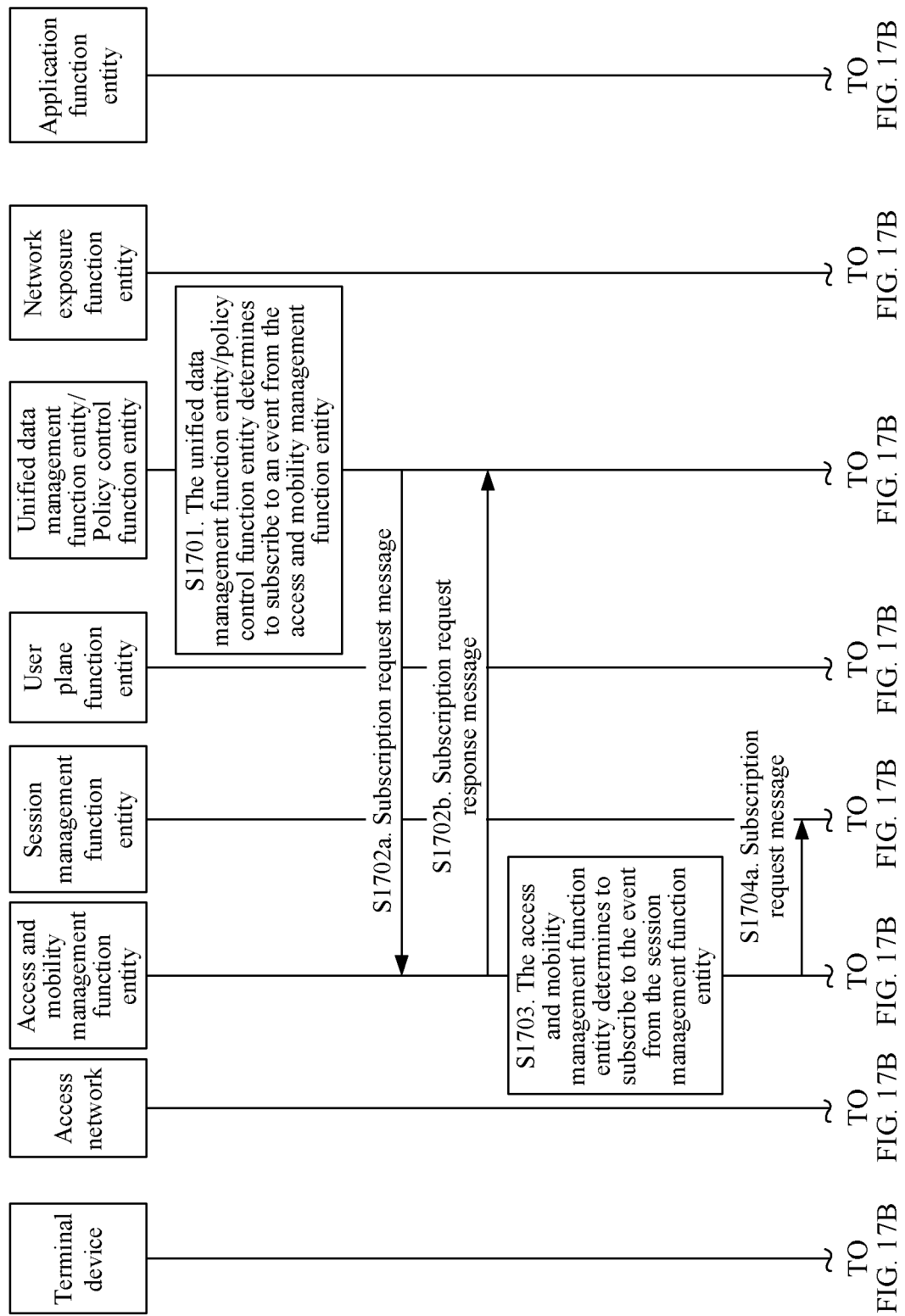
FIG. 17A and FIG. 17B are a schematic flowchart of still another communications method according to an embodiment of this application.
Figure 17B:
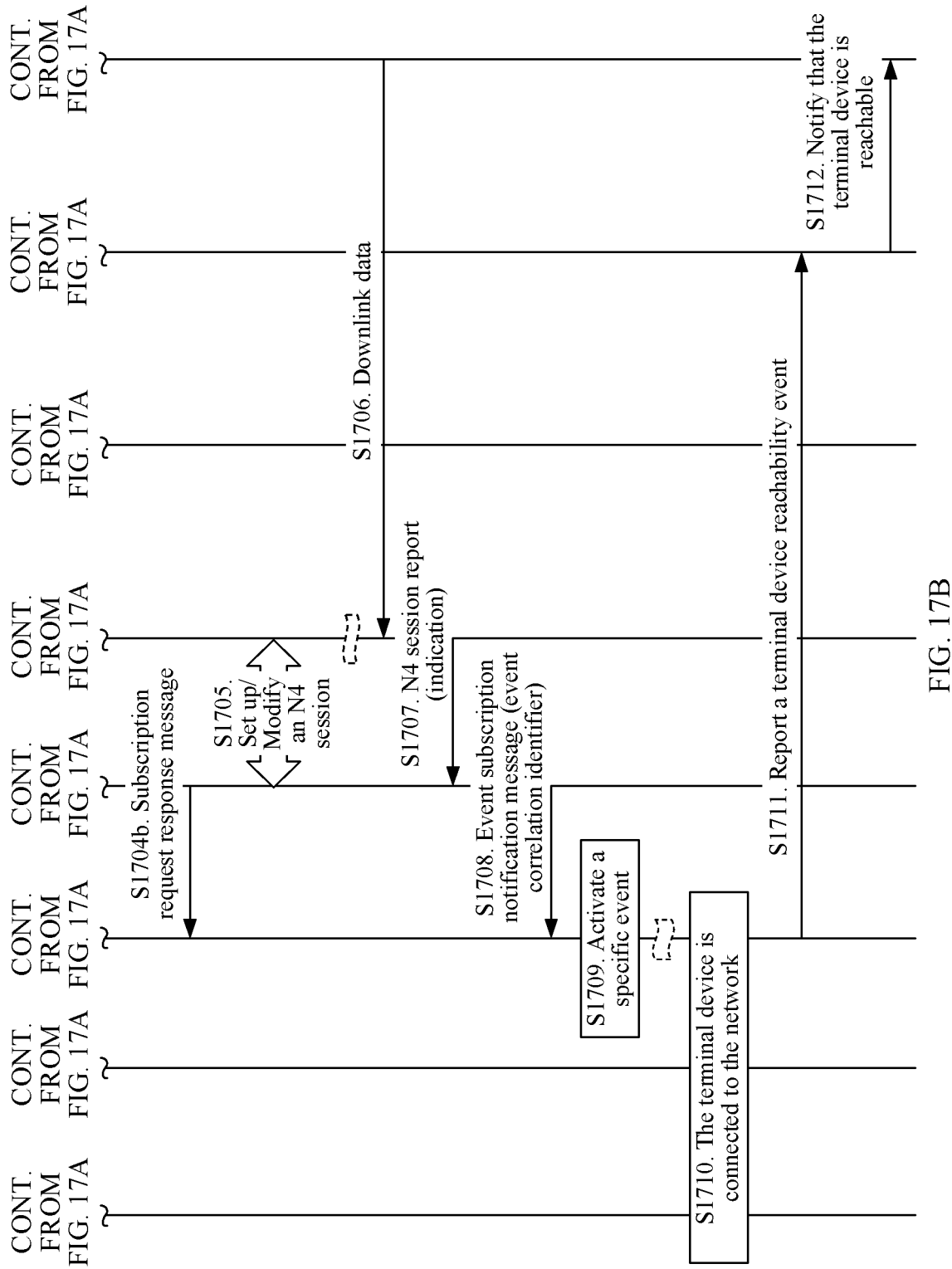

For a local breakout (LBO) scenario or a non-roaming scenario, FIG. 17A and FIG. 17B are a schematic flowchart of still another communications method according to an embodiment of this application.

S1701. When or after UE is registered with a network, a UDM/PCF determines to subscribe to an event from an AMF.

S1702a. The UDM/PCF (AMF-PCF) sends a subscription request message (Namf_EventExposure) to the AMF, where the message includes an event type, an NEF ID, an NEF reference ID, a DNN/S-NSSAI and service description information.

S1702b. The AMF sends an Namf_EventExposure response message to the UDM/PCF.

S1703. The AMF determines to subscribe to the event from an SMF based on the DNN/S-NSSAI, and determines whether a DNN/S-NSSAI of a PDU session that has been set up or that is being set up is the same as the DNN/S-NSSAI of the event.

S1704a. The AMF sends an Nsmf_EventExposure request to the SMF, where the request message includes the event type, a service description, the NEF ID, and the NEF reference ID, or includes the event type, a service description, an AMF ID, and an AMF reference ID. The AMF reference ID is generated by the AMF and is used to correlate a corresponding event or event reporting.

S1704b. The SMF sends an Nsmf_EventExposure response to the AMF.

S1705. The SMF subscribes to a service detection event from a UPF using an N4 session setup or modification procedure or a new N4 message.

In an implementation, the message may be a service information request, and is used to instruct the UPF entity to report service information. In this case, S1706 does not need to be performed. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

S1706. Optionally, when the received message is used to instruct the UPF entity to detect a service, the UPF receives a data packet sent by an AF.

S1707. When determining that the data packet is the foregoing specific service, the UPF sends a service detection report to the SMF.

In another implementation, the service detection report may be service information, that is, the service information in S1703. The service information is determined based on the downlink data packet, and further, is determined based on a packet header of the received downlink data packet. For example, when the downlink data packet is an IP data packet, a packet header of the downlink data packet includes IP quintuple information, when the downlink data packet is an Ethernet data packet, a packet header of the downlink data packet includes a MAC address.

S1708. The SMF sends Nsmf_EventExposureNotify to the AMF, where the message carries the reference ID, which is used to index a specific event. The reference ID is generated by the AMF or an NEF. If the reference ID is generated by the NEF, the NEF ID is optionally included, to prevent that a particular event cannot be uniquely identified because different NEFs may generate a same reference ID. Optionally, the notification that is for monitoring the terminal event may include event correlation information, for example, an event correlation identifier (an NEF reference ID). The event correlation information is used to determine event reporting information. Optionally, the session management function entity sends the event correlation information to the MME based on the service description information and the service information. In other words, the session management function entity compares the service information with the service description information, and sends the event correlation information to the MME when the service information matches the service description information.

S1709. The AMF activates a specific event if the UE is unreachable.

S1710. The UE initiates a connection to a network.

S1711. The UE enters a reachable state, and the AMF reports a UE reachability event to the NEF.

S1712. The NEF further notifies the AF that the UE is reachable.

Figure 18A:
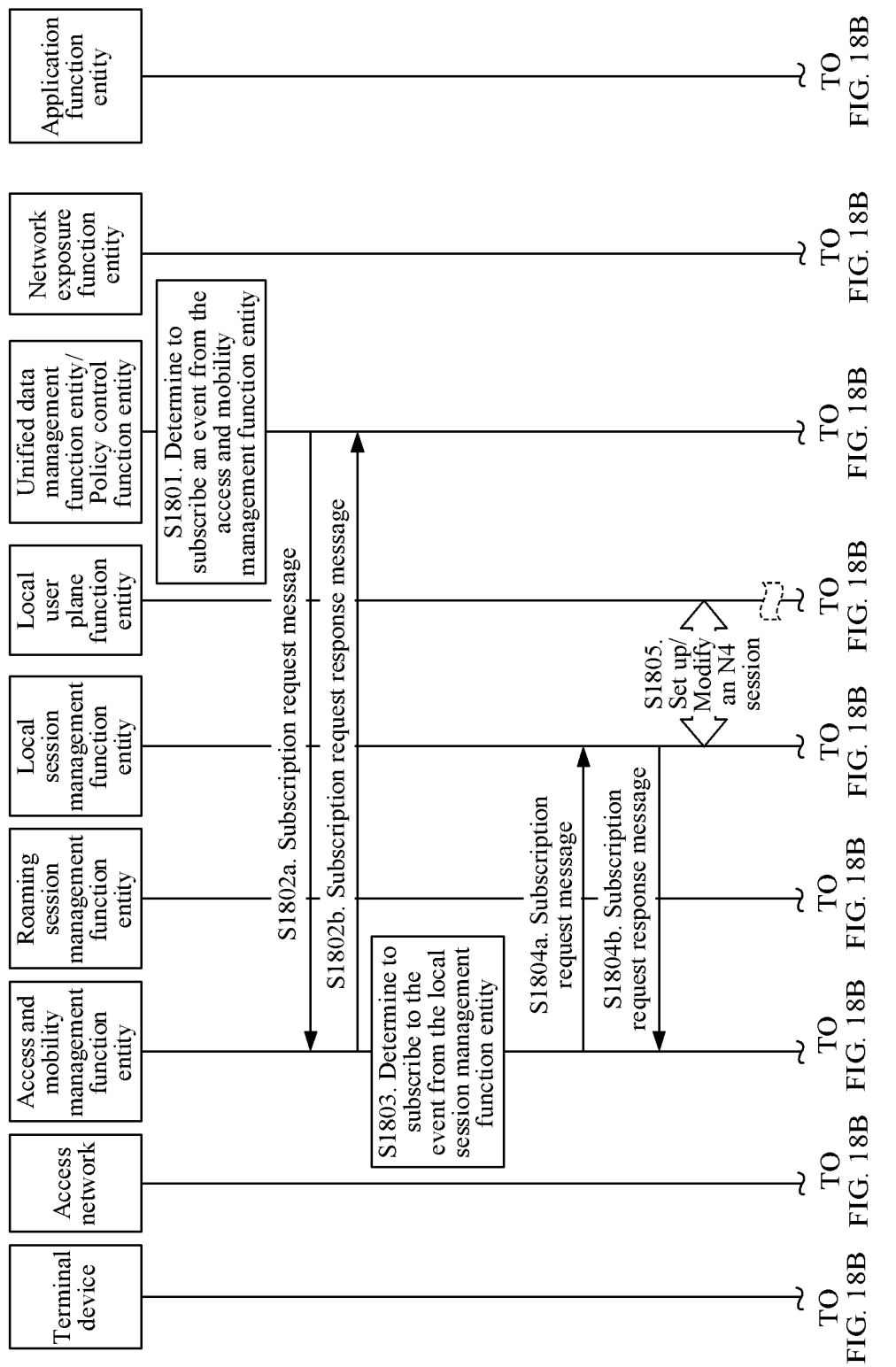
FIG. 18A and FIG. 18B are a schematic flowchart of still another communications method according to an embodiment of this application.
Figure 18B:
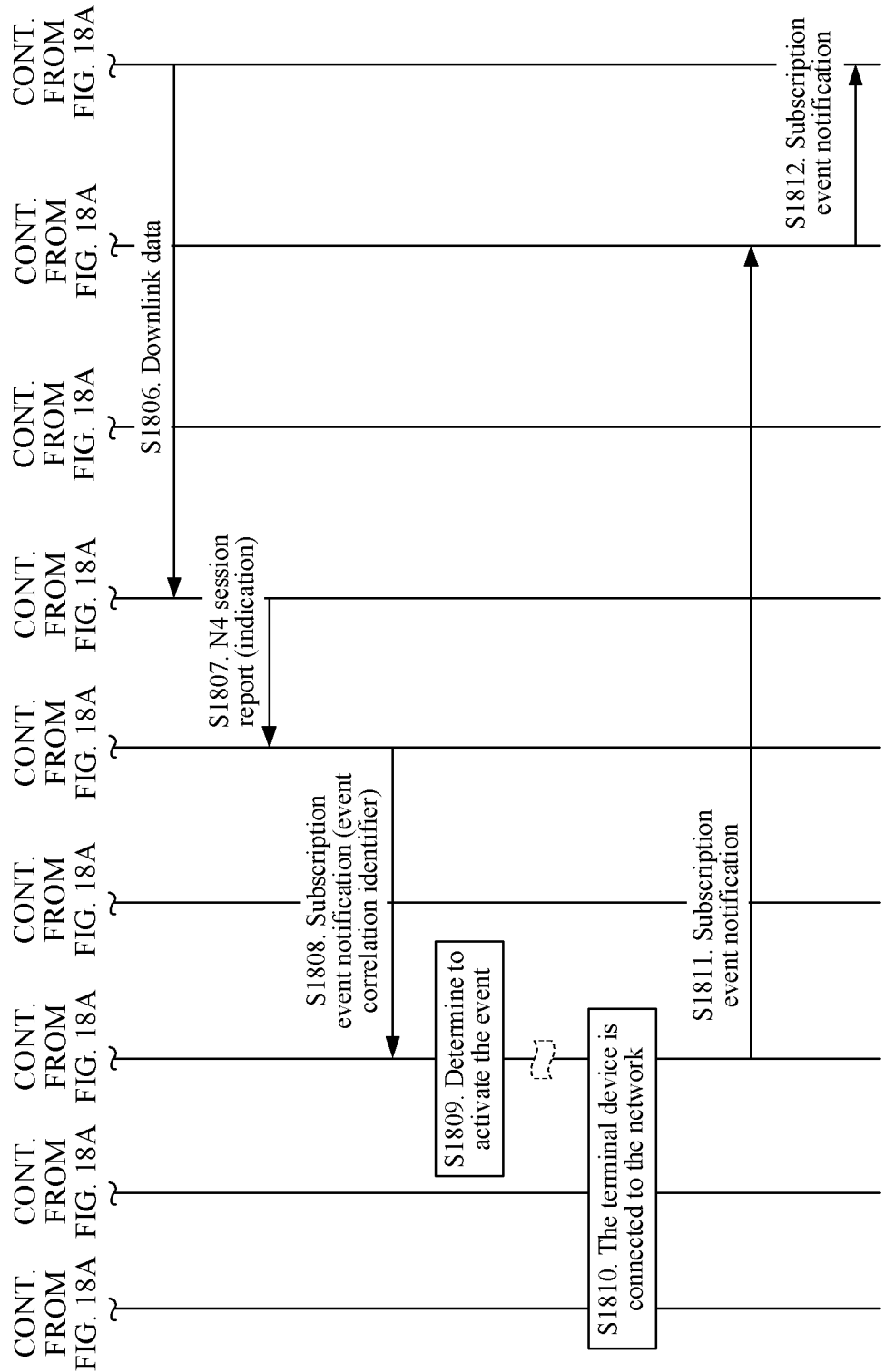

For an HR scenario, FIG. 18A and FIG. 18B are a schematic flowchart of still another communications method according to an embodiment of this application.

S1801. When or after UE is registered with a network, a UDM/PCF determines to subscribe to an event from an AMF.

S1802a. The UDM/PCF (AMF-PCF) sends an Namf_EventExposure request message to the AMF, where the message includes an event type, an NEF ID, an NEF reference ID, a DNN/S-NSSAI, and service description information.

S1802b. The AMF sends an Namf_EventExposure response message to the UDM/PCF.

S1803. The AMF determines to subscribe to the event from an H-SMF based on the DNN/S-NSSAI, and determines whether a DNN/S-NSSAI of a PDU session that has been set up or that is being set up is the same as the DNN/S-NSSAI of the event.

S1804a. The AMF sends Nsmf_EventExposure request to the H-SMF, where the request message includes the event type, a service description, the NEF ID, and the NEF reference ID, or includes an event type, a service description, an AMF ID, and an AMF reference ID. The AMF reference ID is generated by the AMF and is used to correlate a corresponding event or event reporting.

In addition, in another implementation, the request message may be a service information request, and is used to instruct the UPF entity to report service information. In this case, S1806 does not need to be performed. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

S1804b. The H-SMF sends an Nsmf_EventExposure response to the AMF. Optionally, the AMF subscribes to the event from the H-SMF using a V-SMF. The AMF sends event subscription information to the V-SMF. Further, the V-SMF sends the event subscription information to the H-SMF.

S1805. The H-SMF subscribes to a service detection event from an H-UPF using an N4 session setup or modification procedure or a new N4 message.

S1806. Optionally, when the received subscription request message is used to instruct the UPF entity to detect a service, the H-UPF receives a data packet sent by an AF.

S1807. When determining that the data packet is the foregoing specific service, the H-UPF sends a service detection report to the H-SMF. In another implementation, the service detection report may be service information, that is, the service information in S1803. The service information is determined based on the downlink data packet, and further, is determined based on a packet header of the received downlink data packet. For example, when the downlink data packet is an IP data packet, a packet header of the downlink data packet includes IP quintuple information, when the downlink data packet is an Ethernet data packet, a packet header of the downlink data packet includes a MAC address.

S1808. The H-SMF sends Nsmf_EventExposureNotify to the AMF, where the message carries the reference ID, which is used to index a specific event. The reference ID is generated by the AMF or an NEF. If the reference ID is generated by the NEF, the NEF ID is optionally included, to prevent that a particular event cannot be uniquely identified because different NEFs may generate a same reference ID. Optionally, the H-SMF sends an event notification to the V-SMF such that the V-SMF sends the event notification to the AMF.

Optionally, the notification that is for monitoring the terminal event may include event correlation information, for example, an event correlation identifier (an NEF reference ID). The event correlation information is used to determine event reporting information. Optionally, the session management function entity sends the event correlation information to the MME based on the service description information and the service information. In other words, the session management function entity compares the service information with the service description information, and sends the event correlation information to the MME when the service information matches the service description information.

S1809. The AMF activates a specific event if the UE is unreachable.

S1810. The UE initiates a connection to a network.

S1811. The UE enters a reachable state, and the AMF reports a UE reachability event to the NEF.

S1812. The NEF further notifies the AF that the UE is reachable.

Figure 19A:
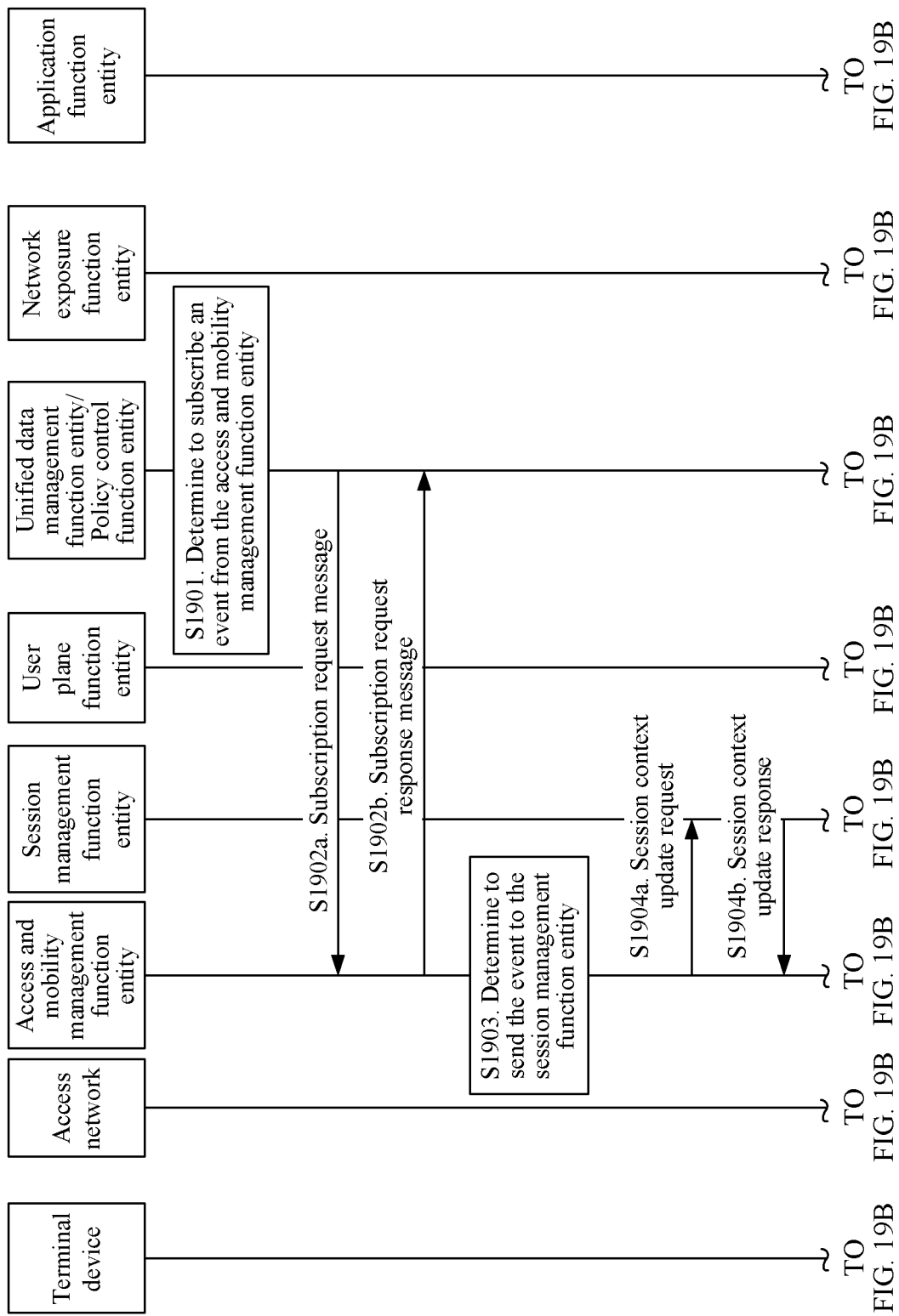
FIG. 19A and FIG. 19B are a schematic flowchart of still another communications method according to an embodiment of this application.
Figure 19B:
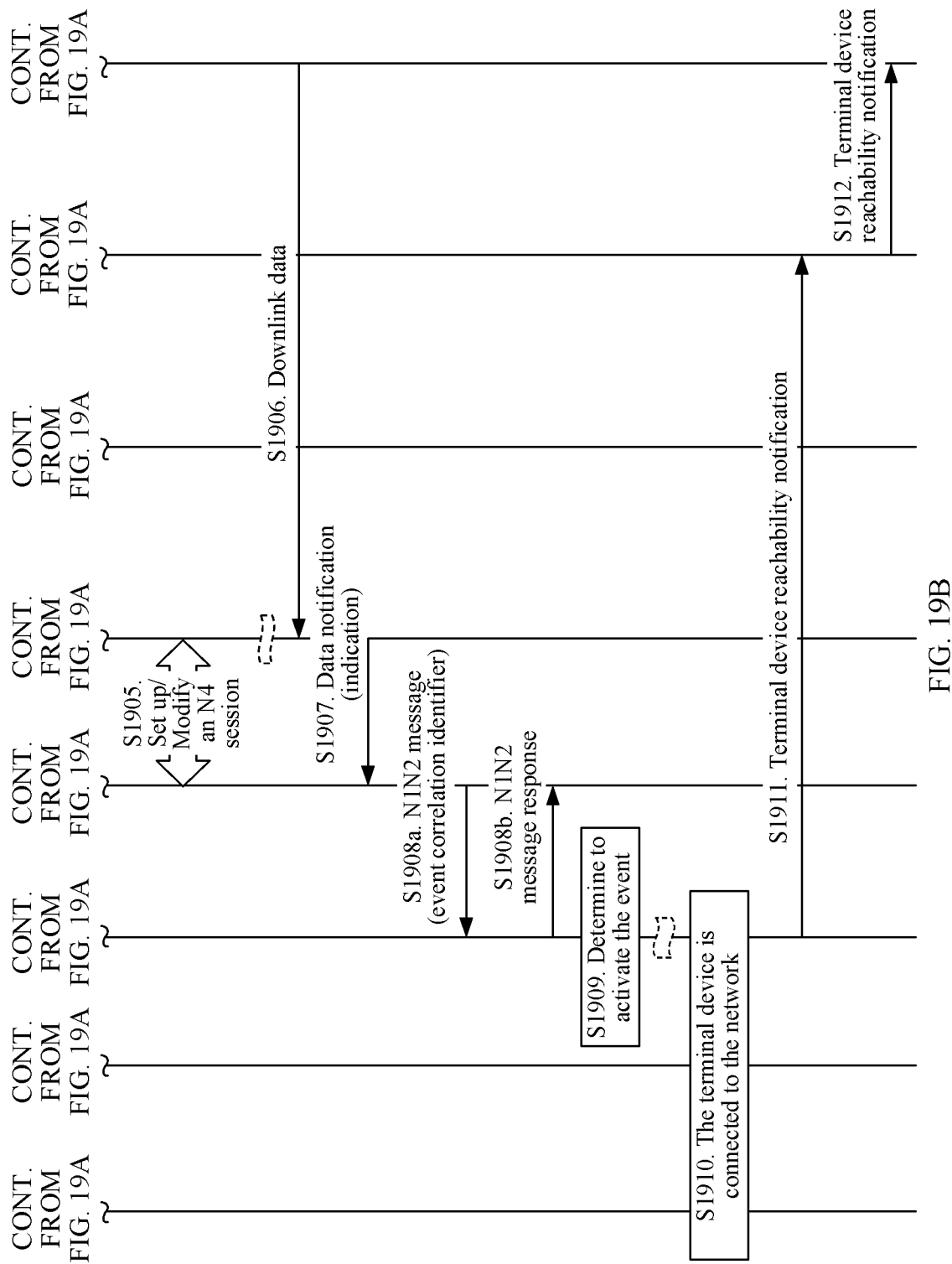

For an LBO scenario or a non-roaming scenario, FIG. 19A and FIG. 19B are a schematic flowchart of still another communications method according to an embodiment of this application.

S1901. When or after UE is registered with a network, a UDM/PCF determines to subscribe to an event from an AMF.

S1902a. The UDM/PCF (AMF-PCF) sends an Namf_EventExposure request message to the AMF, where the message includes an event type, an NEF ID, an NEF reference ID, a DNN/S-NSSAI, and service description information.

S1902b. The AMF sends an Namf_EventExposure response message to the UDM/PCF.

S1903. The AMF determines to send an event to an SMF based on the DNN/S-NSSAI, and determines whether a DNN/S-NSSAI of a PDU session that has been set up or that is being set up is the same as the DNN/S-NSSAI of the event.

S1904a. The AMF sends an Nsmf_PDUSession_UpdateSMContext request to the SMF, where the request message includes a service description, the NEF ID, and the NEF reference ID, or includes a service description, an AMF ID, and an AMF reference ID. The AMF reference ID is generated by the AMF and is used to correlate a corresponding event or event reporting.

S1904b. The SMF sends an Nsmf_PDUSession_UpdateSMContext response to the AMF.

S1905. The SMF sends service detection information to a UPF using an N4 session setup or modification procedure or a new N4 message. Further, optionally, the SMF sends service information to the UPF in a PDU session deactivation process, and the UPF is a UPF corresponding to an N3 interface. In addition, in another implementation, the subscription request message may be a service information request, and is used to instruct the UPF entity to report service information. In this case, S1906 does not need to be performed. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

S1906. Optionally, when the received subscription request message is used to instruct the UPF entity to detect a service, the UPF receives a data packet sent by an AF.

S1907. When determining that the data packet is the foregoing specific service, the UPF sends a service notification to the SMF using a data network (DN) message. In another implementation, the service notification may be service information, that is, the service information in S1903. The service information is determined based on the downlink data packet, and further, is determined based on a packet header of the received downlink data packet. For example, when the downlink data packet is an IP data packet, a packet header of the downlink data packet includes IP quintuple information, when the downlink data packet is an Ethernet data packet, a packet header of the downlink data packet includes a MAC address.

S1908a. The SMF sends Namf_Communication_N1N2Message to the AMF, where the message carries the reference ID, which is used to index a specific event. The reference ID is generated by the AMF or an NEF. If the reference ID is generated by the NEF, the NEF ID is optionally included, to prevent that a particular event cannot be uniquely identified because different NEFs may generate a same reference ID.

Optionally, the notification that is for monitoring the terminal event may include event correlation information, for example, an event correlation identifier (an NEF reference ID). The event correlation information is used to determine event reporting information. Optionally, the session management function entity sends the event correlation information to the MME based on the service description information and the service information. In other words, the session management function entity compares the service information with the service description information, and sends the event correlation information to the MME when the service information matches the service description information.

S1908b. The AMF sends an Namf_Communication_N1N2Message response to the SMF.

S1909. The AMF activates a specific event if the UE is unreachable.

S1910. The UE initiates a connection to a network.

S1911. The UE enters a reachable state, and the AMF reports a UE reachability event to the NEF.

S1912. The NEF further notifies the AF that the UE is reachable.

Figure 20A:
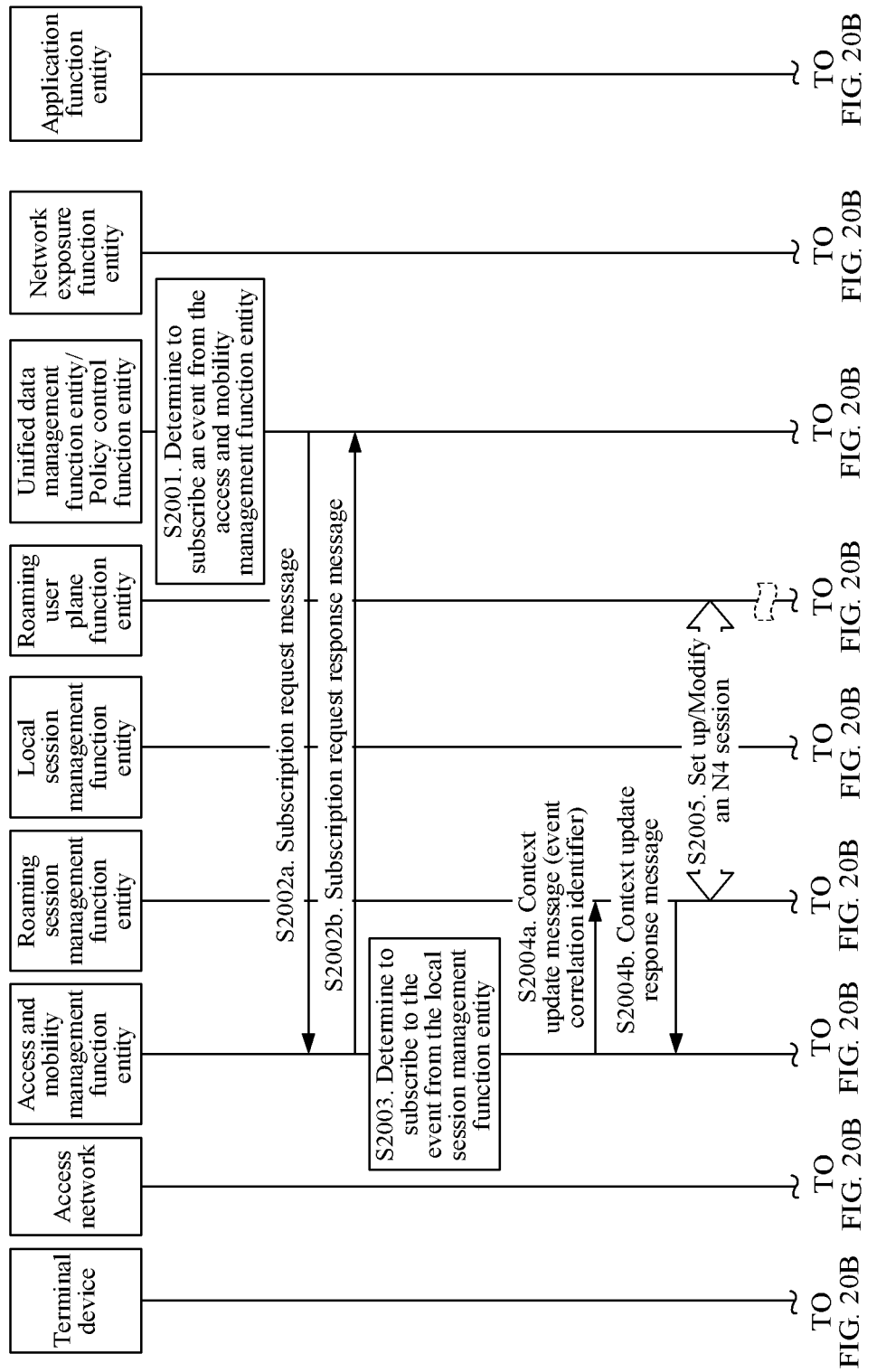
FIG. 20A and FIG. 20B are a schematic flowchart of still another communications method according to an embodiment of this application.
Figure 20B:
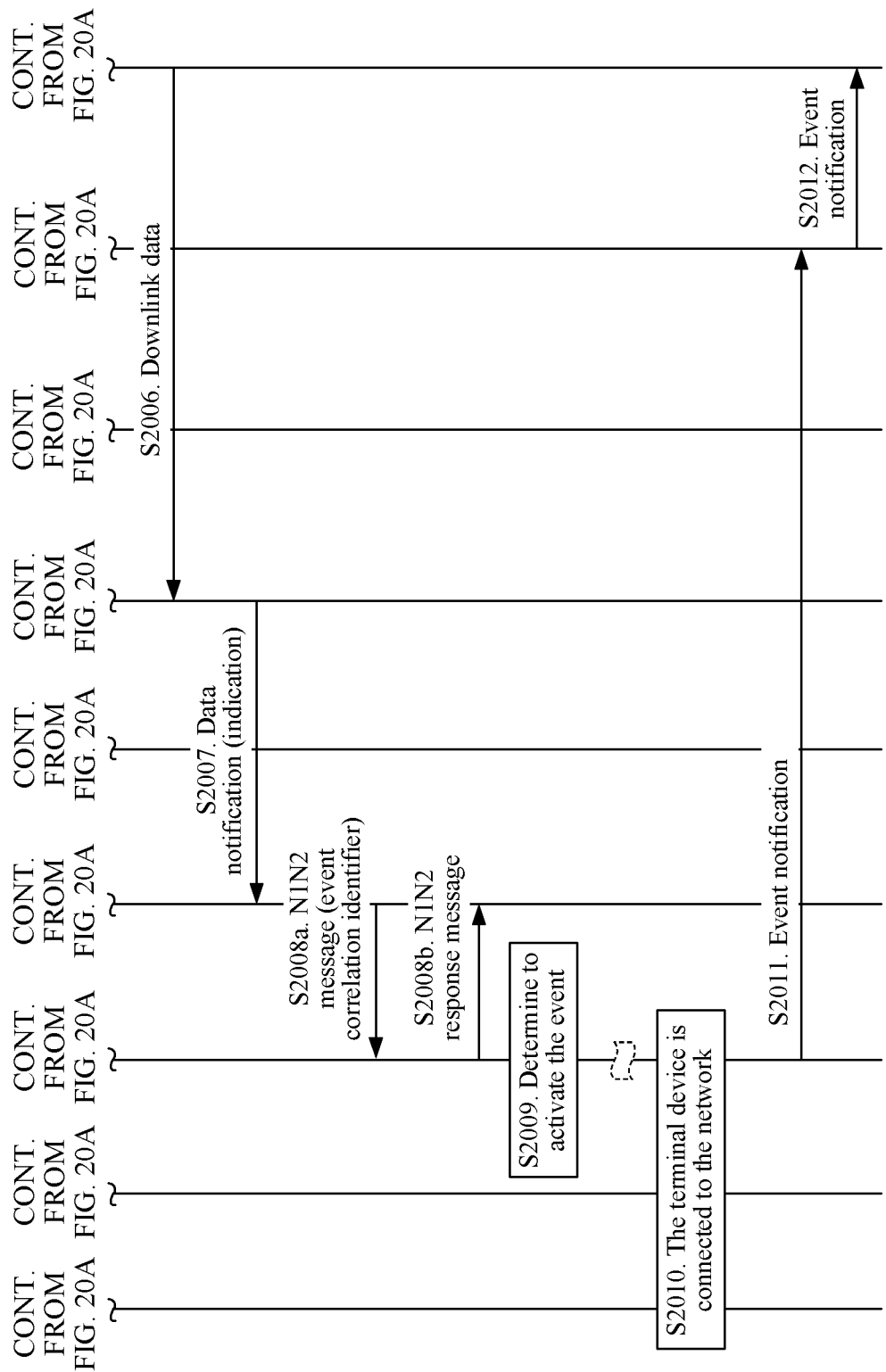

For an HR scenario, FIG. 20A and FIG. 20B are a schematic flowchart of still another communications method according to an embodiment of this application.

S2001. When or after UE is registered with a network, a UDM/PCF determines to subscribe to an event from an AMF.

S2002a. The UDM/PCF (AMF-PCF) sends an Namf_EventExposure request message to the AMF, where the message includes an event type, an NEF ID, an NEF reference ID, a DNN/S-NSSAI, and service description information.

S2002b. The AMF sends an Namf_EventExposure response message to the UDM/PCF.

S2003. The AMF determines to send an event to an SMF based on the DNN/S-NSSAI, and determines whether a DNN/S-NSSAI of a PDU session that has been set up or that is being set up is the same as the DNN/S-NSSAI of the event.

S2004a. The AMF sends an Nsmf_PDUSession_UpdateSMContext request to a V-SMF, where the request message includes a service description, the NEF ID, and the NEF reference ID, or includes a service description, an AMF ID, and an AMF reference ID. The AMF reference ID is generated by the AMF and is used to correlate a corresponding event or event reporting.

S2004b. The V-SMF sends an Nsmf_PDUSession_UpdateSMContext response to the AMF.

S2005. The V-SMF sends service detection information to the UPF using an N4 session setup or modification procedure or a new N4 message. Further, optionally, the V-SMF sends service information to the UPF in a PDU session deactivation process. The UPF is a UPF terminating an N3 interface or an N9 interface. In addition, in another implementation, a second message may be a service information request, and is used to instruct the UPF entity to report service information. In this case, S2006 does not need to be performed. The service information may be at least one of a source IP address and a source port number of a downlink data packet, or may be index information, where the index information is used to index a specific event. The downlink data packet may be a discarded downlink data packet. Optionally, in case of a DDN failure, the session management function entity sends the service information request to the UPF entity.

S2006. Optionally, when the received subscription request message is used to instruct the UPF entity to detect a service, the V-UPF receives a data packet sent by an AF.

S2007. When there is no downlink tunnel, the V-UPF determines that the data packet is the foregoing specific service, and sends a service notification to the V-SMF using a DN message. In another implementation, the service notification may be service information, that is, the service information in S2003. The service information is determined based on the downlink data packet, and further, is determined based on a packet header of the received downlink data packet. For example, when the downlink data packet is an IP data packet, a packet header of the downlink data packet includes IP quintuple information, when the downlink data packet is an Ethernet data packet, a packet header of the downlink data packet includes a MAC address.

S2008a. The V-SMF sends Namf_Communication_N1N2Message to the AMF, where the message carries the reference ID, which is used to index a specific event. The reference ID is generated by the AMF or an NEF. If the reference ID is generated by the NEF, the NEF ID is optionally included, to prevent that a particular event cannot be uniquely identified because different NEFs may generate a same reference ID. Optionally, the notification that is for monitoring the terminal event may include event correlation information, for example, an event correlation identifier (an NEF reference ID). The event correlation information is used to determine event reporting information. Optionally, the session management function entity sends the event correlation information to the MME based on the service description information and the service information. In other words, the session management function entity compares the service information with the service description information, and sends the event correlation information to the MME when the service information matches the service description information.

S2008b. The AMF sends an Namf_Communication_N1N2Message response to the V-SMF

S2009. The AMF activates a specific event if the UE is unreachable.

S2010. The UE initiates a connection to a network.

S2011. The UE enters a reachable state, and the AMF reports a UE reachability event to the NEF.

S2012. The NEF further notifies the AF that the UE is reachable.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instruction may be stored in a computer-readable storage medium, or may be transmitted using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium includes any medium that can store program code, such as a ROM, a RAM, a magnetic disk, or an optical disc.

What is claimed is:

1. A method comprising:
    determining, by a control function entity, a session management function entity based on a data network name, slice information, or an application function service identifier; and
    sending, by the control function entity and to the session management function entity, a first message subscribing to a terminal event,
    wherein the first message comprises service description information and a first correlation identifier,
    wherein the service description information indicates a service corresponding to the terminal event, and
    wherein the first correlation identifier determines event reporting information.

2. The method of claim 1, wherein the service description information determines an application function entity that provides the service.

3. The method of claim 1, wherein the first message further comprises event type information of the terminal event, and wherein the event type information identifies the terminal event.

4. The method of claim 1, further comprising sending, by the control function entity and to an access and mobility management function entity, a second message subscribing to the terminal event, wherein the second message comprises a second correlation identifier and event type information of the terminal event, wherein the second correlation identifier determines event reporting information, and wherein the event type information identifies the terminal event.

5. The method of claim 1, further comprising receiving, by the control function entity, the service description information from an application function entity that provides a service for a terminal.

6. The method of claim 1, wherein an event type of the terminal event is terminal availability after downlink data notification failure.

7. A method by a session management function entity and comprising:
receiving, a first message subscribing to a terminal event, wherein the first message comprises service description information and a correlation identifier, wherein the service description information indicates a service corresponding to the terminal event, and wherein the correlation identifier determines event reporting information;
receiving, from a user plane function entity, service information that is based on a downlink data packet; and
sending, to a mobility management entity or a capability exposure entity and based on the service information, event correlation information that determines event reporting information.

8. The method of claim 7, further comprising sending a service information request to the user plane function entity.

9. The method of claim 8, further comprising further sending the service information request when receiving unreachability information of a user equipment (UE).

10. The method of claim 7, further comprising further sending the event correlation information based on the service description information.

11. A communications apparatus comprising:
a memory configured to store instructions; and
a processor coupled to the memory and configured to execute the instructions to cause the communications apparatus to:
determine a session management function entity based on a data network name, slice information, or an application function service identifier; and
send, to the session management function entity, a first message subscribing to a terminal event,
wherein the first message comprises service description information and a first correlation identifier,
wherein the service description information indicates a service corresponding to the terminal event, and
wherein the first correlation identifier determines event reporting information.

12. The communications apparatus of claim 11, wherein the service description information determines an application function entity that provides the service.

13. The communications apparatus of claim 11, wherein the first message further comprises event type information of the terminal event, and wherein the event type information identifies the terminal event.

14. The communications apparatus of claim 11, wherein the processor is further configured to execute the instructions to cause the communications apparatus to send, to an access and mobility management function entity, a second message subscribing to the terminal event, wherein the second message comprises a second correlation identifier and event type information of the terminal event, wherein the second correlation identifier determines event reporting information, and wherein the event type information identifies the terminal event.

15. The communications apparatus of claim 11, wherein the processor is further configured to execute the instructions to cause the communications apparatus to receive the service description information from an application function entity.

16. The communications apparatus of claim 11, wherein an event type of the terminal event is terminal availability after downlink data notification failure.

17. A communications apparatus comprising:
a memory configured to store instructions; and
a processor coupled to the memory and configured to execute the instructions to cause the communications apparatus to:
receive a first message subscribing to a terminal event, wherein the first message comprises service description information and a correlation identifier, wherein the service description information indicates a service corresponding to the terminal event, and wherein the correlation identifier determines event reporting information;
receive, from a user plane function entity, service information that is based on a downlink data packet; and
send, to a mobility management entity or a capability exposure entity and based on the service information, event correlation information that determines event reporting information.

18. The communications apparatus of claim 17, wherein the processor is further configured to execute the instructions to cause the communications apparatus to send a service information request to the user plane function entity.

19. The communications apparatus of claim 18, wherein the processor is further configured to execute the instructions to cause the communications apparatus to further send the service information request when receiving unreachability information of a user equipment (UE).

20. The communications apparatus of claim 17, wherein the processor is further configured to execute the instructions to cause the communications apparatus to further send the event correlation information based on the service description information.

21. The method of claim 1, further comprising:
receiving, by the session management function entity and from the control function entity, the first message;
receiving, by the session management function entity and from a user plane function entity, service information that is based on a downlink data packet; and
sending, by the session management function entity, to a mobility management entity or a capability exposure entity, and based on the service information, event correlation information that determines event reporting information.

22. The method of claim 21, wherein before receiving the service information, the method further comprises sending, by the session management function entity, to the user plane function entity, and when receiving unreachability information of a user equipment (UE), a service information request.

23. A communications system comprising:
a session management function entity; and
a control function configured to:
determine the session management function entity based on a data network name, slice information, or an application function service identifier; and
send, to the session management function entity, a first message subscribing to a terminal event, wherein the first message comprises service description information and a correlation identifier, wherein the service description information indicates a service corresponding to the terminal event, wherein the correlation identifier determines event reporting information, and wherein the session management function entity is configured to:
receive the first message from the control function;
receive, from a user plane function entity, service information that is based on a downlink data packet; and
send, to a mobility management entity or a capability exposure entity and based on the service information, event correlation information that determines event reporting information.

\* \* \* \* \*